(12) United States Patent
Altshuler et al.

(10) Patent No.: US 11,323,334 B2
(45) Date of Patent: May 3, 2022

(54) SYSTEMS AND METHODS FOR NETWORK STABILIZATION PREDICTION

(71) Applicant: Netz Forecasts Ltd., Tel-Aviv (IL)

(72) Inventors: Yaniv Altshuler, Ramat Yishay (IL); Shahar Somin, Rehovot (IL); Goren Gordon, Rishon LeZion (IL)

(73) Assignee: Netz Forecasts Ltd., Tel-Aviv (IL)

( * ) Notice: Subject to any disclaimer, the term of this patent is extended or adjusted under 35 U.S.C. 154(b) by 0 days.

(21) Appl. No.: 17/284,801

(22) PCT Filed: Oct. 10, 2019

(86) PCT No.: PCT/IL2019/051108
§ 371 (c)(1),
(2) Date: Apr. 13, 2021

(87) PCT Pub. No.: WO2020/079681
PCT Pub. Date: Apr. 23, 2020

(65) Prior Publication Data
US 2021/0320847 A1    Oct. 14, 2021

Related U.S. Application Data

(60) Provisional application No. 62/745,474, filed on Oct. 15, 2018.

(51) Int. Cl.
*H04L 41/142* (2022.01)
*H04L 41/0893* (2022.01)
(Continued)

(52) U.S. Cl.
CPC ........ *H04L 41/142* (2013.01); *H04L 41/0893* (2013.01); *H04L 41/145* (2013.01); *H04L 41/147* (2013.01); *H04L 43/045* (2013.01)

(58) Field of Classification Search
CPC ... H04L 43/045; H04L 63/1425; H04L 41/12; H04L 41/22; H04L 43/0817; H04L 67/22;
(Continued)

(56) References Cited

U.S. PATENT DOCUMENTS 5,987,442 A * 11/1999 Lewis ..................... H04L 43/00
706/10
2005/0256949 A1 * 11/2005 Gruhl ..................... G06Q 50/01
709/223
(Continued)

FOREIGN PATENT DOCUMENTS

| CN | 102638820 | 8/2012 |
|----|-----------|--------|
| WO | WO 2020/079681 | 4/2020 |

OTHER PUBLICATIONS

International Preliminary Report on Patentability dated Apr. 29, 2021 From the International Bureau of WIPO Re. Application No. PCT/IL2019/051108. (7 Pages).
(Continued)

*Primary Examiner* — Djenane M Bayard

(57) ABSTRACT

There is provided a method for evaluating a network comprising: providing graphs each indicative of a respective sequential snapshot of a dynamic graph obtained over a historical time interval, the dynamic graph denoting the network, computing sets of meta-parameters, each set of meta-parameters computed according to a respective graph of the graphs, wherein each one of the meta-parameters denotes a network level parameter computed according to a plurality of at least one of edges and nodes of the respective graphs, analyzing sets of meta-parameters according to values computed based on a physics-based analytical model of an evolving physical system, and predicting a likelihood of stabilization of the network during a future time interval according to an indication of convergence of the values
(Continued)

according to a convergence requirement, computed based on the physics-based analytical model during the future time interval.

22 Claims, 43 Drawing Sheets

(51) Int. Cl.
  *H04L 41/14* (2022.01)
  *H04L 41/147* (2022.01)
  *H04L 43/045* (2022.01)
(58) Field of Classification Search
  CPC ..... H04L 41/14; H04L 41/142; H04L 43/065; H04L 43/0805; H04L 43/10; H04L 43/16; H04L 41/06; H04L 41/0631; H04L 41/147; H04L 12/1496; H04L 2012/2841; H04L 29/06027; H04L 41/0659; H04L 41/0677; H04L 63/10; H04L 63/1441; H04L 65/602; H04L 67/06; H04L 67/20; H04L 67/2804; H04L 2463/121; H04L 41/069; H04L 41/16; H04L 43/00; H04L 43/0811; H04L 43/50; H04L 63/1408; H04L 63/1416; H04L 63/1433; H04L 12/2807; H04L 12/2809; H04L 12/2818; H04L 2209/38; H04L 9/3239; H04L 67/40; H04L 9/3263; H04L 67/12; H04L 63/123; H04L 43/08; H04L 2209/56; H04L 41/5003; H04L 43/0864; H04L 67/18; H04L 41/5009; H04L 43/0823; H04L 67/10; H04L 67/142
  See application file for complete search history.

(56) References Cited

U.S. PATENT DOCUMENTS

| 2006/0294150 | A1 | 12/2006 | Stanfill | |
| 2015/0012468 | A1* | 1/2015 | Kegel | H04N 21/4668 706/12 |
| 2016/0088008 | A1* | 3/2016 | Perez Ramos | H04L 63/1425 726/23 |
| 2016/0219066 | A1* | 7/2016 | Vasseur | H04L 63/1425 |
| 2021/0049467 | A1* | 2/2021 | Riedmiller | G06N 3/0445 |
| 2021/0194907 | A1* | 6/2021 | Bertiger | H04L 63/14 |

OTHER PUBLICATIONS

International Search Report and the Written Opinion dated Feb. 14, 2020 From the International Searching Authority Re. Application No. PCT/IL2019/051108. (14 Pages).
Castellano "Statistical Physics of Social Dynamics", Reviews of Modern Physics, 81(2): 591-646, Published Online May 11, 2009.
Sarkar et al. "Nonparametric Link Prediction in Dynamic Networks", Proceedings of the 29th International Conference on Machine Learning, ICML '12, p. 1897-1904, Jun. 2012.
Smug et al. "A Generalized 2D-Dynamical Mean-Field Ising Model With A Rich Set of Bifurcations (Inspired and Applied to Financial Crises)", International Journal of Bifurcation and Chaos, 28(4): 1830010-1-1830010-14, Feb. 8, 2018.
Ye et al. "Non-Classical Oscillator Model for Persistant Fluctuations in Stock Markets", Physica A: Statistical Mechanics and Its Applications, 387(5-6): 1255-1263, Available Online Oct. 25, 2007.

* cited by examiner

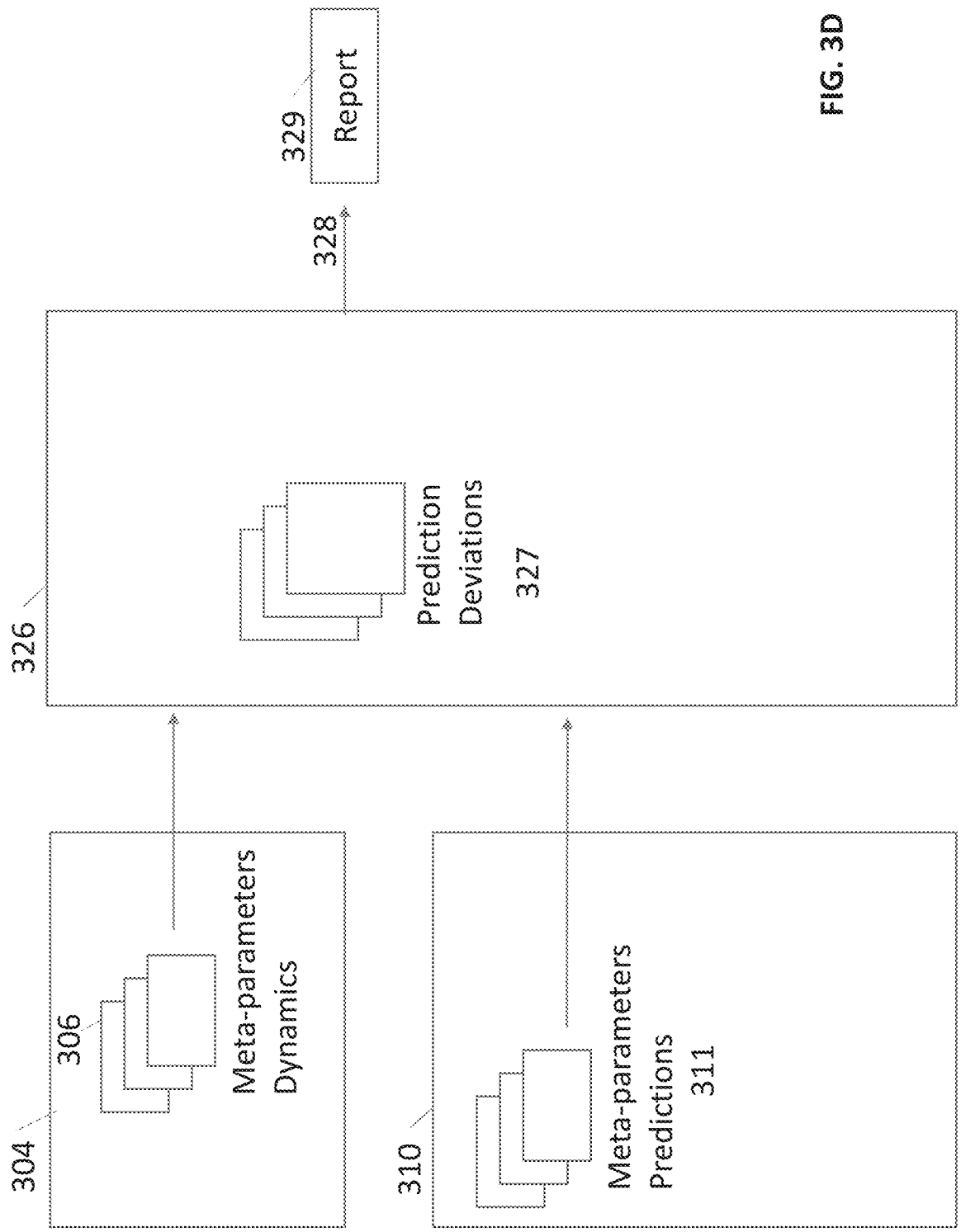

Table 1: Under-Damped Oscillator Models Parameters

| Type | $A$ | $\varphi$ | $\gamma_\infty$ | $\frac{2\pi}{\omega_0}$ (days) | $\zeta$ |
|---|---|---|---|---|---|
| $\gamma_{fit}^{out}(t)$ | -0.77 | 2.96 | 1.01 | 530.2 | 0.577 |
| $\gamma_{fit}^{in}(t)$ | 0.39 | 2.23 | 2.23 | 341.1 | 0.152 |

438

Table 2: Under-Damped Oscillator Models Derived Parameters

| Type | $\frac{1}{\lambda}$ (days) | $\frac{2\pi}{\omega}$ (days) | $k$ | $c$ |
|---|---|---|---|---|
| $\gamma_{fit}^{out}(t)$ | 146.3 | 649.1 | 1.40e−4 | 1.37e−2 |
| $\gamma_{fit}^{in}(t)$ | 356.6 | 345.6 | 3.38e−4 | 5.61e−3 |

440

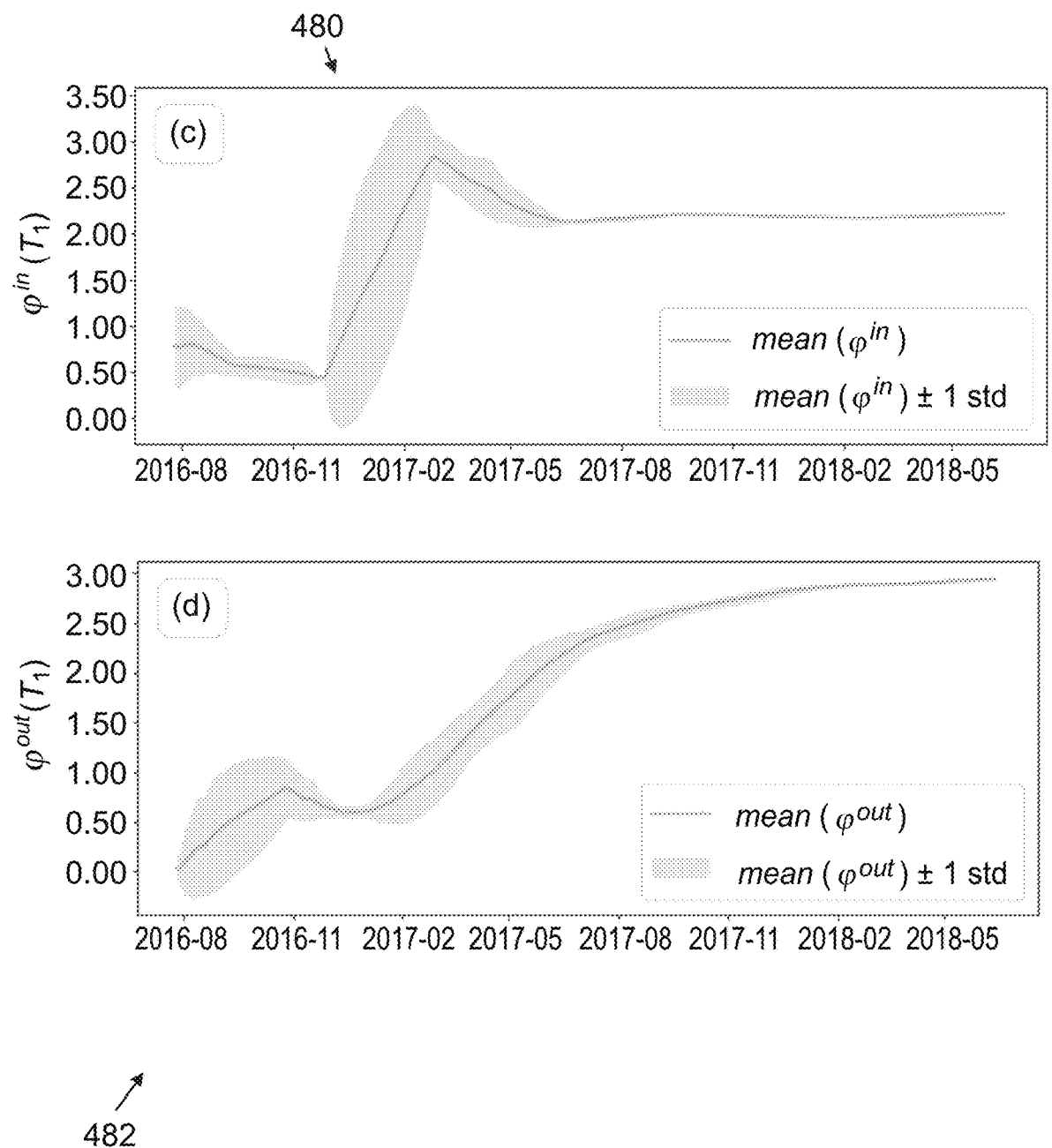
FIG. 4O (Continued - 1)

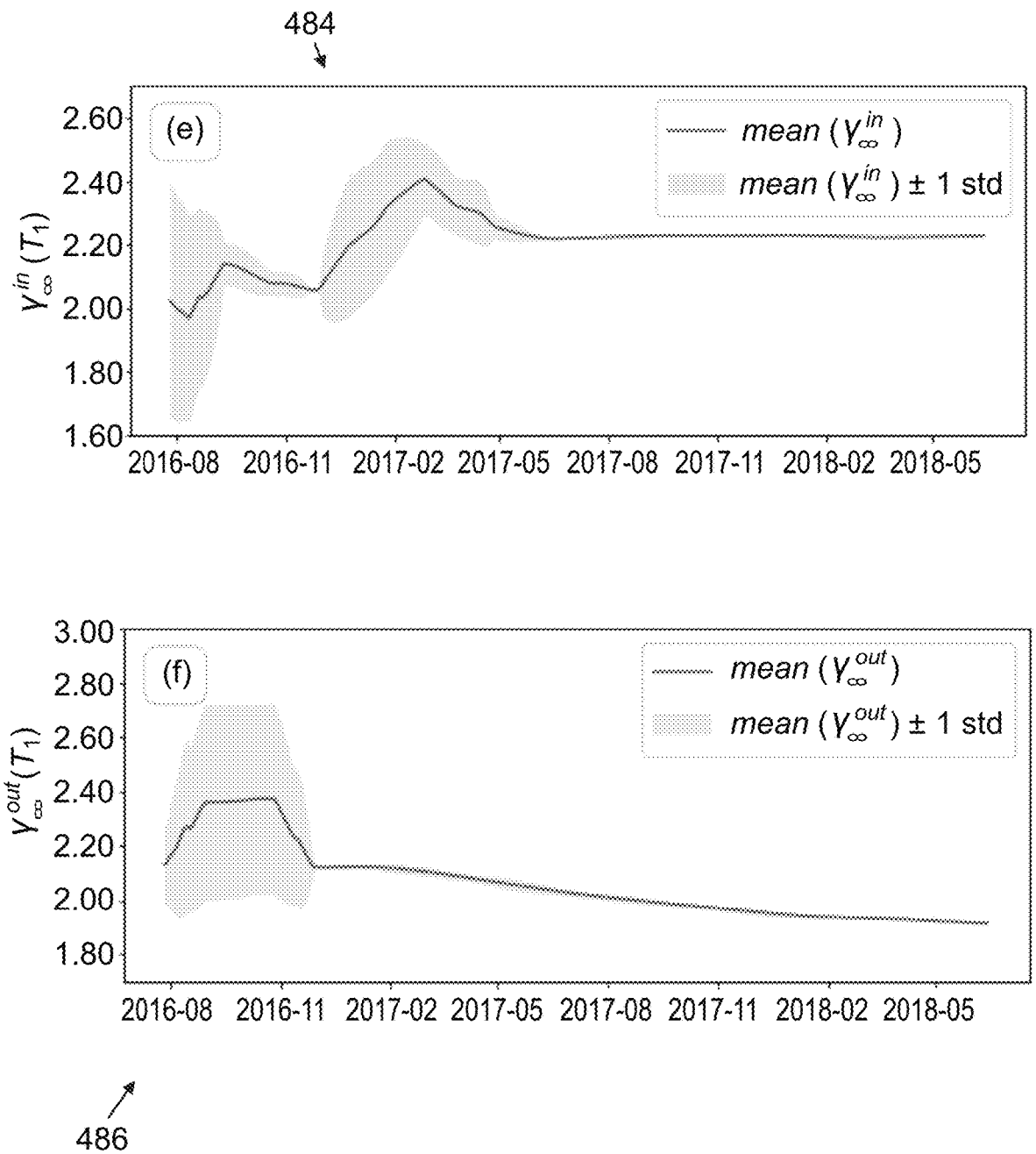
FIG. 4O (Continued - 2)

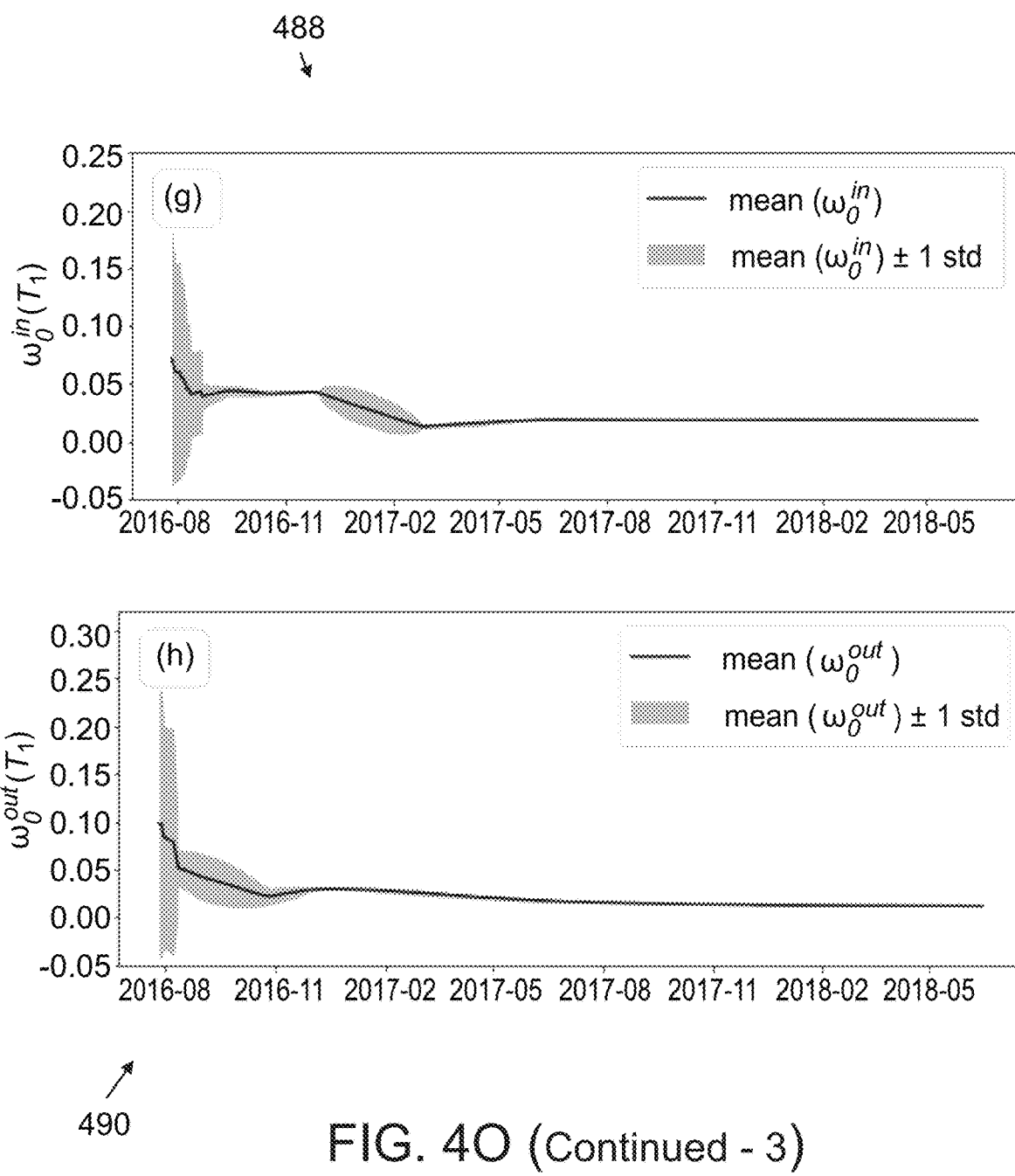
FIG. 4O (Continued - 3)

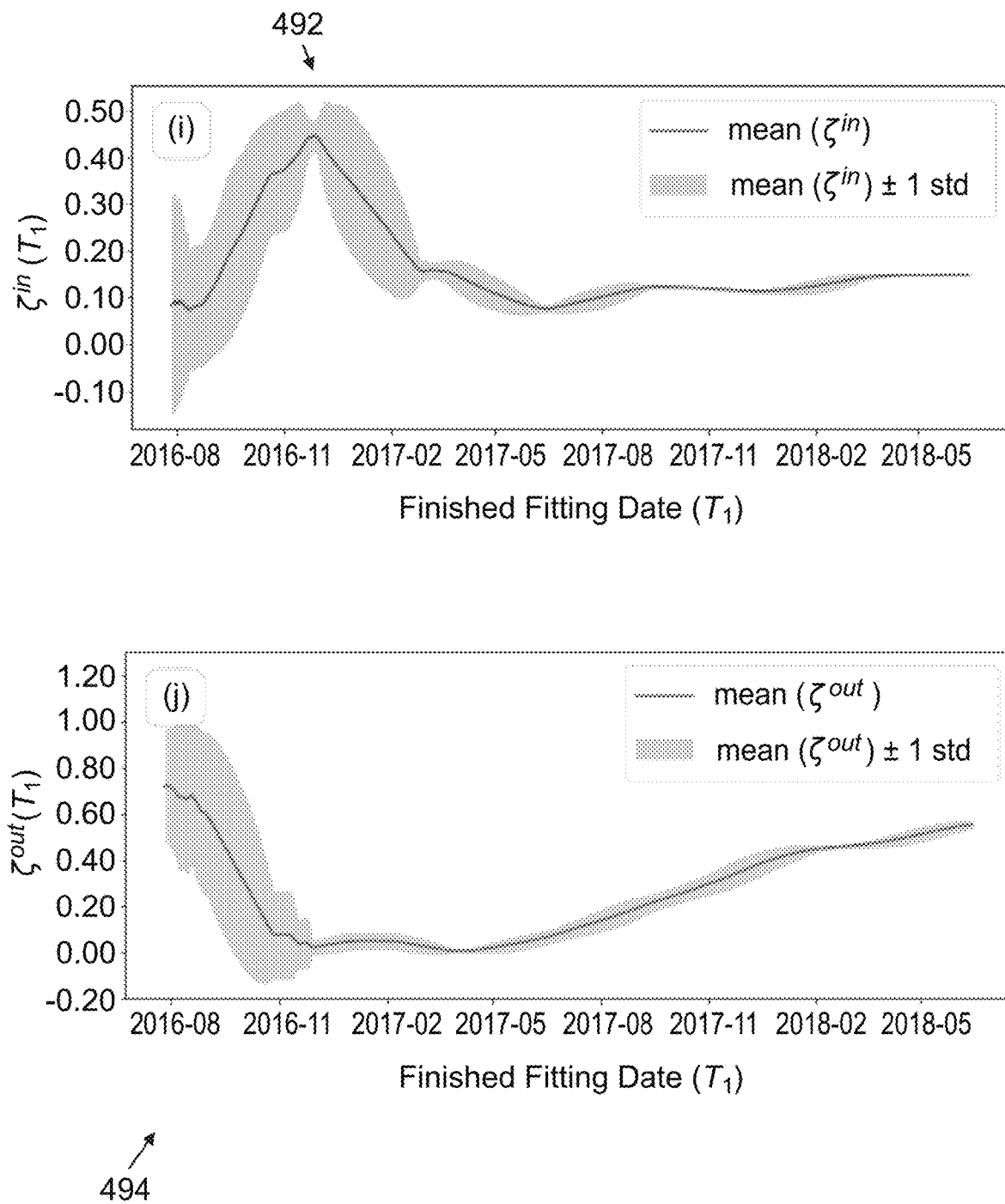
FIG. 4O (Continued - 4)

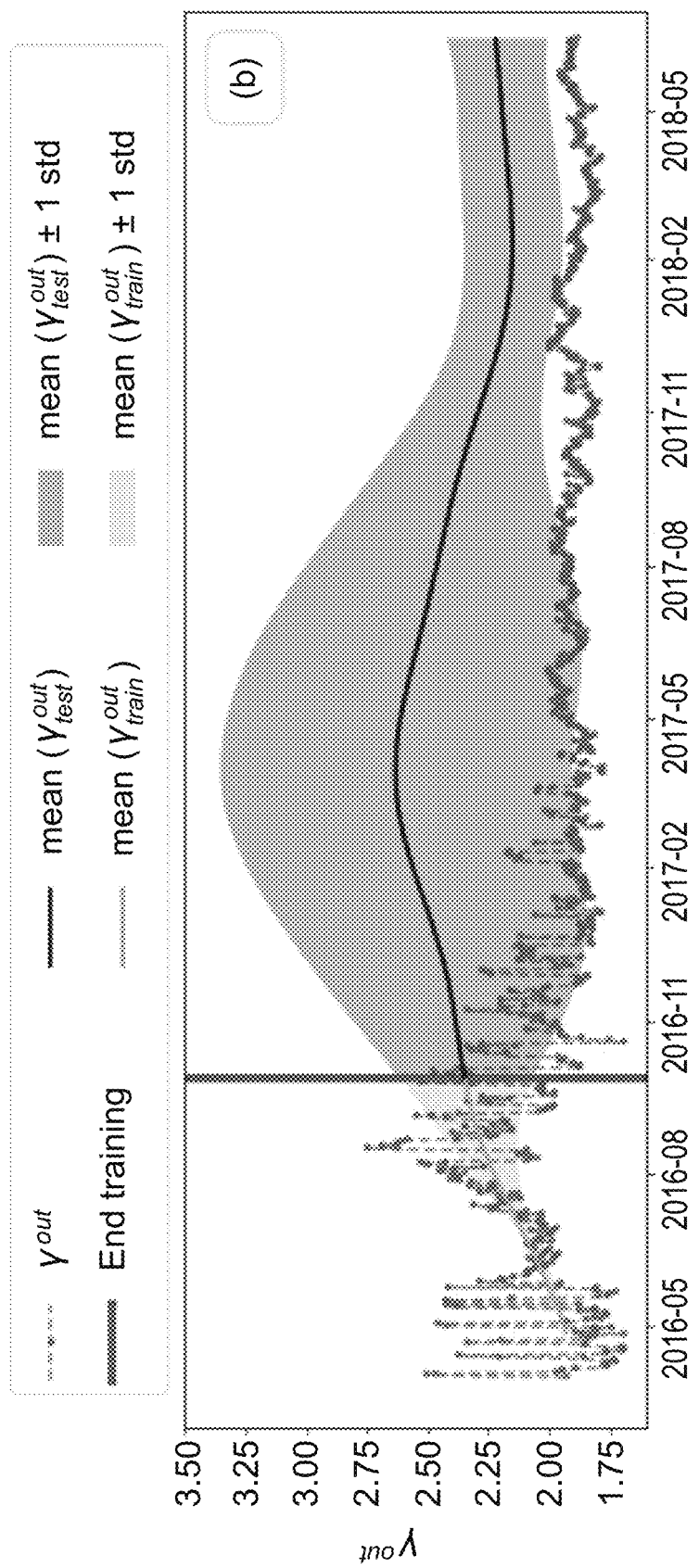
FIG. 4P (Continued - 1)

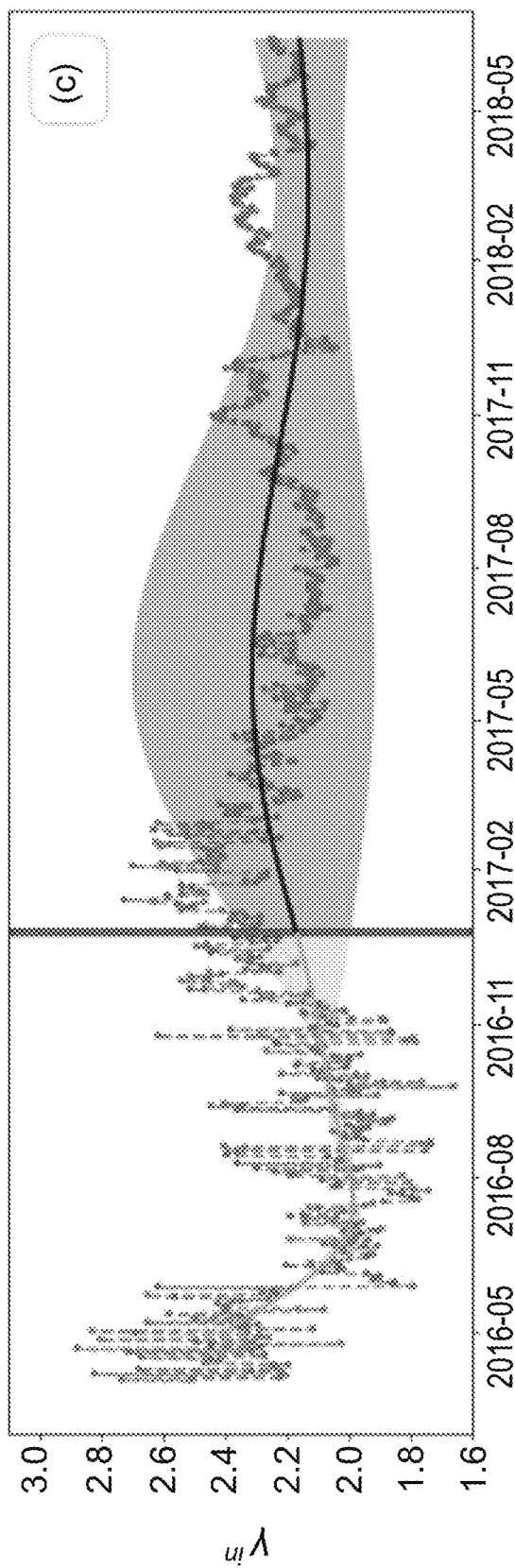
FIG. 4P (Continued - 2)

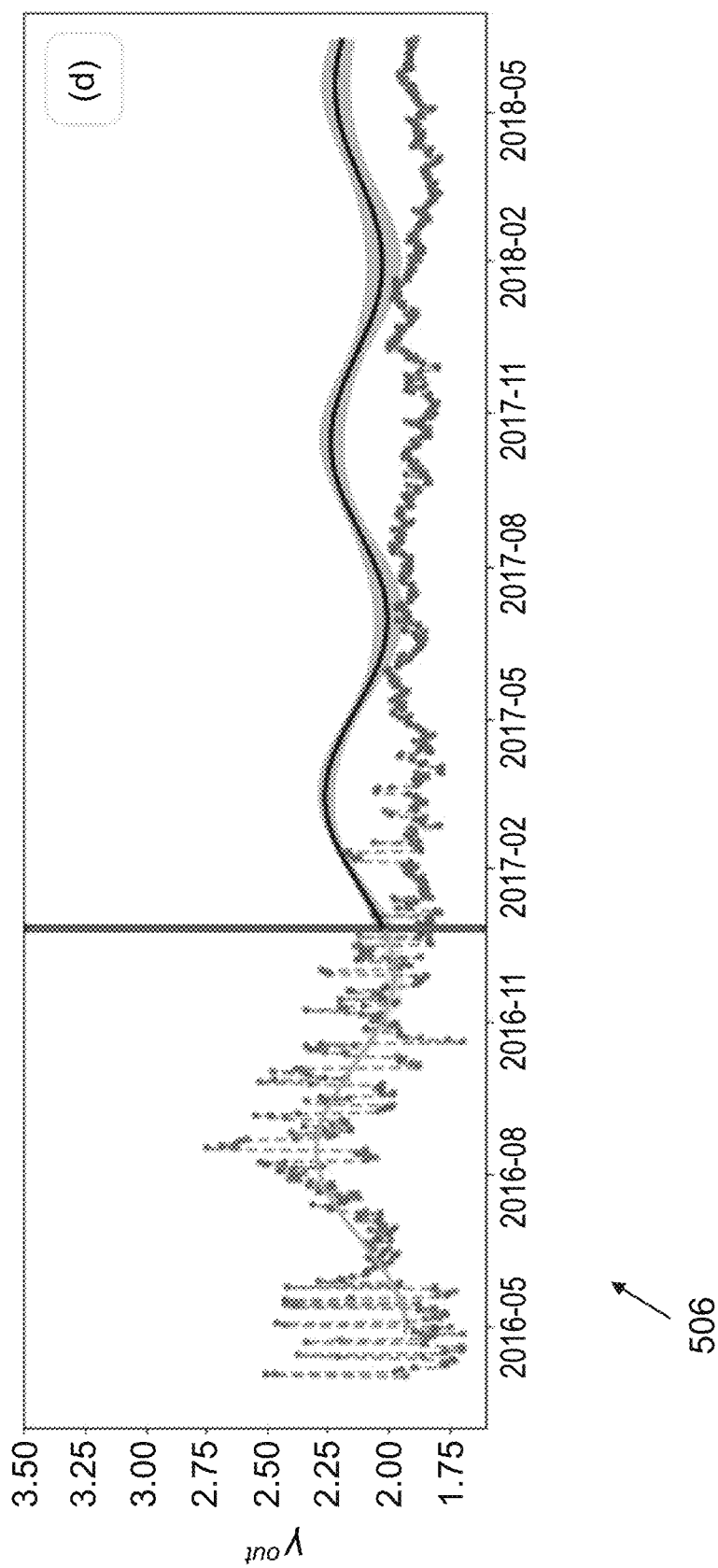
FIG. 4P (Continued - 3)

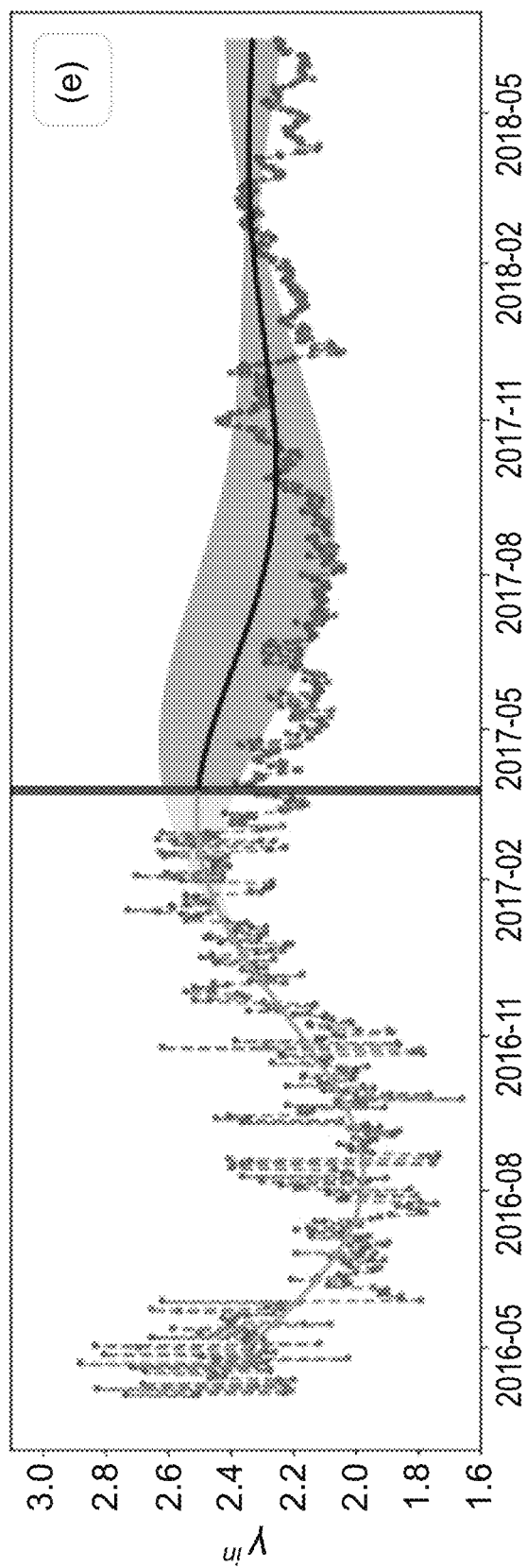
FIG. 4P (Continued - 4)

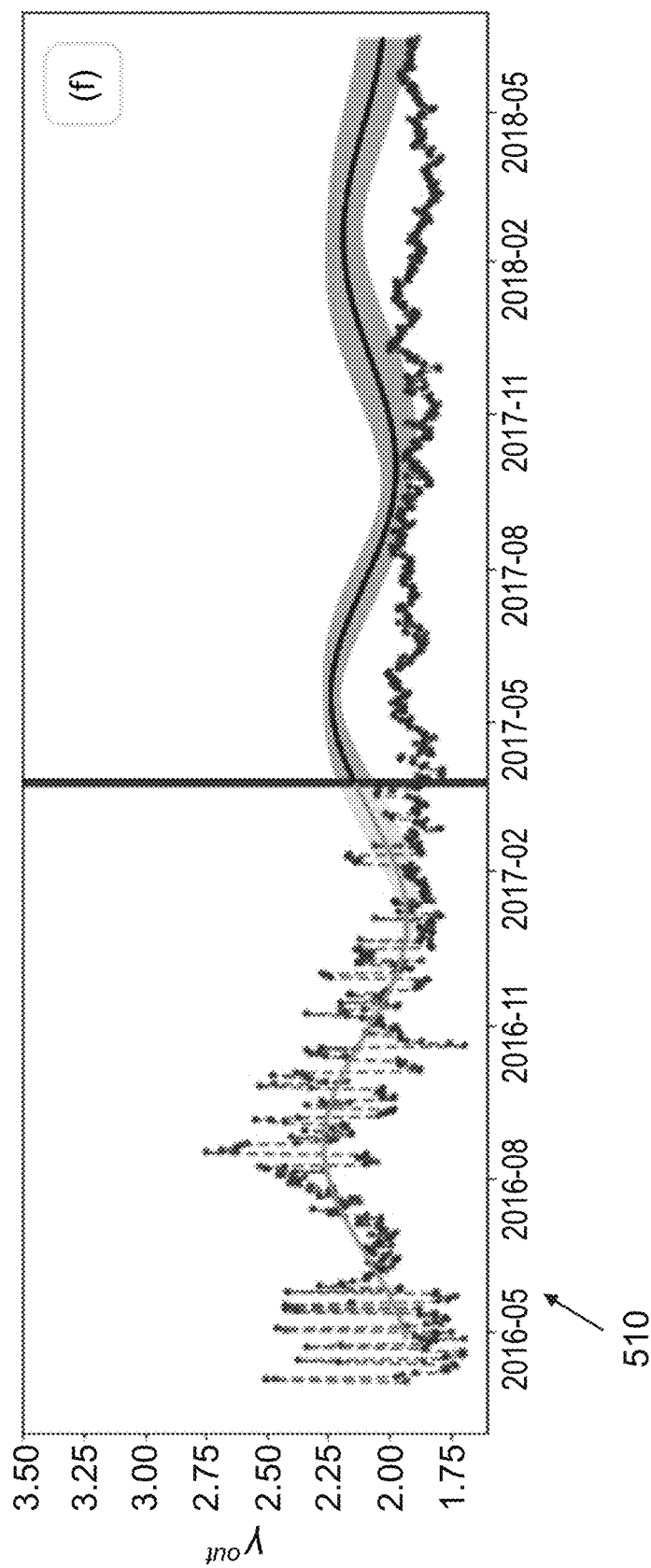
FIG. 4P (Continued - 5)

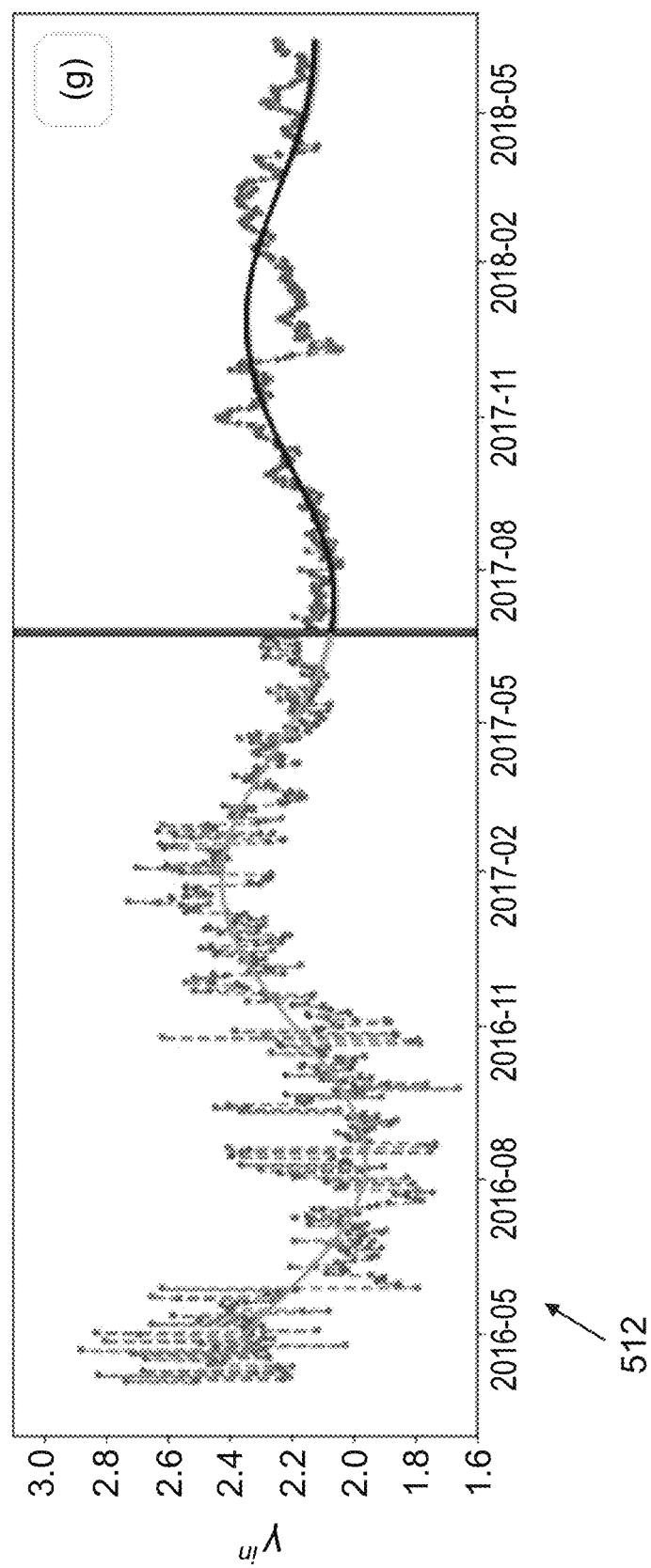
FIG. 4P (Continued - 6)

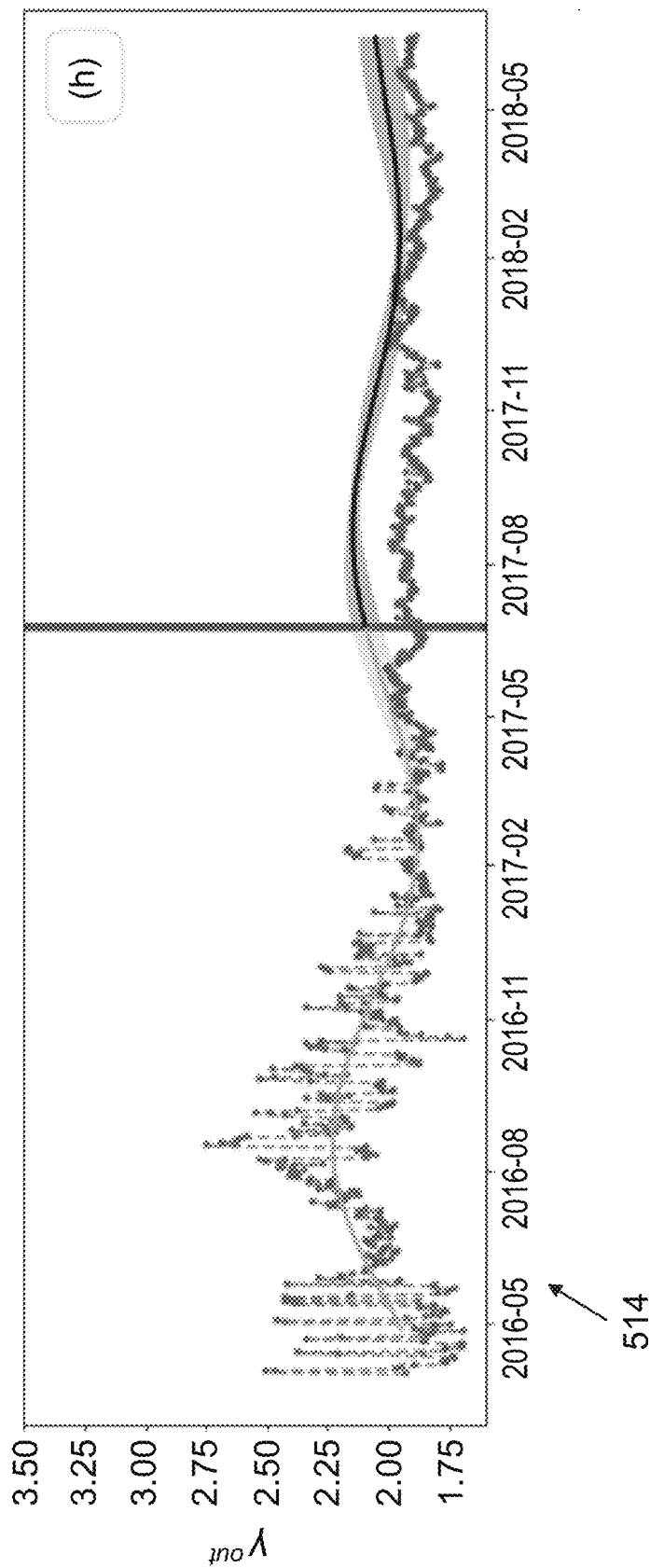
FIG. 4P (Continued - 7)

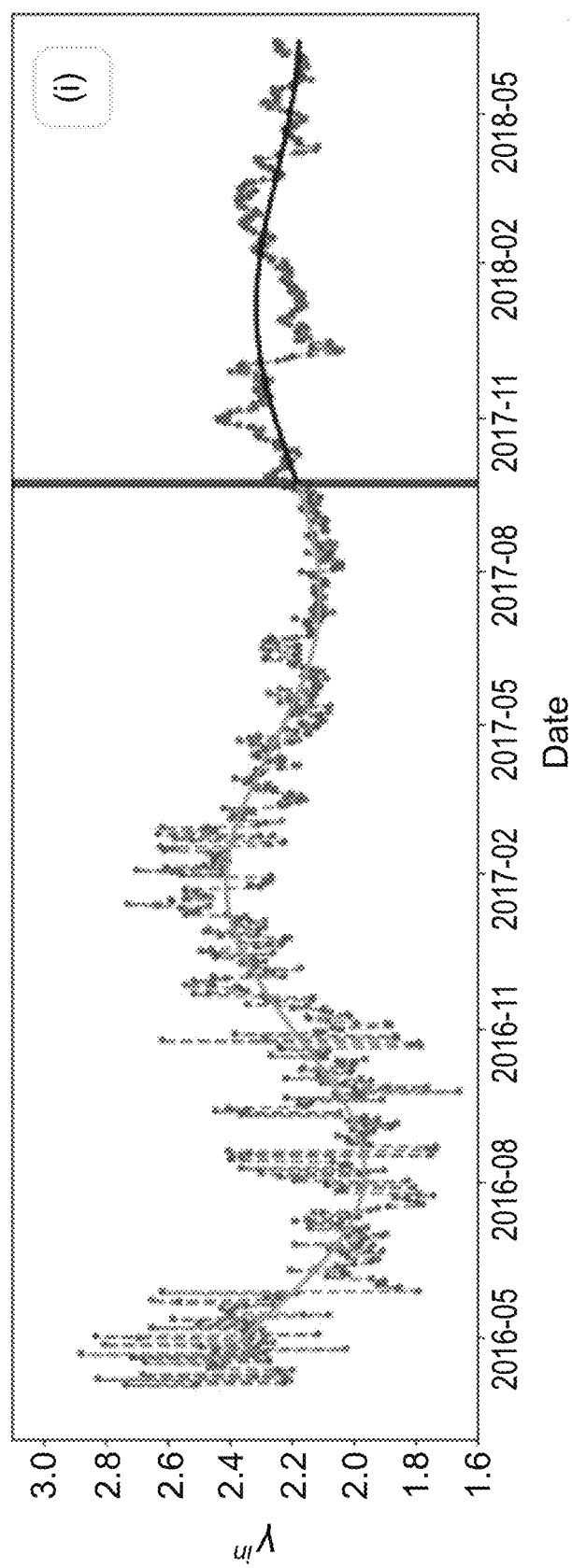
FIG. 4P (Continued - 8)

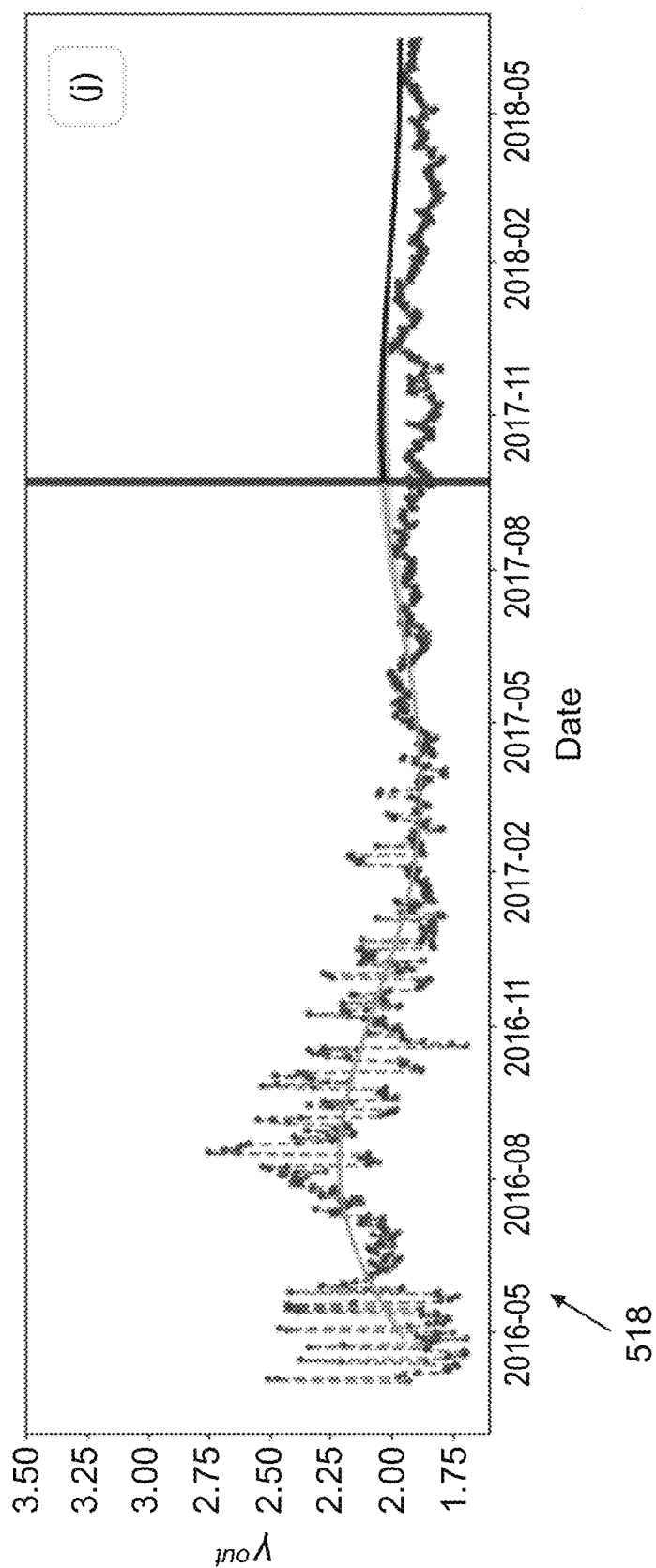
FIG. 4P (Continued - 9)

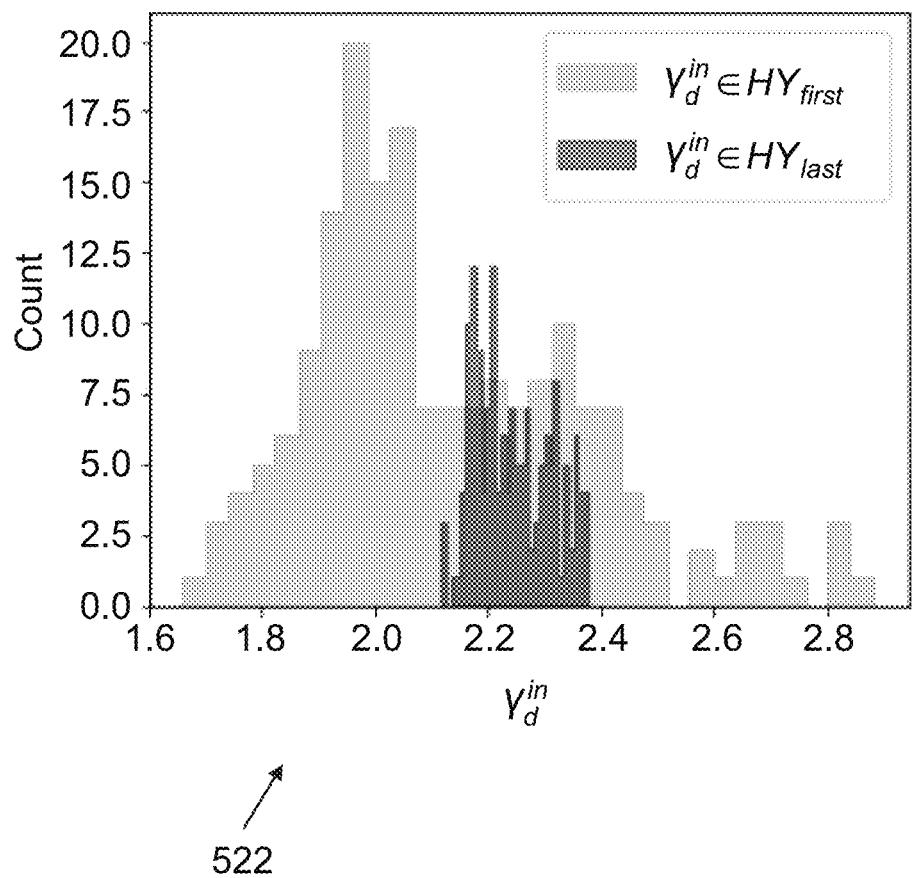
FIG. 4R (Continued - 1)

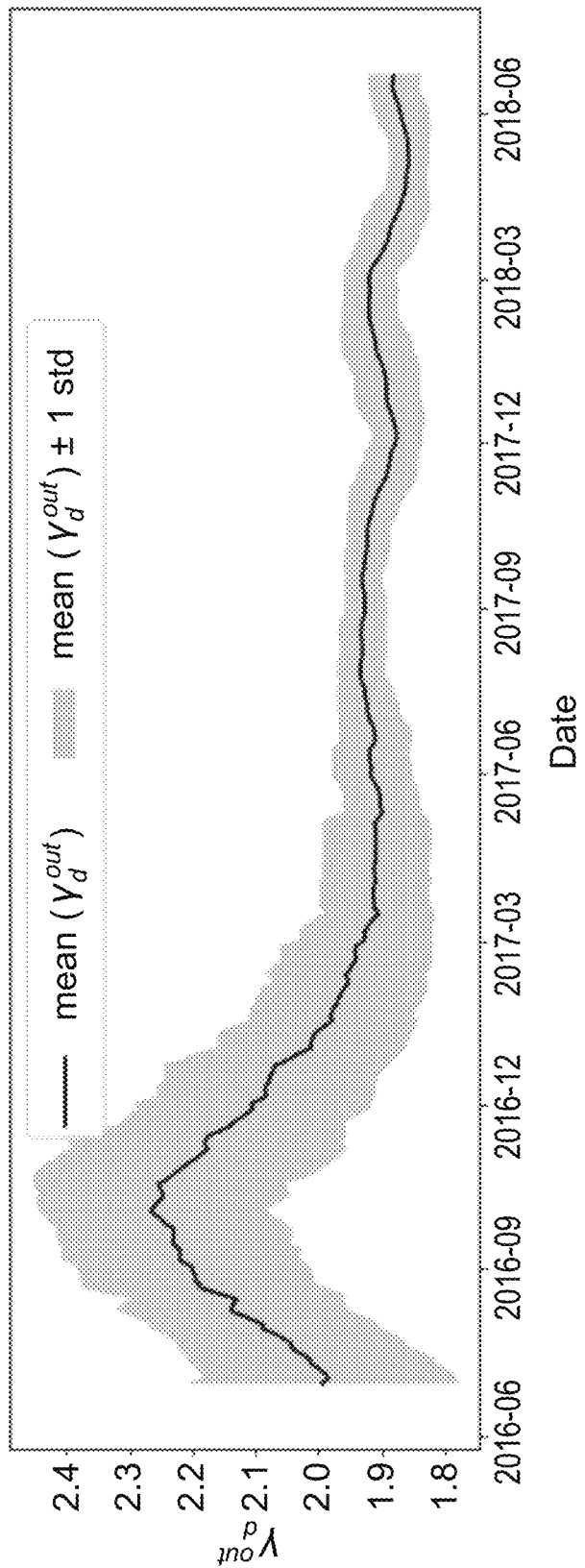
FIG. 4R (Continued - 2)

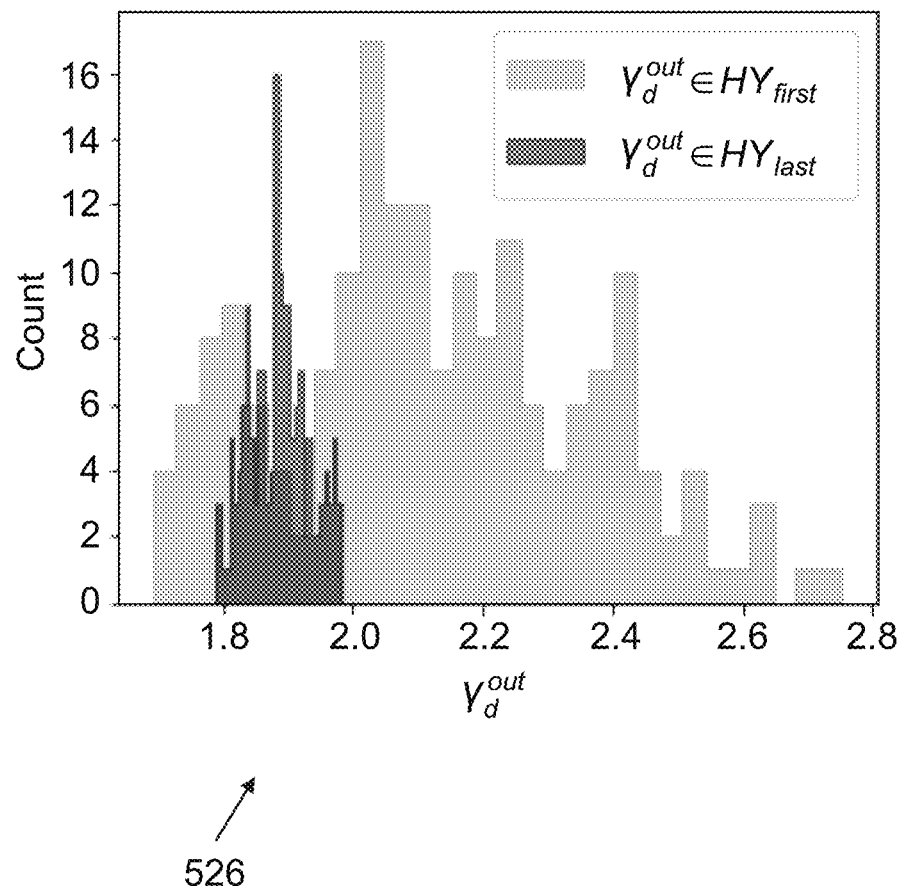
FIG. 4R (Continued - 3)

SYSTEMS AND METHODS FOR NETWORK STABILIZATION PREDICTION

RELATED APPLICATIONS

This application is a National Phase of PCT Patent Application No. PCT/IL2019/051108 having International filing date of Oct. 10, 2019, which claims the benefit of priority under 35 USC § 119(e) of U.S. Provisional Patent Application No. 62/745,474 filed on October 15, 2018. The contents of the above applications are all incorporated by reference as if fully set forth herein in their entirety.

BACKGROUND

The present invention, in some embodiments thereof, relates to networks and, more specifically, but not exclusively, to systems and methods for prediction of network dynamics.

Newly introduced networks are analyzed to determine, for example, whether the new network is able to perform its function properly, whether users using the new network are provided with the designated user experience, and whether the new network is adopted as expected by users.

SUMMARY

According to a first aspect, a method for evaluating a network by predicting stabilization of the network, comprises: providing a plurality of graphs each indicative of a respective sequential snapshot of a dynamic graph obtained over a historical time interval, the dynamic graph denoting the network, computing a plurality of sets of meta-parameters, each set of meta-parameters computed according to a respective graph of the plurality of graphs, wherein each one of the meta-parameters denotes a network level parameter computed according to a plurality of at least one of edges and nodes of the respective graphs, analyzing the plurality of sets of meta-parameters according to values computed based on a physics-based analytical model of an evolving physical system, and predicting a likelihood of stabilization of the network during a future time interval according to an indication of convergence of the values according to a convergence requirement, computed based on the physics-based analytical model during the future time interval.

According to a second aspect, a system for evaluating a network by predicting stabilization of the network, comprises: at least one hardware processor, and a non-transitory memory having stored thereon a code for execution by the at least one hardware processor, the code comprising instructions for: providing a plurality of graphs each indicative of a respective sequential snapshot of a dynamic graph obtained over a historical time interval, the dynamic graph denoting the network, computing a plurality of sets of meta-parameters, each set of meta-parameters computed according to a respective graph of the plurality of graphs, wherein each one of the meta-parameters denotes a network level parameter computed according to a plurality of at least one of edges and nodes of the respective graphs, analyzing the plurality of sets of meta-parameters according to values computed based on a physics-based analytical model of an evolving physical system, and predicting a likelihood of stabilization of the network during a future time interval according to an indication of convergence of the values according to a convergence requirement, computed based on the physics-based analytical model during the future time interval.

According to a third aspect, a computer program product for evaluating a network by predicting stabilization of the network, comprises: a non-transitory memory having stored thereon a code for execution by at least one hardware processor, the code comprising instructions for: providing a plurality of graphs each indicative of a respective sequential snapshot of a dynamic graph obtained over a historical time interval, the dynamic graph denoting the network, computing a plurality of sets of meta-parameters, each set of meta-parameters computed according to a respective graph of the plurality of graphs, wherein each one of the meta-parameters denotes a network level parameter computed according to a plurality of at least one of edges and nodes of the respective graphs, analyzing the plurality of sets of meta-parameters according to values computed based on a physics-based analytical model of an evolving physical system, and predicting a likelihood of stabilization of the network during a future time interval according to an indication of convergence of the values according to a convergence requirement, computed based on the physics-based analytical model during the future time interval.

At least some of the systems, methods, apparatus, and/or code instructions described herein address the technical problem of predicting stabilization of a network. The network may be implemented, as, for example, a new platform, service and/or digital-interaction interfaces, such as blockchain-based tokens or cryptocurrencies, new social media applications, for example, telegram, slack. The network may be a new architecture, for example, an upgrade of an existing wireless network to provide more wireless bandwidth to mobile device. The network may be based on interaction between entities that may be controlled by users and/or may be automated, for example, interactions between user accounts, for example, trading of data objects between user account, and interactions between network nodes by automatic transmission of data packets over the network. Human-behavior based platforms and/or automated based network may not necessarily succeed and stabilize, for example, becoming a mainstream tool. The ability to analyze and predict the dynamics and stabilization of such new platforms is of immense value, for example, to consumers who use them, investors who must select where to put their capital in, for regulators who follow their advance, and network architects that are attempting to design a stable hardware and/or software architecture for the network. In another example, prediction of stabilization of the network may be used to determine the timing for performing certain actions on the network. For example, analyzing the network to identify the largest and most busiest hub in order to increase bandwidth to the hub may be performed once the network has stabilized. Performing such analysis early may be futile when the network is still unstable and evolving, since upgrading the hub identified too early may be a waste of resources when the network is expected to stabilize in the future to a different hub.

Current state-of-the-art prediction tools employ, for example, machine learning algorithms to attempt and predict, for example, the value of an asset or token (e.g., value of Bitcoin), or to predict specific instance of a network component (e.g., predict the next big network hub). Such machine learning methods fail for new networks and/or new network architectures when the network's output (e.g., token value, network errors) has great fluctuations, since the new emerging networks have yet to be stable enough to enable any predictions of them. In other words, when the new network has never been stable yet, the machine learning method cannot learn what the stable network looks like, and cannot predict stability which has never been observed before. In contrast, at least some of the systems, methods, apparatus, and/or code instructions described herein are able to predict stabilization of the network, even when stabilization has never (i.e., not yet) been observed.

At least some of the systems, methods, apparatus, and/or code instructions described herein improve the technical field of network evaluation, by providing an improved process for predicting stabilization of network. Stabilization of networks may be predicted, even when the network has never yet been stable, and/or for networks where snapshot graphs of the network are different from one another (e.g., have different nodes and/or edges between nodes). While each graph in the sequence may be composed of different nodes and edges, the meta-parameters of the graphs may be extracted for each graph of the sequence. Conceptually, the result is a capture of dynamics of the network as a whole, characterized by the dynamics of the meta-parameters. In contrast, other methods of analyzing networks are based, for example, on static network parameters which do not fully capture dynamic behavior of the network and therefore are less accurate in prediction of stabilization, and/or dynamics of the output of the network (e.g., value of token) which do not fully consider the architecture of the network and/or internal components of the network and therefore are less accurate in prediction of stabilization.

It is noted that for an old and stable network, even though the network has different nodes and edges that dynamically change (e.g., every hour, every day, every 3 days, every week, or other time intervals), the meta-parameters may be expected to be stable, mathematically denoted as gamma(t)=$\gamma_\infty$, i.e does not change over time. However, for a new and emerging network, for example a new cryptocurrency that is only now introduced and slowly gets picked up by users, and/or a new network architecture that is newly introduced, the entire network changes, along with the meta-parameters. At least some of the systems, methods, apparatus, and/or code instructions described herein predict likelihood of future stabilization of such new and/or emerging networks.

It is noted that even if networks do fit a power-law degree distribution, there is no indication that such networks may stabilize. Moreover, for networks that do not currently fit a power-law degree distribution, there are no known methods for predicting when such networks will eventually converge to fit a power-law degree distribution. It is the inventors that discovered that networks may be predicted to converge according to an analysis of dynamics of power distributions over a historical time interval, as described herein.

Traditional approaches for analyzing evolution of networks through time may conclude that such networks are highly unstable, and/or unpredictable. Using such approaches, the erratic behaviour, across multiple properties, might imply the network's inability to reach equilibrium. Moreover, such networks may be highly diverse and/or non-homogenous, making their analysis and prediction using traditional approaches difficult and/or impossible to reach accurately. In contrast, in comparison to traditional approaches at least some implementations of the systems, methods, apparatus, and/or code instructions described herein provide a process for predicting stabilization of such networks that appear as unstable and/or unpredictable and/or are extremely diverse and/or nonhomogenous. The prediction of stabilization may be performed where traditional approaches are unable to predict stabilization of such networks, and/or the prediction of stabilization may be more accurate relative to traditional approaches.

In a further implementation form of the first, second, and third aspects, the method further comprises and/or the system further comprises code instructions for and/or the computer program product further comprises additional instructions for predicting a likelihood of non-stabilization of the network during the future time interval according to an indication of non-convergence of the values according to the convergence requirement, computed based on the physics-based analytical model during the future time interval, generating instructions for adjustment of at least one component of the network to create an adjusted network, and iterating, for a the adjusted network, the providing, the computing the plurality of sets of meta-parameters, the analyzing, the predicting and the generating, until the indication of convergence is obtained.

In a further implementation form of the first, second, and third aspects, the plurality of sets of meta-parameters comprise a sequence of degree distribution power law coefficients, each degree distribution power law coefficient computed for each graph of the plurality of graphs.

In a further implementation form of the first, second, and third aspects, the plurality of sets of meta-parameters comprise a sequence of average shortest paths, each average shortest path computed for each graph of the plurality of graphs.

In a further implementation form of the first, second, and third aspects, the physics-based analytical model of the evolving physical system comprises a harmonic oscillator.

In a further implementation form of the first, second, and third aspects, the harmonic oscillator comprises a damped harmonic oscillator.

In a further implementation form of the first, second, and third aspects, the analyzing comprises fitting the set of meta-parameters to the physics-based analytical model using a best fit process.

In a further implementation form of the first, second, and third aspects, analyzing comprises fitting a sequence of degree distribution power law coefficients computed for respective graphs over the historic time interval to a damped harmonic oscillator denoted as:

$$\gamma_{fit}(t) = A \cdot e^{-\omega_0 \zeta t} \cdot \sin(\omega_0 \sqrt{1-\zeta^2} t + \varphi) + \gamma_\infty$$

wherein:
$\gamma$ denotes a constant stable state,
$\lambda = \omega_0 \zeta$ denotes exponential decay of the under-damped oscillator, wherein $1/\lambda$ denotes a prediction of the future time interval when evolution of the network stabilizes,
$\omega = \omega_0 \sqrt{1-\zeta^2}$ denotes angular frequency,
$\gamma_\infty$ denotes a stable value of the degree-distribution power-law coefficient indicative of a stable state to which the network converges,
A denotes maximal amplitude of the oscillator, and
$\varphi$ denotes phase shift.

In a further implementation form of the first, second, and third aspects, the likelihood of stabilization of the network is computed according to a predicted convergence of future values of the set of meta-parameters for the future time interval.

In a further implementation form of the first, second, and third aspects, the future values of the set of meta-parameters are predicted according to the physics-based analytical model.

In a further implementation form of the first, second, and third aspects, the method further comprises and/or the system further comprises code instructions for and/or the computer program product further comprises additional instructions for providing at least one of: an indication of predicted future values of meta-parameters during the predicted stabilization of the network, and an indication of the future time interval associated with the predicted stabilization of the network.

In a further implementation form of the first, second, and third aspects, the method further comprises and/or the system further comprises code instructions for and/or the computer program product further comprises additional instructions for providing an indication of confidence level associated with at least one of: the predicted likelihood of stabilization of the network, the predicted future values of the meta-parameters during the predicted stabilization of the network, and the future time interval associated with the predicted stabilization of the network.

In a further implementation form of the first, second, and third aspects, temporally adjacent graphs of the plurality of graphs overlap in at least one common node, and each graph of the plurality of graphs has a unique combination of nodes and edges that is not present in any other graph.

In a further implementation form of the first, second, and third aspects, nodes of the graphs denote entities of the network, and edges of the graphs denote interactions between the entities.

In a further implementation form of the first, second, and third aspects, entities are selected from the group consisting of: user accounts, wallets, social network accounts, bank accounts, shopping accounts, email accounts, gaming application, blockchain user accounts, mobile device, smartphone, standard phones, servers, applications being used by the user, and client terminals.

In a further implementation form of the first, second, and third aspects, edges are selected from the group consisting of: calls, multimedia objects sent from one entity to another entity, financial transactions, a game played by two or more entities, transactions associated with smart contracts, and transfer of blockchain-based tokens or cryptocurrencies.

In a further implementation form of the first, second, and third aspects, the method further comprises and/or the system further comprises code instructions for and/or the computer program product further comprises additional instructions for performing a post-hoc analysis at a current time interval after the future time interval by analyzing a current state of the network in comparison to the predicted likelihood of stabilization of the network during the future time interval, and generating an indication of the analysis.

In a further implementation form of the first, second, and third aspects, the analyzing comprises detecting a statistically significant difference between the current state of the network and the predicted likelihood of stabilization of the network, and wherein the generated indication comprises an indication of an abnormality in the network.

In a further implementation form of the first, second, and third aspects, the statistically significant difference comprises predicted oscillations that have not occurred, and wherein the abnormality comprises an indication of a dampening effect.

In a further implementation form of the first, second, and third aspects, the statistically significant difference comprises an over estimation of an equilibrium degree distribution, and wherein the abnormality comprises an indication appearance in the network of larger than expected hubs.

In a further implementation form of the first, second, and third aspects, the method further comprises and/or the system further comprises code instructions for and/or the computer program product further comprises additional instructions for computing the dynamic graph according to the network.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3A-3D are dataflow diagrams depicting an exemplary process for evaluating a network by predicting stabilization of the network, based on multiple graphs each indicative of a respective sequential snapshot of a dynamic graph representation, of a network obtained over a historical time interval, in accordance with some embodiments of the present invention.

DETAILED DESCRIPTION

Figure 1:
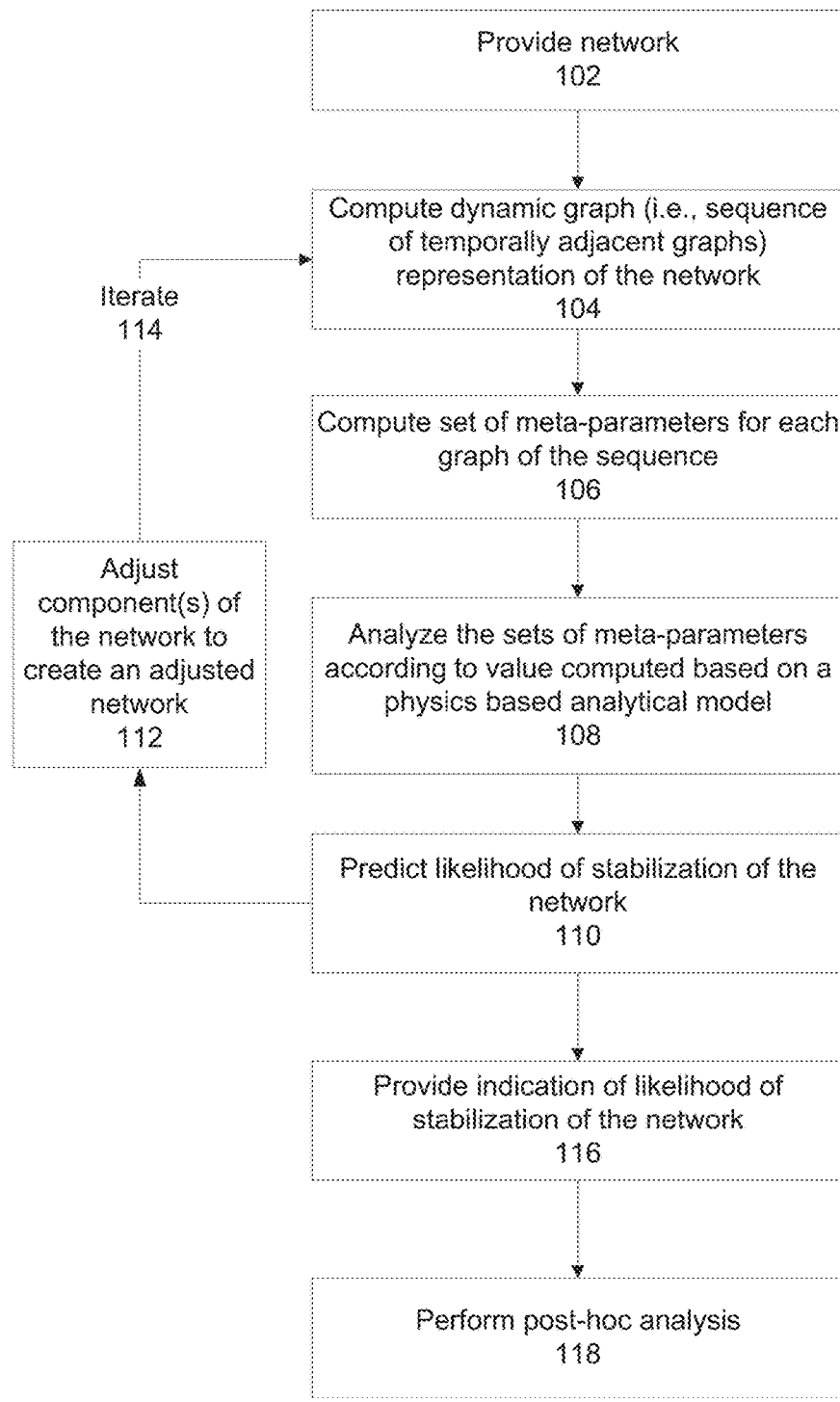
FIG. 1 is a is a flowchart of a method for evaluating a network by predicting stabilization of the network, based on multiple graphs each indicative of a respective sequential snapshot of a dynamic graph representation of the network obtained over a historical time interval, in accordance with some embodiments of the present invention.

The present invention, in some embodiments thereof, relates to networks and, more specifically, but not exclusively, to systems and methods for prediction of network dynamics.

As used herein, the term temporally adjacent graphs, or sequence of temporally adjacent graphs refers to graphs that are sequentially arranged in time, where a certain graph appears at time t and a next graph following the certain graph appears at time t+delta. The temporally adjacent graphs form the dynamic graph representation of the network.

An aspect of some embodiments of the present invention relates to systems, an apparatus, methods, and/or code instructions (i.e., stored on a data storage device for execution by at least one hardware processor) for evaluating a network by predicting stabilization of the network. A dynamic graph representation of the network is provided and/or computed. The dynamic graph is represented by multiple graphs, each indicative of a respective sequential snapshot of the dynamic graph obtained over a historical time interval. Multiple sets of meta-parameters are computed, where each set of meta-parameters is computed according to a respective graph. Each one of the meta-parameters denotes a network level parameter computed according to multiple edges and/or nodes of the respective graph. Exemplary meta-parameters include: degree distribution power law coefficients, and average shortest path. The multiple of sets of meta-parameters are analyzed according to values computed based on a physics-based analytical model of an evolving physical system, optionally a harmonic oscillator, optionally a damped harmonic oscillator. A likelihood of stabilization of the network during a future time interval is predicted according to an indication of convergence of the values according to a convergence requirement computed based on the physics-based analytical model during the future time interval.

Stabilization of the network during the future time interval may be indicative of, for example, that the network has reached a mature state in which a crash and/or other major failure of the entire network is highly unlikely, and/or that the network has reached a steady state and is unlikely to further evolve outside of the steady state.

The network includes entities that interact with one another. Optionally, the network is a decentralized network. The nodes of the graphs created based on the network may denote the entities of the network. The edges between the nodes may denote interactions between the entities. Exemplary entities include: user accounts, client terminal, and applications. Entities may interact with one another in response to instructions triggered by human users (e.g., a user making a selection using a GUI and/or generating instructions another user interface), for example, transactions between user accounts, sending multimedia objects between social network accounts of users, and performing financial transactions from bank accounts and/or wallet (e.g., purchasing or selling cryptocurrency tokens) of users. Entities may be automated processed executed by network connected devices, for example, network nodes (e.g., client terminals, routers, servers) that transmit network messages between one another. Exemplary networks include: new blockchain-based tokens, new social media platforms, and new communication network architectures (e.g., new wireless architecture, new components, new connections between components). For example, the network is based on transfer (i.e., transactions) of cryptocurrency (e.g., a newly introduced token) between digital wallets of users, where transfer is directed and performed for a source wallet to a destination wallet.

Optionally, a likelihood of non-stabilization of the network during the future time interval is predicted according to an indication of non-convergence of the values according to the convergence requirement, computed based on the physics-based analytical model during the future time interval. When likelihood of non-stabilization of the network is detected, instructions for adjustment of one or more components of the network may be generated to create an adjusted network. The process is iterated for the adjusted network, until the indication of convergence is obtained. In this manner, a network architecture which is predicted to be unstable in the future may be adjusted to create a network adjusted that is predicted to be stable in the future.

At least some of the systems, methods, apparatus, and/or code instructions described herein address the technical problem of predicting stabilization of a network. The network may be implemented, as, for example, a new platform, service and/or digital-interaction interfaces, such as blockchain-based tokens or cryptocurrencies, new social media applications, for example, telegram, slack. The network may be a new architecture, for example, an upgrade of an existing wireless network to provide more wireless bandwidth to mobile device. The network may be based on interaction between entities that may be controlled by users and/or may be automated, for example, interactions between user accounts, for example, trading of data objects between user account, and interactions between network nodes by automatic transmission of data packets over the network. Human-behavior based platforms and/or automated based network may not necessarily succeed and stabilize, for example, becoming a mainstream tool. The ability to analyze and predict the dynamics and stabilization of such new platforms is of immense value, for example, to consumers who use them, investors who must select where to put their capital in, for regulators who follow their advance, and network architects that are attempting to design a stable hardware and/or software architecture for the network. In another example, prediction of stabilization of the network may be used to determine the timing for performing certain actions on the network. For example, analyzing the network to identify the largest and most busiest hub in order to increase bandwidth to the hub may be performed once the network has stabilized. Performing such analysis early may be futile when the network is still unstable and evolving, since upgrading the hub identified too early may be a waste of resources when the network is expected to stabilize in the future to a different hub.

Current state-of-the-art prediction tools employ, for example, machine learning algorithms to attempt and predict, for example, the value of an asset or token (e.g., value of Bitcoin), or to predict specific instance of a network component (e.g., predict the next big network hub). Such machine learning methods fail for new networks and/or new network architectures when the network's output (e.g., token value, network errors) has great fluctuations, since the new emerging networks have yet to be stable enough to enable any predictions of them. In other words, when the new network has never been stable yet, the machine learning method cannot learn what the stable network looks like, and cannot predict stability which has never been observed before. In contrast, at least some of the systems, methods, apparatus, and/or code instructions described herein are able to predict stabilization of the network, even when stabilization has never (i.e., not yet) been observed.

At least some of the systems, methods, apparatus, and/or code instructions described herein improve the technical field of network evaluation, by providing an improved process for predicting stabilization of network. Stabilization of networks may be predicted, even when the network has never yet been stable, and/or for networks where snapshot graphs of the network are different from one another (e.g., have different nodes and/or edges between nodes). While each graph in the sequence may be composed of different nodes and edges, the meta-parameters of the graphs may be extracted for each graph of the sequence. Conceptually, the result is a capture of dynamics of the network as a whole, characterized by the dynamics of the meta-parameters. In contrast, other methods of analyzing networks are based, example, on static network parameters which do not fully capture dynamic behavior of the network and therefore are less accurate in prediction of stabilization, and/or dynamics of the output of the network (e.g., value of token) which do not fully consider the architecture of the network and/or internal components of the network and therefore are less accurate in prediction of stabilization.

It is noted that for an old and stable network, even though the network has different nodes and edges that dynamically change (e.g., every hour, every day, every 3 days, every week, or other time intervals), the meta-parameters may be expected to be stable, mathematically denoted as gamma(t)=$\gamma_\infty$, i.e does not change over time. However, for a new and emerging network, for example a new cryptocurrency that is only now introduced and slowly gets picked up by users, and/or a new network architecture that is newly introduced, the entire network changes, along with the meta-parameters. At least some of the systems, methods, apparatus, and/or code instructions described herein predict likelihood of future stabilization of such new and/or emerging networks.

It is noted that even if networks do fit a power-law degree distribution, there is no indication that such networks may stabilize. Moreover, for networks that do not currently fit a power-law degree distribution, there are no known methods for predicting when such networks will eventually converge to fit a power-law degree distribution. It is the inventors that discovered that networks may be predicted to converge according to an analysis of dynamics of power distributions over a historical time interval, as described herein.

Traditional approaches for analyzing evolution of networks through time may conclude that such networks are highly unstable, and/or unpredictable. Using such approaches, the erratic behaviour, across multiple properties, might imply the network's inability to reach equilibrium. Moreover, such networks may be highly diverse and/or non-homogenous, making their analysis and prediction using traditional approaches difficult and/or impossible to reach accurately. In contrast, in comparison to traditional approaches at least some implementations of the systems, methods, apparatus, and/or code instructions described herein provide a process for predicting stabilization of such networks that appear as unstable and/or unpredictable and/or are extremely diverse and/or nonhomogenous. The prediction of stabilization may be performed where traditional approaches are unable to predict stabilization of such networks, and/or the prediction of stabilization may be more accurate relative to traditional approaches.

Some examples of previous approaches for analyzing networks are now described, the shortcomings of which are addresses by at least some implementations of the systems, methods, apparatus, and/or code instructions described herein.

For example, there has been a surge in recent years in the attempt to model social dynamics via statistical physics tools (e.g., as described with reference to C. Castellano, S. Fortunato, and V. Loreto, "*Statistical physics of social dynamics,*" *Reviews of modern physics*, vol. 81, no. 2, p. 591, 2009), ranging from opinion dynamics, through crowd behaviors to language dynamics. The physical tools used are also varied, ranging from Ising models (e.g., as described with reference to D. Smug, D. Sornette, and P. Ashwin, "*A generalized 2d-dynamical mean-field ising model with a rich set of bifurcations (inspired and applied to financial crises),*" *International Journal of Bifurcation and Chaos*, vol. 28, no. 04, p. 1830010, 2018) to topology analysis ((e.g., as described with reference to C. Castellano). More specifically, previous studies have implemented physics-based approaches to the analysis of economic markets. Econophysics have attempted to describe the dynamical nature of the economy with different, and increasingly sophisticated physical models. Frisch (e.g., as described with reference to R. Frisch et al., "*Propagation problems and impulse problems in dynamic economics,*" 1933) has suggested to use a damped oscillator model to the economy post wars or disasters, with the assumption that there is an equilibrium state that has been perturbed. Since then, many new models have been suggested, ranging from quantum mechanical models (e.g., as described with reference to C. Ye and J. Huang, "*Non-classical oscillator model for persistent fluctuations in stock markets,*" *Physica A: Statistical Mechanics and its Applications*, vol. 387, no. 5-6, pp. 1255-1263, 2008, and C. P. Goncalves, "*Quantum financial economics-risk and returns,*" *Journal of Systems Science and Complexity*, vol. 26, no. 2, pp. 187-200, 2013) to chaos theory (e.g., as described with reference to R. M. Goodwin, "*The economy as a chaotic growth oscillator,*" in *The Dynamics of the Wealth of Nations*, pp. 300-310, Springer, 1993, and T. Puu, *Attractors, bifurcations, & chaos: Nonlinear phenomena in economics*. Springer Science & Business Media, 2013). However, all of these models have attempted to describe the economy, represented by a singular value, e.g. stock market prices, whereas the underlying network of the economy has not been addressed. In contrast, at least some implementations of the systems, methods, apparatus, and/or code instructions described herein analyze the network as a whole to predict future stabilization of the network.

In another example, network science has exceedingly contributed to multiple and diverse scientific disciplines in the past two decades, by examining diverse network related parameters. Applying network analysis and graph theory have assisted in revealing the structure and dynamics of complex systems by representing them as networks, including social networks theory (e.g., as described with reference to A. Barrat, M. Barthelemy, and A. Vespignani, *Dynamical processes on complex networks*. Cambridge university press, 2008, M. E. Newman, "*The structure and function of complex networks,*" *SIAM review*, vol. 45, no. 2, pp. 167-256, 2003, M. E. Newman, "*Power laws, pareto distributions and zipf's law,*" *Contemporary physics*, vol. 46, no. 5, pp. 323-351, 2005), computer communication networks (e.g., as described with reference to R. Pastor-Satorras and A. Vespignani, *Evolution and structure of the Internet: A statistical physics approach*. Cambridge University Press, 2007), biological systems (e.g., as described with reference to A.-L. Barabasi and Z. N. Oltvai, "*Network biology: understanding the cell's functional organization,*" *Nature reviews genetics*, vol. 5, no. 2, p. 101, 2004), transportation (e.g., as described with reference to E. Shmueli, I. Mazeh, L. Radaelli, A. S. Pentland, and Y. Altshuler, "*Ride sharing: a network perspective,*" in *International Conference on Social Computing, Behavioral-Cultural Modeling, and Prediction*, pp. 434-439, Springer, 2015, Y. Altshuler, R. Puzis, Y. Elovici, S. Bekhor, and A. S. Pentland, "*On the rationality and optimality of transportation networks defense: a network centrality approach,*" *Securing Transportation Systems*, pp. 35-63, 2015), internet of things (TOT) (e.g., as described with reference to Y. Altshuler, M. Fire, N. Aharony, Y. Elovici, and A. Pentland, "*How many makes a crowd? on the correlation between groups' size and the accuracy of modeling,*" in *International Conference on Social Computing, Behavioral-Cultural Modeling and Prediction*, pp. 43-52, Springer, 2012), emergency detection (e.g., as described with reference to Y. Altshuler, M. Fire, E. Shmueli, Y. Elovici, A. Bruckstein, A. S. Pentland, and D.

Lazer, "*The social amplifier-reaction of human communities to emergencies,*" *Journal of Statistical Physics, vol.* 152, no. 3, pp. 399-418, 2013) and financial trading systems (e.g., as described with reference to Y. Altshuler, W. Pan, and A. Pentland, "*Trends prediction using social diffusion models,*" *in International Conference on Social Computing, Behavioral-Cultural Modeling and Prediction, pp.* 97-104, Springer, 2012, W. Pan, Y. Altshuler, and A. Pentland, "*Decoding social influence and the wisdom of the crowd in financial trading network,*" *in Privacy, Security, Risk and Trust (PASSAT)*, 2012 *International Conference on and* 2012 *International Conference on Social Computing (SocialCom), pp.* 203-209, *IEEE,* 2012, E. Shmueli, Y. Altshuler, et al., "*Temporal dynamics of scale-free networks,*" *in International Conference on Social Computing, Behavioral-Cultural Modeling, and Prediction, pp.* 359-366, Springer, 2014). However, none of these works are able to predict future stabilization of the respective network. In contrast, at least some implementations of the systems, methods, apparatus, and/or code instructions described herein analyze the network to predict future stabilization of the network.

In yet another example related to analysis of cryptocurrencies, most of the research conducted in the Blockchain world, was concentrated in Bitcoin, spreading from theoretical foundations (e.g., as described with reference to J. Bonneau, A. Miller, J. Clark, A. Narayanan, J. A. Kroll, and E. W. Felten, "*Sok: Research perspectives and challenges for bitcoin and cryptocurrencies,*" *in Security and Privacy (SP),* 2015 *IEEE Symposium on, pp.* 104-121, *IEEE,* 2015), security and fraud (e.g., as described with reference to S. Meiklejohn, M. Pomarole, G. Jordan, K. Levchenko, D. McCoy, G. M. Voelker, and S. Savage, "*A fistful of bitcoins: characterizing payments among men with no names,*" *in Proceedings of the* 2013 *conference on Internet measurement conference, pp.* 127-140, *ACM,* 2013, H. Shrobe, D. L. Shrier, and A. Pentland, *New Solutions for Cybersecurity. MIT Press,* 2018) to some comprehensive research in network analysis (e.g., as described with reference to D. Ron and A. Shamir, "*Quantitative analysis of the full bitcoin transaction graph,*" *in International Conference on Financial Cryptography and Data Security, pp.* 6-24, Springer, 2013, D. D. F. Maesa, A. Marino, and L. Ricci, *Uncovering the bitcoin blockchain: an analysis of the full users graph,*" *in Data Science and Advanced Analytics (DSAA),* 2016 *IEEE International Conference on, pp.* 537-546, *IEEE,* 2016, M. Lischke and B. Fabian, "*Analyzing the bitcoin network: The first four years,*" *Future Internet, vol.* 8, no. 1, 2016). The world of Smart contracts has recently inspired research in aspects of design patterns, applications and security (e.g., as described with reference to M. Bartoletti and L. Pompianu, "*An empirical analysis of smart contracts: platforms, applications, and design patterns,*" *in International Conference on Financial Cryptography and Data Security, pp.* 494-509, Springer, 2017, L. Anderson, R. Holz, A. Ponomarev, P. Rimba, and I. Weber, "*New kids on the block: an analysis of modern blockchains,*" *arXiv preprint arXiv:*1606.06530, 2016, K. Christidis and M. Devetsikiotis, "*Blockchains and smart contracts for the internet of things,*" *IEEE Access, vol.* 4, pp. 2292-2303, 2016, N. Atzei, M. Bartoletti, and T. Cimoli, "*A survey of attacks on ethereum smart contracts (sok),*" *in International Conference on Principles of Security and Trust, pp.* 164-186, Springer, 2017), policy towards ICOs has also been studied (e.g., as described with reference to C. Catalini and J. S. Gans, "*Initial coin offerings and the value of crypto tokens,*" *tech. rep., National Bureau of Economic Research,* 2018). Some preliminary results examining network theory's applicability to ERC20 tokens has been made in (e.g., as described with reference to S. Somin, G. Gordon, and Y. Altshuler, "*Social signals in the ethereum trading network,*" *arXiv preprint arXiv:*1805.12097, 2018). However, a comprehensive analysis of ERC20 tokens, with emphasis on modeling its equilibration process using meta-parameters of the network, is still lacking. In contrast, at least some implementations of the systems, methods, apparatus, and/or code instructions described herein analyze a network of ERC20 tokens trading data, and model stabilization process of network over time to predict stabilization of the ERC20 token trading data network.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
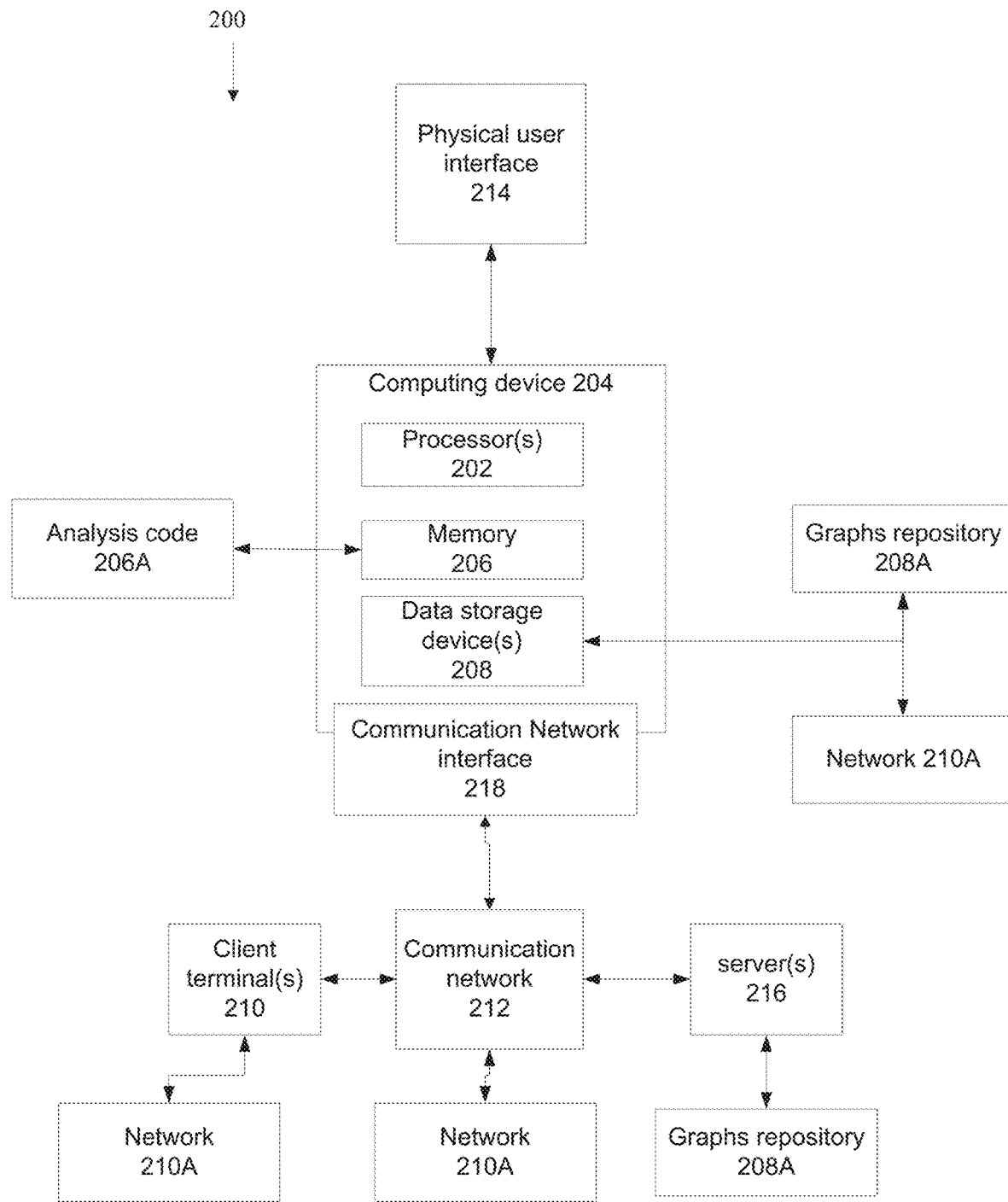
FIG. 2 is a is a block diagram of components of a system for evaluating a network by predicting stabilization of the network, based on multiple graphs each indicative of a respective sequential snapshot of a dynamic graph representation of the network obtained over a historical time interval, in accordance with some embodiments of the present invention.

Reference is now made to FIG. 1, which is a flowchart of a method for evaluating a network by predicting stabilization of the network, based on multiple graphs each indicative of a respective sequential snapshot of a dynamic graph representation of the network obtained over a historical time interval, in accordance with some embodiments of the present invention. Reference is also made to FIG. 2, which is a block diagram of components of a system 200 for evaluating a network 210A by predicting stabilization of the network 210A, based on multiple graphs each indicative of a respective sequential snapshot of a dynamic graph representation of the network 210A obtained over a historical time interval, in accordance with some embodiments of the present invention. System 200 may implement the acts of the methods described with reference to FIG. 1, by processor(s) 202 of a computing device 204 executing code instructions (e.g., code 206A) stored in a memory 206 (also referred to as a program store).

Computing device 204 receives data from network 210A. Network 210A may be connected to computing device 204 via a communication network 212. For example, computing device 204 may monitor network 210A. Alternatively or additionally, network 210A may be executed by a server and/or device (e.g., client terminal 210), and/or network 210A may be monitored by the server and/or device (e.g., client terminal 210), where client terminal 210 is in communication with computing device 204.

Computing device 204 may compute the dynamic graph according to network 210A. The computed graphs of the dynamic graph may be stored in graphs repository 208A. Alternatively or additionally, the dynamic graph may be computed according to network 210A by another device (e.g., server 216, and/or client terminal 210), which may store the computed dynamic graph in graphs repository 208. The other device may provide the computed dynamic graph to computing device 204.

Computing device 204 may be implemented as, for example one or more and/or combination of: a group of connected devices, a client terminal, a server, a virtual server, a computing cloud, a virtual machine, a desktop computer, a thin client, a network node, a network server executing code of a smart contract stored on a blockchain, and/or a mobile device (e.g., a Smartphone, a Tablet computer, a laptop computer, a wearable computer, glasses computer, and a watch computer).

Multiple architectures of system 200 based on computing device 204 may be implemented. For example:

Computing device 204 may be implemented as one or more servers (e.g., network server, web server, a computing cloud, a virtual server, a network node storing a blockchain and executing code of a smart contract stored on the blockchain) that provides services to multiple client terminals 210 over a network 212, for example, software as a service (SaaS), remote services, and/or services executed by a smart contract of a blockchain paid for by cryptocurrency.

Communication between client terminal(s) 210 and computing device 204 over network 212 may be implemented, for example, via an application programming interface (API), software development kit (SDK), functions and/or libraries and/or add-ons added to existing applications executing on client terminal(s), an application for download and execution on client terminal 210 that communicates with computing device 204, function and/or interface calls to smart contract code of a blockchain executed by computing device 204, a remote access section executing on a web site hosted by computing device 204 accessed via a web browser executing on client terminal(s) 210.

Graphs (e.g., stored in graph repository 208A) may be computed by server(s) 216 based on network 210A. Network 210A may be stored and executed by, and/or monitored by client terminal(s) 210, which communicates with server(s) 216 over network 212. The graphs may be provided from server(s) 216 to computing device 204 over communication network 212. The prediction of stabilization of network 210A is computed by computing device 204, and provided to the corresponding client terminal 210 over communication network 212.

Computing device 204 may be implemented as a standalone device (e.g., kiosk, client terminal, smartphone, server, computing cloud, virtual machine) that includes locally stored code that implement one or more of the acts described with reference to FIG. 1. For example, code loaded on to an existing computing device that executes an application that computes the graphs based on monitored of network 210A, and/or code loaded onto a dedicated server (e.g., of a same organization) that is connected to client terminal 210 via communication network 212, where only client terminal 210 (or other client terminals 210 of the same organization) store network 210A and/or compute the dynamic graph for network 210A. The likelihood of stabilization of network 210A is computed by computing device 204. An indication of the likelihood of stabilization of network 210A may be presented on a display, and/or automated actions may be executed when no stabilization is predicted. In such implementation, communication with client terminal(s) 210 and/or sever(s) 216 and/or communication network 212 is not necessarily required.

Hardware processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include a single processor, or multiple processors (homogenous or heterogeneous) arranged for parallel processing, as clusters and/or as one or more multi core processing devices.

Memory 206 stores code instructions executable by hardware processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 206 stores code 206A that implements one or more features and/or acts of the method described with reference to FIG. 1 when executed by hardware processor(s) 202.

Computing device 204 may include data storage device(s) 208 for storing data, for example, graph repository 208A that stores the computed dynamic graph, and/or stores network 210A which is used to compute the graphs of the dynamic graph. Data storage device(s) 208 may be implemented as, for example, a memory, a local hard-drive, virtual storage, a removable storage unit, an optical disk, a storage device, and/or as a remote server and/or computing cloud (e.g., accessed using a network connection).

Communication network 212 may be implemented as, for example, the internet, a local area network, a virtual network, a wireless network, a cellular network, a local bus, a point to point link (e.g., wired), and/or combinations of the aforementioned.

Computing device 204 may include a communication network interface 218 for connecting to communication network 212, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 204 and/or client terminal(s) 210 and/or server(s) 216 include and/or are in communication with one or more physical user interfaces 214 that include a mechanism for user interaction, for example, to designate the network used to compute the graphs, and/or view parameters associated with the predicted likelihood of stabilization of the network. Exemplary physical user interfaces 214 include, for example, one or more of, a touchscreen, a display, gesture activation devices, a keyboard, a mouse, and voice activated software using speakers and microphone.

Client terminal(s) 210 and/or server(s) 216 may be implemented as, for example, as a desktop computer, a server, a virtual server, a network server, a web server, a virtual machine, a thin client, and a mobile device.

Referring now back to FIG. 1, at 102, a network is provided. Optionally, a dataset representation of the network is provided. The network may be an existing network that is monitored (e.g., wireless communication network, social network), and/or may be based on a process executing on a computing device (e.g., server), for example, a social network site hosted by the server.

The network and/or dataset may be monitored, by capturing data of the state of the network and/or dataset at sequential time interval, to create a sequence of snapshots of the network and/or dataset.

The network may include entities that interact with one another. The dataset representation of the network may be stored as, for example, active entities and their interactions.

Exemplary networks include: social network sites, platforms for trading of a new cryptocurrency, and new data communication networks.

Entities may represent, for example, virtual and/or physical entities used by individuals (i.e., human users) and/or automated processes (and/or automated devices that execute the automated processes), for example, user accounts (e.g., social network accounts, bank accounts, shopping accounts, email accounts, gaming application, wallets, blockchain user accounts), client terminals, mobile device, smartphone (and/or standard phones), servers, and applications being used by the user (e.g., email application, game application, online shopping application, banking application, currency transfer application).

Interaction between the entities may include, for example, sending of multimedia objects (e.g., images, videos, text) from one user to another, a phone call by an originating entity to a receiving entity, adding another entity (e.g., user account) to a social network of a current entity, a game being played by two or more entities, an email or other message sent from one entity to another entity, transactions associated with a smart contract of a blockchain, and financial transactions (e.g., transfer of currency from one wallet to another wallet).

At 104, multiple graphs, each indicative of a respective sequential snapshot of a dynamic graph denoting the network obtained over a historical time interval are provided and/or computed.

The graphs may be computed by the client terminal, server, and/or computing device, as described herein. The graphs are computed according to the network and/or according to the dataset denoting the network. The graphs may be computed by designating nodes of the graphs as denoting entities of the network, and edges of the graphs as denote interactions between the entities.

The graphs may be directed graphs. The directed graphs may be directed cyclic and/or acyclic graphs. The edges may be directed, indicating the direction of the transfer occurring during the transaction, for example, from sending entity to receiving entity. Weights may be assigned to edges, for example, indicative of a parameter associated with the interaction, for example, size of packet (and/or other data object) being transmitted, value of cryptocurrency being transferred.

Multiple graphs are provided and/or computed for the historical time interval. Each graph represents a respective sequential snapshot of a dynamic graph obtained over the historical time interval. The dynamic graph represents the changes occurring within the network over the historical time interval, where each graph represents a snapshot in time of the state of the dynamic graph.

Exemplary entities include: user accounts, wallets, social network accounts, bank accounts, shopping accounts, email accounts, gaming application, blockchain user accounts, mobile device, smartphone, standard phones, servers, applications being used by the user, client terminals, and network nodes (e.g., client terminals, routers, servers).

Exemplary edge include: data packets transmitted over a communication network between network nodes, calls, multimedia objects sent from one entity to another entity, financial transactions, a game played by two or more entities, transactions associated with smart contracts, and transfer of blockchain-based tokens or cryptocurrencies.

The graphs may include a unique combination of nodes and edges. For example, each of the graphs has a unique combination of nodes and edges not present in any other graph. The unique combination of nodes and edges of the respective graph represent dynamic changes of the dynamic graph over the historical time interval. The graphs may overlap in one or more common nodes. Each common node may appear at least in two or more temporally adjacent graphs (i.e., sequential graphs, where the first graph appears at time t and the next graph following the first graph appears at time t+delta). Edges of the common nodes may vary between the graphs having the same common nodes.

At 106, multiple sets of meta-parameters are computed. Each set of meta-parameters is computed according to a respective graph of the sequence of graphs (i.e., of the dynamic graph). It is noted that each set may include one or more meta-parameters.

The computation of meta-parameters for each graph in the sequence creates a dynamical sequence of meta-parameters, which may be represented as gamma(t).

Each of the meta-parameters denotes a network level parameter computed according to multiple edges and/or multiple nodes of the respective graphs.

Optionally, the meta-parameters are global parameters of the network that are indicative of the structure and/or flow within the network. The meta-parameters are less related to individual components of the network.

Exemplary meta-parameters include: degree distribution power law coefficients (i.e., each degree distribution power law coefficient computed for each graph of the sequence of graphs), and average shortest path (i.e., each average shortest path is computed for each graph of the sequence of graphs).

The degree-distribution power-law coefficient (sometime mathematically denoted as gamma), may be computed as the degree distribution of all nodes in the network (i.e., graph), where degree is the number of edges for each node.

Average path length may be computed as the average number of steps along the shortest paths for all possible pairs of nodes of the graph (i.e., nodes of the network).

It is noted that the meta-parameters are computed for each graph in the temporally arranged sequence of graphs, even when the nodes and/or edges different significantly between graphs.

At 108, the sets of meta-parameters are analyzed according to values computed based on a physics-based analytical model of an evolving physical system, optionally a harmonic oscillator, more optionally a damped harmonic oscillator.

Optionally, the set of meta-parameters are to the physics-based analytical model using a best fit process.

Optionally, the sequence of degree distribution power law coefficients computed for respective graphs over the historic time interval are fitted to a damped harmonic oscillator denoted as:

$$\gamma_{fit}(t) = A \cdot e^{-\omega_0 \zeta \cdot t} \cdot \sin(\omega_0 \sqrt{1-\zeta^2} t + \varphi) + \gamma_\infty$$

where:
$\gamma$ denotes a constant stable state,
$\lambda = \omega_0 \zeta$ denotes exponential decay of the under-damped oscillator, where $1/\lambda$ denotes a prediction of the future time interval when evolution of the network stabilizes,
$\omega = \omega_0 \sqrt{1-\zeta^2}$ denotes angular frequency,
$\gamma_\infty$ denotes a stable value of the degree-distribution power-law coefficient indicative of a stable state to which the network converges,
A denotes maximal amplitude of the oscillator, and
$\varphi$ denotes phase shift.

The fitting may be performed, for example, for a certain historical time period denoted [t0,t1], according to a fit process for example a least-square fit processes, for fitting the meta-parameters (e.g., denoted gamma(t)), t in [t0,t1] to the physic-based analytical model, for example, the damped harmonic oscillator.

It is noted that the under-damping oscillator model may be an extension of a regular single-parameter model.

At 110, a likelihood of stabilization of the network during a future time interval is predicted according to an indication of convergence of the values according to a convergence requirement, computed based on the physics-based analytical model during the future time interval. For example, in terms of mathematical representation, based on the values computed for the parameters of the physics-based analytical model (i.e., for historical time interval [t0, t1]), value of the meta-parameters are predicted for the future time interval, for example, gamma(t1+3 months) or other future time intervals.

The convergence requirement may be defined, for example, as the future interval when the meta-parameter(s)

of the network reach a certain criteria relative to the meta-parameter(s) of the network during the historical time interval. For example, when the meta-parameter(s) of the network reach a certain percentage relative to the initial and/or maximum value of the meta-parameter(s) of the network during the historical time interval. For example, when the power law coefficient (denoted γ) reaches a defined percent of the initial and/or maximal γ computed for the network during the historical time interval.

It is noted that the values computed for the parameters of the physics-based analytical model enable not only prediction of future network parameter-values, but provide an indication of prediction of future stabilization of the network.

The likelihood of stabilization of the network is computed according to a predicted convergence of future values of the set of meta-parameters for the future time interval. The future values of the set of meta-parameters are predicted according to the physics-based analytical model.

The convergence requirement may be selected, for example, predefined as a system parameter, manually by a user (e.g., according to a desired tolerance), and/or automatically computed by code (e.g., based on properties of the analysis model, the network, and/or desired target). For example, a narrow convergence requirement may be defined for certain applications, while a more broad range of the convergence requirement may be defined for other applications.

Alternatively at 112, a likelihood of non-stabilization of the network during the future time interval is predicted according to an indication of non-convergence of the values according to the convergence requirement, computed based on the physics-based analytical model during the future time interval.

A threshold value may be selected to differentiate between likelihood of convergence and non-likelihood of convergence. Likelihood values above the threshold may be sufficiently accurate to denote convergence, and/or likelihood values below the threshold may indicate inaccuracy in denoting convergence. The likelihood threshold may be defined, for example, manually by a user, automatically by code, and/or obtained as a stored system parameter.

When non-stabilization of the network is detected, instructions for adjustment of one or more components of the networks may be generated to create an adjusted network. The instructions may be code instructions for automatic implementation when executed by one or more processes, and/or manual instructions for manual implementation by a user (e.g., presented within a GUI on an administrative server). The instructions for adjustment of the component(s) may be generated, for example, randomly, based on a set of rules, based on a defined algorithm, based on machine learning code, based on expert domain user knowledge, and/or other processes. For example, the instructions may be to redefine connections between network entities, add a new connection between existing network entities, remove an existing connection from existing network entities, insert a new network entity (and connect the new entity), and/or remove an existing network entity (and remove connections of the removed entity). For example, add bandwidth between existing routers, add a new server, and remove an existing network connection via a network node.

At 114, one or more features described with reference to acts 104-112 are iterated. The iterations are performed for the created adjusted network, where during each iteration a new adjusted network is created. The iterations may be terminated when the indication of convergence is obtained (i.e., the created adjusted network is predicted as likely to become stable).

At 116, the indication of likelihood of convergence of the network is provided, for example, stored on a data storage device, presented on a display, transmitted to a remote computing device (e.g., server, client terminal) over a network, and/or provided to another process for further processing.

Optionally, additional data is provided, for example, one or more of:
An indication of the adjustment made to create the adjusted network that is predicted to converge (i.e., stabilized).
An indication of predicted future values of the meta-parameters during the predicted stabilization of the network.
An indication of the future time interval associated with the predicted stabilization of the network. For example, the network is predicted to stabilize in about 3-4 months.
An indication of confidence level(s) associated with the predicted likelihood of stabilization of the network.
An indication of confidence level(s) associated with the predicted future values of the meta-parameters during the predicted stabilization of the network.
An indication of confidence level(s) associated with the future time interval associated with the predicted stabilization of the network.
An indication of the computed values for the parameters of the damped harmonic oscillator, for example: $\gamma_\infty$ denoting the stable value of the degree-distribution power-law coefficient, and $\lambda$ denoting the exponential decay of the under-damped oscillator. $1/\lambda$ may be measured in days (or other units), and provides a prediction of when the evolution of the network is likely to stabilize.

Confidence boundaries for the predicted values of the network meta-parameters and/or the stabilization future time interval may be computed based on a statistical analysis of the parameters of the physics-based analytical model (e.g., damped harmonic oscillator), according to the following exemplary process:

The historical time interval denoted [t0,t1] (from which the dynamic graph is created) is divided into a sequence of temporally adjacent sub-intervals denoted:

[t0, t0+tau+dt], [t0, t0+tau+2dt], . . . , [t0, t0+tau+i×dt=t1], . . . [t0, t0+tau+n×dt=t1]

Where:
tau denotes a minimal period (e.g., 1, 2, 3, 6 months or other values) for a computational fit;
dt denotes a time-step (e.g., three days, one week, two weeks, one month, or other values)

$$n=(t1-t0-tau)/dt.$$

For each such sub-interval i, the meta-parameters computed for the graph(s) corresponding to the sub-interval i are fitted to the physics-based analytical model (e.g., damped harmonic oscillator), and the model parameters are computed as described herein (e.g., $\lambda(i)$). The aggregations of the model parameters are indicative of prediction ranges. Statistics for the model parameters computed for the temporally adjacent sub-intervals, for example, minimum, maximum, median, and standard-deviation. The statistics are indicative of confidence of predictions. For example, a statistically insignificant or no difference between minimum and maximum of a certain model parameter is indicative of high confidence in the predicted value of the certain model parameter. In another example, when the standard deviation of a certain parameter is statistically similar to the median value of the certain parameter, then the confidence in the predicted value of the certain parameter is relatively low.

The predicted values of the stabilized meta-parameters of the network may be provided as a bounded range, for example, $\gamma_\infty$, as a bounded value range denoted as [min $\gamma_\infty(i)$, max $\gamma_\infty(i)$].

The predicted future time interval (e.g., future date, amount of elapsed time) when the network is likely to stabilize may be provided as a bounded range, for example, $t0+1/\lambda$, as a date-range: [min $(t0+1/\lambda(0))$, max $(t0+1/\lambda(i))$].

At 118, a post-hoc analysis may be performed. The post-hoc analysis is performed at a current time interval that occurs after the predicted future time interval (i.e., when the predicted future time interval has already occurred). The post-hoc analysis may be performed by analyzing a current state of the network in comparison to the predicted likelihood of stabilization of the network during the future time interval. An indication of the analysis may be generated and provided (e.g., presented on a display, stored in memory, and/or provide to another process for further processing).

Optionally, the analysis includes detecting a statistically significant difference between the current state of the network and the previously predicted likelihood of stabilization of the network. In other words, a comparison between what actually occurred in the network relative to what was predicted to occur in the network. A statistically significant difference is indicative of an abnormality in the network.

In one example, the statistically significant difference may be due to predicted oscillations that have not occurred. In such a case, the abnormality may be an indication of a dampening effect.

In another example, the statistically significant difference may be due to an over estimation of an equilibrium degree distribution. In such a case, the abnormality may be an indication of appearance in the network of larger than expected hubs.

Alternatively or additionally, when the predicted future time interval is reached indicating that the network has now stabilized, one or more actions may be triggered for performance on the stabilized network. Actions may be triggered automatically, for example, automated creation and/or selection of code instructions for execution by one or more processors. Alternatively or additionally, an indication may be presented to a user for manually performing the actions, for example, a message is presented in a GUI indicating that stability has been reached. Exemplary actions include: analysis of the stable network using one or more known network analysis approaches, and adjustment of one or more network components (e.g., add, remove, and/or change, parameters thereof) for example identify the busiest hub and add additional bandwidth and/or computational resources.

Figure 3A:
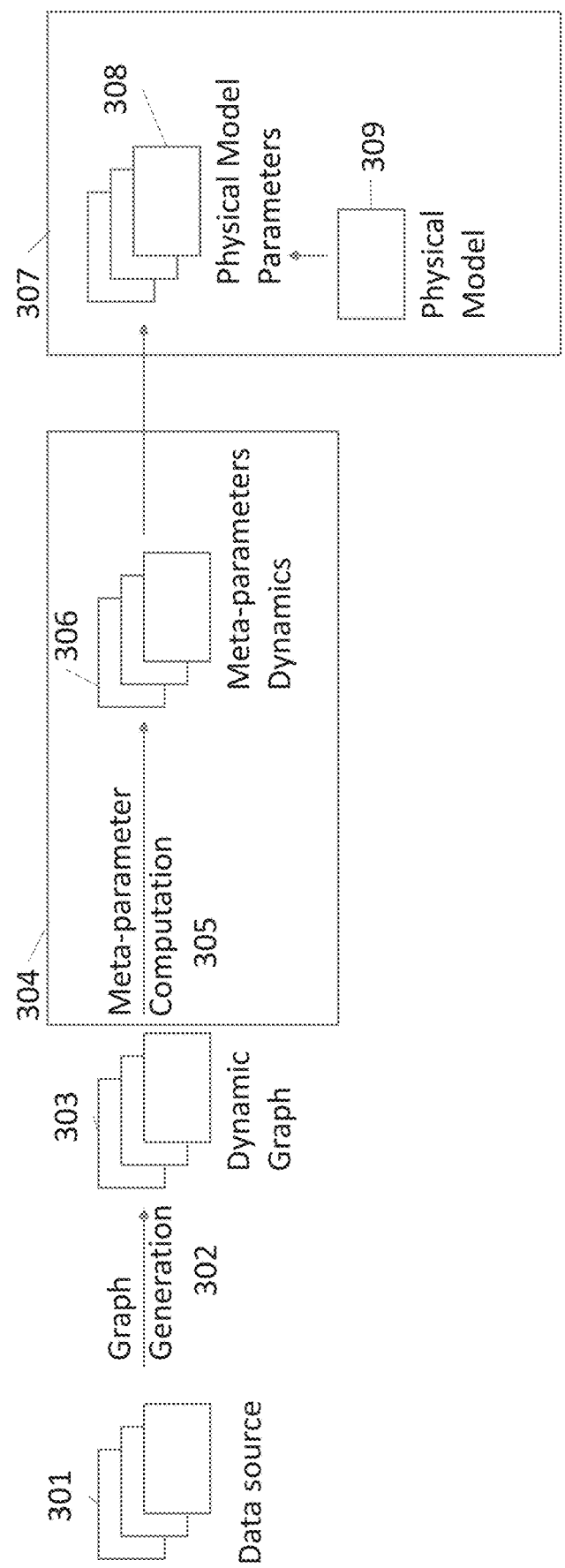
Figure 3B:
Figure 3C:
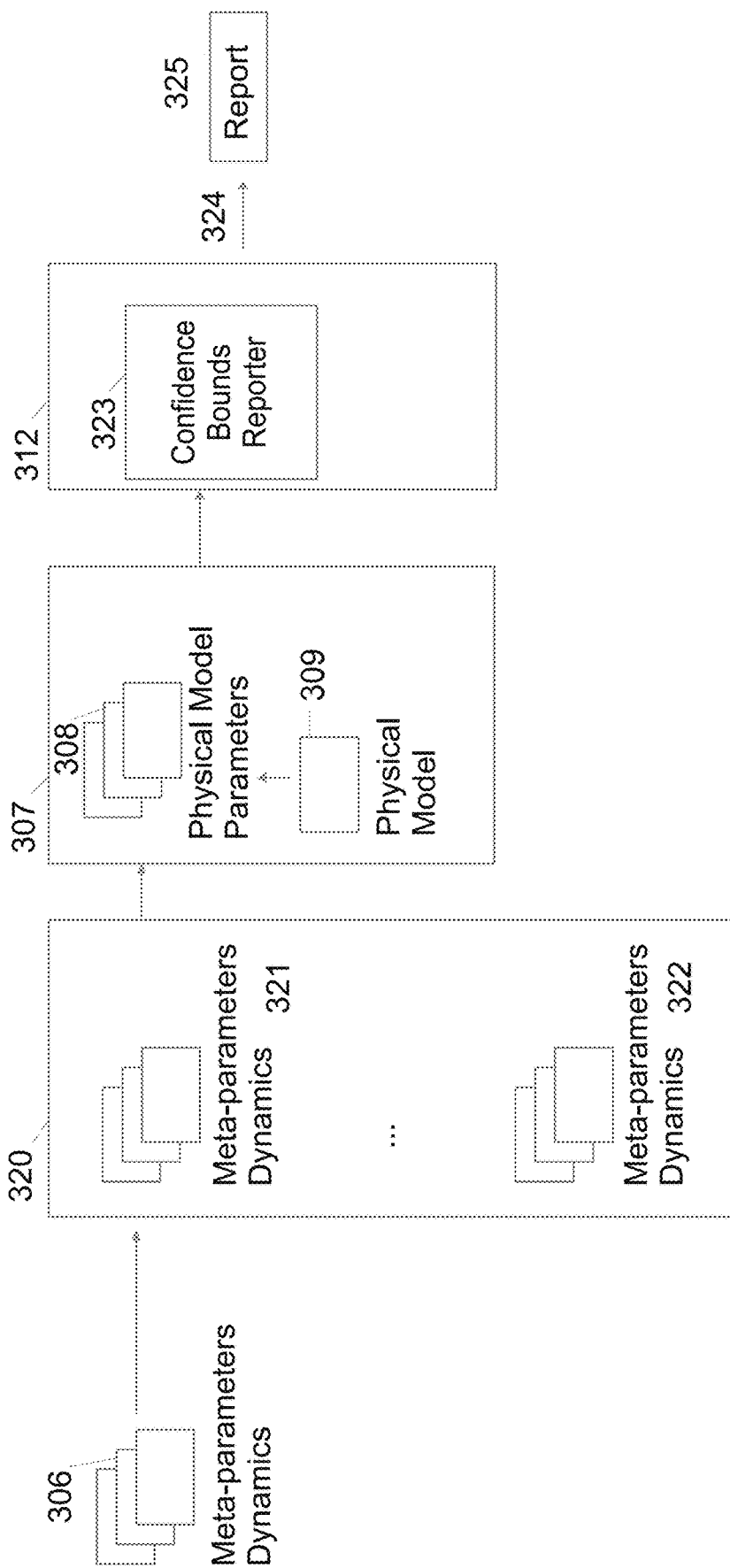

Reference is now made to FIGS. 3A-3D, which are dataflow diagrams depicting an exemplary process for evaluating a network by predicting stabilization of the network, based on multiple graphs each indicative of a respective sequential snapshot of a dynamic graph representation, of a network obtained over a historical time interval, in accordance with some embodiments of the present invention. The dataflow described with reference to FIGS. 3A-D may be implemented based on features described with reference to FIG. 1, and/or by components of system 200 described with reference to FIG. 2. FIG. 3A is a dataflow diagram for computation of physical model parameters, as described herein. FIG. 3B is a dataflow diagram for computation of likelihood of prediction of the network during a future time interval based on the physical model parameters, as described herein. FIG. 3C is a dataflow diagram for computation of confidence boundaries for the predicted stabilization, as described herein. FIG. 3D is a dataflow diagram for performing a post-hoc analysis, as described herein.

Referring now to FIG. 3A, a data source 301 (e.g., dataset) of a network is provided. A graph generation 302 process computes a dynamic graph 303 representation of the network, where the dynamic graph includes a sequence of multiple temporally adjacent graphs. A meta-computation process 304 computes a set of meta-parameters 305 for each of the graphs. The multiple sets of meta-parameters are indicative of meta-parameters dynamics 306. A physics-based analytical model process 307 computes physical model parameters 308 by fitting a physics-based analytical dynamical model 308 that correlates to a physical stabilization process, for example, a damped harmonic oscillator.

Referring now to FIG. 3B, the computed physical model parameters 308 are analyzed by a prediction process to compute predictions of meta-parameters 311 for the network for a future time interval. A stabilization analysis process 312 analyses the predicted meta-parameters to compute an indication of likelihood of stability of the network according to a likelihood of convergence of the predicted meta-parameters during a future time interval. A network stabilization reporter 313 creates an output indicative of likelihood of predicted stabilization of the network. Output 314 may be incorporated into a report 315, for presentation on a display, storage in a memory, and/or forwarding to another process for additional processing.

Referring now to FIG. 3C, the meta-parameter dynamics 306 obtained over the historical time interval are divided by a division process 320 into multiple sub-intervals 321-322. The multiple sub-intervals are analyzed using the physics-based analytical model process 307, and are provided as input into stabilization analysis process 312 that includes a confidence bounds reporter 323 that computes confidence boundaries for the model parameters, as described herein. The computed boundaries may be provided as output 324 into a report 325, for presentation on a display, storage in a memory, and/or forwarding to another process for additional processing.

Referring now to FIG. 3D, a post-hoc analysis process 326 computes deviations from predictions 327 based the computed predicted meta-parameters 311 of the network, and actual meta-parameters computed for the network after the predicted future time interval has elapsed. Anomalies between the prediction and actual values may be outputted 328 a report 329, for presentation on a display, storage in a memory, and/or forwarding to another process for additional processing.

Various embodiments and aspects of the present invention as delineated hereinabove and as claimed in the claims section below find calculated support in the following examples.

EXAMPLES

Reference is now made to the following computational example of evaluating a network by predicting stabilization of the network, based on multiple graphs each indicative of a respective sequential snapshot of a dynamic graph representation of the network obtained over a historical time interval, which together with the above descriptions illustrate some implementations of the systems, methods, apparatus, and/or code instructions described herein in a non limiting fashion.

Inventors performed a computational evaluation according to the systems and/or methods and/or apparatus and/or code instructions described herein, based on the features and/or system components discussed with reference to FIGS. 1-3A-D.

The computational evaluation described herein, in which Inventors analyzed the network of ERC20 token trading data is now discussed. It is noted that although the evaluation was directed towards ERC20 token trading data, the results are generally applicable to other networks processed by at least some of the systems, methods, apparatus, and/or code instructions described herein. Inventors analyzed the ERC20 transaction network and have shown that, while it is composed of many tokens and wallets, it conforms to well established behaviors of a single social structure. Inventors also analyzed the dynamics of such a complex network and discovered that the network behaves as an underdamped harmonic oscillator, which enabled Inventors to extract important dynamical parameters. The analysis performed by the Inventors suggests that the ERC20 network has stabilized, even though its composition remains highly erratic and volatile. Inventors believe that the dynamical analysis of complex, inhomogeneous networks described herein may be applied in other fields, in order to better characterize the equilibration dynamics of the underlying system.

Inventors presented evidence suggesting that ERC20 network, while being extremely diverse in its composition, namely, having varied tokens' designations, diverse ages, trading volume and number of unique holders, still conforms to the statistics of other social networks, which obtain a much more homogeneous composition (e.g., as described with reference to A. Barrat, M. Barthelemy, and A. Vespignani, Dynamical processes on complex networks. *Cambridge university press*, 2008, M. E. Newman, "*Power laws, pareto distributions and zipf's law,*" *Contemporary physics*, vol. 46, no. 5, pp. 323-351, 2005, R. Pastor-Satorras and A. Vespignani, *Evolution and structure of the Internet: A statistical physics approach. Cambridge University Press*, 2007, A.-L. Barabasi and Z. N. Oltvai, "*Network biology: understanding the cell's functional organization,*" *Nature reviews genetics*, vol. 5, no. 2, p. 101, 2004, Y. Altshuler, R. Puzis, Y. Elovici, S. Bekhor, and A. S. Pentland, "*On the rationality and optimality of transportation networks defense: a network centrality approach,*" *Securing Transportation Systems, pp.* 35-63, 2015, W. Pan, Y. Altshuler, and A. Pentland, "*Decoding social influence and the wisdom of the crowd in financial trading network,*" in *Privacy, Security, Risk and Trust (PASSAT), 2012 International Conference on and 2012 International Conference on Social Computing (SocialCom), pp.* 203-209, *IEEE*, 2012). This was demonstrated by examining both the incoming and outgoing degree distributions, and verifying their compliance to a scale-free power-law model, as described in detail in the "Examples" section.

A-priori there is no theoretical justification that an amalgamation of nonrelated tokens, each with a different source and functionality, will result in a cohesive, single network that behaves according to the well-established "rules" of social physics. Inventor's computational evaluation results support the hypothesis that the ERC20 is composed of a single community. The non-trivial nature of this result resides in the fact that such diverse and highly non-homogeneous networks have not been previously analyzed using a network theory perspective, and have not previously demonstrated adherence to its models. Elaborating on this last observation, based on the "Examples" section, it can be seen that the economic activity on the ERC20 network—both outgoing, incoming, and reciprocal—converges to a heavy-tail distribution. This discovery by Inventors has several important (and partially counterintuitive) consequences:

Decentralization: The first derivative from the power law phenomena described herein and demonstrated in this work, is the strengthening of the ERC20 environment's decentralization property. Decentralization in this context is manifested by the existence of a large number of medium sized hubs, taking part in the network's activity, constituting a network that is not governed by a single major player, both in the sense of trading wallets as well as in traded tokens. Decentralization, forming a key feature of the Blockchain technology, and for some—its main "claim to fame", is both celebrated and questioned. By clearly showing the emergence of a heavy tail distribution within the trading behavior of its users, Inventors discovered a concrete data-driven proof for the inherent decentralization of ERC20 tokens, which remains stable across various time-periods, and length of analysis windows.

Robustness: An immediate implication of the decentralization of the ERC20 tokens network, is also its robustness. Several works have used percolation theory (e.g., as described with reference to D. S. Callaway, M. E. Newman, S. H. Strogatz, and D. J. Watts, "*Network robustness and fragility: Percolation on random graphs,*" *Physical review letters*, vol. 85, no. 25, p. 5468, 2000) to demonstrate that such network structures are often less subject to manipulations using small correlated groups (e.g., as described with reference to Y.-Y. Liu, J.-J. Slotine, and A.-L. Barabasi, "*Controllability of complex networks,*" *Nature*, vol. 473, no. 7346, p. 167, 2011), making it easier for the majority of the crowd to maintain relative freedom.

Diversity: Subsequently, it also facilitates the creation of new emerging tokens, as it increases the probability that they would be adopted by a non-negligible-in-size group of "first-adopters". This is specifically important for an environment that aims to provide opportunities for the fast creation and adoption of new applications.

Maturity: Several critics have referred to Ethereum, as well as to the ERC20 tokens in general, as an immature economic structure, that is unstable and certainly not well representing a "normal" human economy. The stable and multi-faceted power-law patterns demonstrated in the analysis of the "Examples Section" imply that these criticisms are, to the very least, partially unjustified. The convergence of tokens distributions, as well as buying and selling activities is a typical characteristic of "natural human behavior" (e.g., as described with reference to A. Barabasi, "*The origin of bursts and heavy tails in human dynamics,*" *Nature*, vol. 435, no. 7039, pp. 207-211, 2005) and specifically mature economies (e.g., as described with reference to A.-L. Barabasi, "*Linked: The new science of networks,*" 2003, A.-L. Barab_asi, "*The elegant law that governs us all,*" 2017). Furthermore, as demonstrated in works such as (e.g., as described with reference to G. Palla, A. Barabasi, and T. Vicsek, "*Quantifying social group evolution,*" *Nature*, vol. 446, no. 7136, pp. 664-667, 2007) it is also an efficient substance for the natural evolution of sub-communities.

In the computational evaluation described below, Inventors go beyond a static view of the ecosystem, and explore the dynamics of the ERC20 ecosystem throughout time. Examining the dynamics of ERC20 throughout semantic properties of the data, indeed manifests a highly unstable and unpredictable system. These observations raised the obvious question of whether the ERC20 system may be considered as a stabilizing, equilibrating network. However, Inventors discovered that each weekly transactions network along the examined 2.5 years period, although built upon highly diverse data, still conforms to a power-law degree distribution, as shown by the goodness-of-fit parameter, $R^2$, signifying that each individual week behaves as a scale-free network. This discovered enabled Inventors to reassess the dynamics of ERC20 throughout a network theory perspective. Inventors therefore examined the dynamics of the degree distribution, manifested by its associated power, $\gamma$, by fitting a damped harmonic oscillator model to $\gamma$ dynamics over time. The goodness of fit to the oscillator model was tested by analyzing the residuals plot, verifying they were centered around zero, as described below.

The hypothesis that ERC20 is an equilibrating system is supported by the analysis of $\gamma$ dynamics in a twofold manner. First, the fit to under-damped harmonic oscillator model, has presented its underlying parameters, e.g. the resonance frequency of the system and the damping coefficient. These parameters demonstrate that the current state of the ERC20 network has neared its equilibrium state, since it has passed the time period associated with the damping coefficient. Second, the fluctuations of the noise around the oscillator fit have decreased dramatically, converging to a constant-sized noise. Taken together, these evidence indicate that initially, the network oscillated and was extremely noisy, yet it had since damped, became more stable and had reached an equilibrium.

To better comprehend the dynamical analysis described herein, the concept of a scale-free network is briefly discussed, and what $\gamma$, the exponent of the power-law degree distribution signifies is discussed. A power-law degree distribution with a small $\gamma$ denotes that the ratio between number of disconnected or lightly-connected wallets to wallet-hubs is small. On the other hand, a network with a large $\gamma$ has either many disconnected nodes, or a smaller number of hubs, or both. In other words, there is a larger gradient in the degree distribution and the ratio between disconnected wallets and wallet-hubs is larger.

The analysis described herein demonstrates inherent differences between the in-degree and out-degree distributions, for example by the underdamped harmonic oscillator fit parameters discussed below. The dynamics of $\gamma^{in}$ and $\gamma^{out}$ are anti-phased, as represented by the negative amplitude A and the phase $\varphi$. Furthermore, their equilibrium state is rather different, wherein $\gamma_\infty^{in} > \gamma_\infty^{out}$.

In order to present a complete view of the dynamics of the ERC20 network, all the aforementioned results are integrated. Two rather distinct phases of the ERC20 network are identified, with a transition occurring around November 2016, as is evident both from the buyer & sellers dynamics, and from the dynamics of $\gamma$, the network's meta-parameter. During the first phase, the number of unique buyers and sellers was comparable, the network oscillated and was extremely noisy.

Taking into consideration, the interpretation of an oscillating $\gamma$, during this first period, the ratio between lightly-connected wallets and hubs oscillated between two extremes: around April 2016 there was a relatively smaller number of buying hubs and disconnected sellers, whereas in August 2016 the situation flipped to the other extreme of a smaller number of selling hubs and disconnected buyers. During the second phase, the underlying composition, e.g. number of unique buyers and sellers, began to grow and spread apart, yet the network itself has reached its equilibrium state, with almost no oscillation and a much reduced noise.

It should be noted that the oscillation in $\gamma$ between August 2016 and February 2017, especially in $\gamma^{in}$, means there was an "overshoot" of the system beyond its equilibrium state; this is the hallmark of an underdamped oscillator (as opposed to an overdamped one). This overshoot in $\gamma^{in}$ may represent a "herd" behavior of many individuals/wallets (higher density) entering the community, making a small number of buying transactions (low in-degree). This was accompanied by a consolidation of the sellers degree distribution to nearly its equilibrium state.

Taking a more "physical interpretation" approach, the forces applied to the network, as represented by $\gamma$ are considered. The two forces are the "pulling" forces, represented by the spring-constant k, the force that draws the system back to its equilibrium state; and the friction force, the force proportional to the dynamic change, represented by c. As discussed below, there is a larger friction force in the seller's degree distribution, meaning that there is a greater resistance to a change in $\gamma$. On the other hand, the pulling force of the buyer's degree distribution is larger, i.e. the further from equilibrium the network is, the greater the change; this results in oscillation and overshooting of the network.

Furthermore, the (current) equilibrium state shows that the buyers have a larger disconnected/hub wallets ratio than the sellers, which coincides with the larger number of weekly unique buyers and their drastic fluctuations. Yet, regardless of the still volatile composition of the network, e.g. number of unique buyers per week, the overall structure of the network, as measured by the network's meta-parameter, $\gamma$, has stabilized, indicating that the ratio between hubs and individual small-time transactions is not expected to undergo drastic changes.

Issuance of cryptocurrencies on top of the Blockchain system by startups and private sector companies is becoming a ubiquitous phenomenon. This new rising economy presents great difficulties to modeling its dynamics using semantic, conventional parameters. Inventors analyzed the dynamical properties of the ERC20 protocol compliant crypto-coins' trading data, by evaluating the dynamics of the ERC20 network along time, by analyzing a meta-parameter of the network, the power of the degree distribution, according to at least some of the systems, methods, apparatus, and/or code instructions described herein. The computational evaluation performed by the inventors demonstrates that the ERC20 network may be modeled as an underdamped oscillator over time, which reaches an equilibrium. Thus concluding the ERC20 network as an already stabilized network, despite its highly erratic nature.

Blockchain technology, which has been known by mostly small technological circles up until recently, is bursting throughout the globe, with a potential economic and social impact that could fundamentally alter traditional financial and social structures. Launched in July 2015 (e.g., as described with reference to V. Buterin et al., "*A next-generation smart contract and decentralized application platform,*" white paper, 2014), the Ethereum Blockchain is a public ledger that keeps records of all Ethereum related transactions. It is shared between all participants and is based on a reward mechanism as an incentive for users to run the transactions network. A key characteristic of the Blockchain network is its heavy reliance on cryptography to secure the transactions, addressed as the consensus mechanism. Each account consists of a public and private key duo, where the private key is used to digitally sign each account's transactions, and the public key can be used by all Blockchain participants in order to verify the transaction's validity, in a rapid, decentralized and transparent way.

The ability of the Ethereum Blockchain to store not only ownership, similarly to Bitcoin, but also execution code, in the form of "Smart Contracts", has recently led to the creation of a large number of new types of "tokens", based on the Ethereum ERC20 protocol. These tokens are "minted" by a variety of players, for a variety of reasons, having all of their transactions carried out by their corresponding Smart Contracts, publicly accessible on the Ethereum Blockchain.

The Ethereum Blockchain's transactions, and ERC20 transactions in particular, were represented as a network by the inventors using a decentralized record of interactions among participants, with two interesting properties that distinguish it from most of the traditional interaction collections (such as social network activities, phone-call records, financial bank transactions):

Unlimited number of wallets—The Ethereum private key mechanism enables any participant to create an unlimited amount of unique "wallets". Whereas the participant can control all of these wallets easily, it is impossible for an outside observer to explicitly associate the wallets to each other (with the exception of an implicit association, through a careful data analysis work, as can be seen for example in E Altshuler, Y. Elovici, A. B. Cremers, N. Aharony, and A. Pentland, *Security and privacy in social networks. Springer Science & Business Media*, 2012). This can be compared to a mobile phone network, in which every participant may hold an infinite amount of different identities, addressed as phone numbers, all of which can be used at will. Had this property existed in reality, it would likely render most of recent seminal works in this field (such as M. C. Gonzalez, C. A. Hidalgo, and A.-L. Barabasi, "*Understanding individual human mobility patterns,*" *Nature*, vol. 453, pp. 779-782, 06 2008, A. Barabasi, "*The origin of bursts and heavy tails in human dynamics,*" *Nature*, vol. 435, no. 7039, pp. 207-211, 2005., Candia, M. C. Gonzalez, P. Wang, T. Schoenharl, G. Madey, and A.-L. Barabasi, "*Uncovering individual and collective human dynamics from mobile phone records,*" *Journal of physics A: mathematical and theoretical*, vol. 41, no. 22, p. 224015, 2008, N. Eagle, A. Pentland, and D. Lazer, "*Inferring social network structure using mobile phone data,*" *Proceedings of the National Academy of Sciences (PNAS)*, vol. 106, pp. 15274-15278, 2009, Altshuler, N. Aharony, A. Pentland, E Elovici, and M. Cebrian, "*Stealing reality: When criminals become data scientists (or vice versa),*" *Intelligent Systems, IEEE*, vol. 26, pp. 22-30, Nov.-Dec. 2011, J.-P. Onnela, J. Saramaki, J. Hyvonen, G. Szab_o, D. Lazer, K. Kaski, J. Kertesz, and A.-L. Barabasi, "*Structure and tie strengths in mobile communication networks,*" *Proceedings of the National Academy of Sciences*, vol. 104, no. 18, pp. 7332-7336, 2007 and the like) highly impractical, if not entirely obsolete, as demonstrated in E Altshuler, N. Aharony, M. Fire, Y. Elovici, and A. Pentland, "*Incremental learning with accuracy prediction of social and individual properties from mobilephone data,*" *CoRR*, 2011.

Unlimited number of tokens—The ability of participants to create not only new wallet addresses, but also an unlimited number of new tokens turns the Ethereum network from a single faceted means of communication of storage and execution related transactions, to a multi-faceted (and in fact, an infinitely faceted) one, comprised of many different types of interactions, whose nature widely varies from payment, through decentralized trading in GPU resources (e.g., as described with reference to "*Golem*", 2017), and to consumption of behavioral predictions (e.g., as described with reference to "*Endor—inventing the "Google for Predictive Analytics",*" 2017).

As a result, the ERC20 ecosystem and the multitude of transactions it consists of, constitutes one of the most fascinating examples for decentralized networks. However, there has not been any in-depth analysis of the ERC20 tokens network properties prior to the analysis presented herein by inventors.

As described herein, a social network from the participants and their corresponding monetary actions during two years of ERC20 transactions over the Ethereum Blockchain is analyzed based on at least some of the implementations of the systems, methods, apparatus, and/or code instructions described herein, indicating applicability to non-homogeneous, extremely diverse ecosystem of ERC20 tokens. ERC20 tokens data, despite being infinitely faceted and potentially comprised of unlimited amount of single-serving wallet addresses, may be analyzed based on at least some of the implementations of the systems, methods, apparatus, and/or code instructions described herein.

As described herein, the degree-distribution is used as a meta-parameter of the network for analyzing the network, unlike semantic properties of ERC20 data (s.a. the dynamic number of trading wallets transactions, traded tokens and more), which present highly unstable and unpredictable dynamics. As described herein, a stroboscopic-like snapshots of the emerging network are obtained, i.e. a temporal sliding window of the transactions is obtained to create a sequence of networks. Each network has its own power-law distribution, thus enabling analysis and modeling of gamma (i.e., $\gamma(t)$). As described herein, inventors discovered that the network behaves as a dynamical system that equilibrates with time. The equilibration process is modeled by a damped oscillator system with zero-mean Gaussian noise. Inventors discovered that an under-damped oscillator model indeed describes $\gamma(t)$ with an excellent agreement, from ERC20 beginning in February 2016 until June 2018.

At least some of the implementations of the systems, methods, apparatus, and/or code instructions described herein enables extraction of socially-relevant parameters, such as the resonance frequency of the network related to trends and oscillations in the "real world", as well as its convergence time related to the maturity of the Blockchain network. Based on social physics analysis, the ERC20 network is shown to have transitioned into its dynamical equilibrium state around January 2018. At least some of the implementations of the systems, methods, apparatus, and/or code instructions described herein hold great promise for the emerging, and sometimes volatile, field of Blockchain economy, as it enables a social physics modeling approach to the maturity and equilibration of its networks.

Data

In order to preserve anonymity in the Ethereum Blockchain, personal information is omitted from all transactions.

A User, represented by their wallet, can participate in the economy system through an address, which is attained by applying Keccak-256 hash function on his public key. The Ethereum Blockchain enables users to send transactions in order to either send Ether to other wallets, create new Smart Contracts or invoke any of their functions. Since Smart Contracts are scripts residing on the Blockchain as well, they are also assigned a unique address. A Smart Contract is called by sending a transaction to its address, which triggers its independent and automatic execution, in a prescribed manner on every node in the network, according to the data that was included in the triggering transaction.

Smart Contracts representing ERC20 tokens comply with a protocol defining the manner in which the token is transferred between wallets and the form in which data within the token is accessed. Among these requirements, is the demand to implement a transfer method, which will be used for transferring the relevant token from one wallet to another. Therefore, each transfer of an ERC20 token will be manifested by a wallet sending a transaction to the relevant Smart Contract. The transaction will encompass a call to the transfer method in its data section, containing the amount being transferred and its recipient wallet. Each such token transfer results in altering the 'token's balance', which is kept and updated in its corresponding Smart Contract's storage.

The ERC20 transactions were obtained based on the further requirement of the ERC20 protocol, demanding that each call to the transfer method will be followed by sending a Transfer event and updating the event's logs with all relevant information regarding the token transfer. An Ethereum full node's JSON API was called and all logs matching to the Transfer event structure were fetched. Parsing these logs result in the following fields per transaction: Contract Address—standing for the address of the Smart Contract defining the transferred token, Value—specifying the amount of the token being transferred, Sender and Receiver addresses, being the wallet addresses of the token's seller and buyer, correspondingly.

All ERC20 tokens transactions spreading between February 2016 and June 2018 were retrieved, resulting in 88,985,493 token trades, performed by 17,611,649 unique wallets, trading 51,281 token addresses. Due to the restriction on changing and tempering Smart Contracts, any modification made to a token's designated Smart Contract involves a definite change in its associated Contract Address. As a result, a token can change addresses throughout its lifespan, though for any point in time, it will only be assigned to a single relevant Contract Address. Therefore, the above mentioned amount of unique contract addresses serves merely as an upper bound to the amount of unique tokens. Since no restriction was made to a specific type of token, but the network was observed as a whole trading system, this non-unique identification of tokens does not affect the analysis of the network.

The dataset of ERC20 tokens transactions is extremely diverse and wide ranging, where not only any ERC20 token might correspond to multiple contract addresses, and therefore being considered as various different tokens by the analysis, but also the characteristics of the different tokens are extremely varied. For instance, the tokens differ in their age, their economic value, activity volume and number of token holders, some merely serve as test-runs, others aren't tradable in exchanges yet, and some, according to popular literature, are frauds, all residing next to actual real-world valuable tokens.

Graph Analysis

In order to perceive the network's structure and assess the connectivity of its nodes, the network's degree distribution is analyzed, considering both in-degree and out-degree, indicating the number of incoming and outgoing connections, correspondingly. The degree distribution P(k) denotes the probability that a randomly selected node has precisely the degree k.

In random networks of the type studied by P. Erdös and A. Renyi "*On random graphs, i,*" *Publicationes Mathematicae* (*Debrecen*), vol. 6, pp. 290-297, 1959, where each edge is present or absent with equal probability, the nodes' degrees follow a Poisson distribution. The degree obtained by most nodes is approximately the average degree k of the network. These properties are also manifested in dynamic networks (e.g., P. Erdos and A. Renyi, "*On the evolution of random graphs,*" *Publications of the Mathematical Institute of the Hungarian Academy of Sciences*, vol. 5, pp. 17-61, 1960). In contrast to random networks, the nodes' degrees of social networks (such as the Internet or citation networks) sometimes follow a power law distribution (e.g., as described with reference to R. Albert and A.-L. Barabasi, "Statistical mechanics of complex networks," *Reviews of modern physics*, vol. 74, no. 1, p. 47, 2002:

$$p(k)=k^{-\gamma} \tag{Equation 1}$$

The power law degree distribution indicates that there is a non-negligible number of extremely connected nodes even though the majority of nodes have small number of connections. Therefore the degree distribution has a long right tail of values that are far above the average degree. Power law distributions may be found in many real networks, M. E. Newman, "*Power laws, pareto distributions and zipf's law,*" *Contemporary physics*, vol. 46, no. 5, pp. 323-351, 2005 summarized several of them, including word frequency, citations, telephone calls, web hits, or the wealth of the richest people.

It is noted that even if networks do fit a power distribution, there is no indication that such networks may stabilize. Moreover, for networks that do not currently fit a power distribution, there are no known methods for predicting when such networks will eventually converge to fit a power distribution. It is the inventors that discovered that networks may be predicted to converge according to an analysis of dynamics of power distributions over a historical time interval, as described herein.

Power-Law Fit

The degree distribution of a given graph is plotted on a double logarithmic scale, over 20 logarithmically spaced bins, between the minimal and maximal degrees of relevant graph. Inventors selected splitting the data along 20 bins, in order to accommodate both small networks, having small sets of vertices and consequently possibly small degree sequences, and also large networks obtaining much larger variance of the degree set. The bins' heights were fit to a Linear Model, using ordinary Least Squares Regression, while considering all binned data points. The goodness-of-fit of the power-law model to the degree distribution was verified by calculating the coefficient of determination of the fit, i.e its $R^2$, computed as follows:

$$R^2 = 1 - \frac{\sum_k (y_k - f_k)^2}{\sum_k (y_k - \bar{y})^2} \tag{Equation 2}$$

where: yk=P(k) denote the degree distribution values, fk denote the modeled degrees by the fitted power-law model, and $\bar{\gamma}$ denotes the means of the empirical degree distribution:

$$\frac{1}{n}\sum_k y_k.$$

Oscillation Dynamics

Inventors discovered that when the ERC20 system is considered as a social physical system, physical models may be used to analyze it. Inventors discovered that the ERC20 system behaves as a dynamical system approaching its equilibrium state, which may be modeled as a damped harmonics oscillator. A harmonic oscillator is a system acted upon by a force negatively proportional to its perturbation from its equilibrium state. Physical systems that are modeled in this way are springs and swings. Systems that also experience a velocity-dependent friction-like force, e.g. air resistance, are modeled by a damped harmonic oscillator. The dynamical equation for these models is:

$$m\frac{d^2x}{dt^2} = -kx - c\frac{dx}{dt} \qquad \text{(Equation 3)}$$

where x denotes the perturbation from equilibrium, m denotes the mass, k denotes the spring constant and c denotes the viscous damping coefficient. The resonant frequency of the system is defined as $\omega_0 = \sqrt{m/k}$ and represents the oscillation of an undamped system. The damping ratio may be defined as $$\zeta = \frac{c}{2\sqrt{mk}},$$

which represents how strong the damping is, compared to the resonant frequency, such that an overdamped system $\zeta>1$ does not oscillate, but exponentially converges to the equilibrium state, whereas an under-damped system $\zeta<1$ oscillates with a modified frequency $\omega_1=\omega_0\sqrt{1-\zeta^2}$ during its exponential convergence. The case of critically damped system $\zeta=1$ is an important one in physics, but does not relate to the analysis presented below.

Given an under-damped oscillator, the dynamics of the system can be described by the following function:

$$x(t)=A\cdot e^{-\omega_0\zeta t}\cdot\sin(\omega_0\sqrt{1-\zeta^2}t+\varphi)+x_\infty \qquad \text{(Equation 4)}$$

where: $\varphi$ denotes the phase of the oscillation and $x_\infty$ denotes the equilibrium state.

Inventors used the under-damped oscillator in the computational evaluation described herein in order to model the dynamics of the ERC20 network meta-parameter and extract the parameters of its dynamics.

Results—ERC20: A Non-Homogenous Network

As discussed, inventors studied an extremely diverse and wide-ranging dataset. Apart from token's types and different designations, ERC-20 presents a widely varied nature which comes into play in many aspects. Presented below is an analysis of other more technical aspects of data, inflicting even further on the network's non-homogeneous nature.

The analysis is restricted to active tokens, which have at least 100 buyers and 100 sellers during the examined 2 years period, resulting in 2649 ERC20 tokens, forming 5% of the entire tokens amount. Formally defined as:

Definition 1. Let FT denote the Full Timespan between February 2016 and June 2018. Given an ERC20 token CT, denote by B(CT) and S(CT) the sets of wallets who bought and sold CT during FT, correspondingly. Define $T_{100}^{act}$ the set of active tokens during FT, as all ERC20 tokens having at least 100 buyers and sellers during FT:

$$T_{act}=\{CT:|B(CT)|\geq 100 \text{ and } |S(CT)|\geq 100|\}$$

Figure 4A:
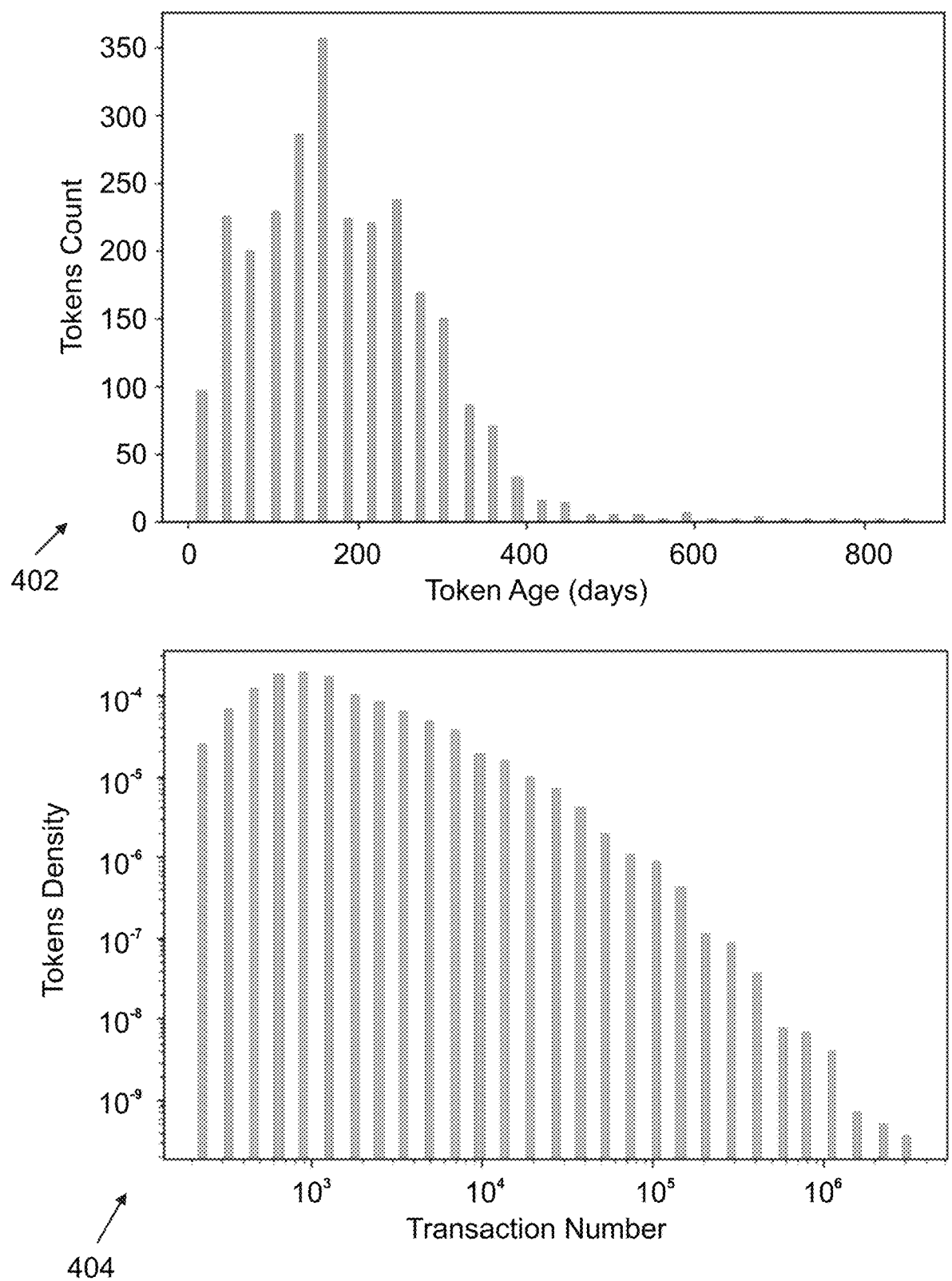
FIGS. 4A-4R are schematics computed in association with the computational evaluation described herein, in accordance with some embodiments of the present invention.
Figure 4B:
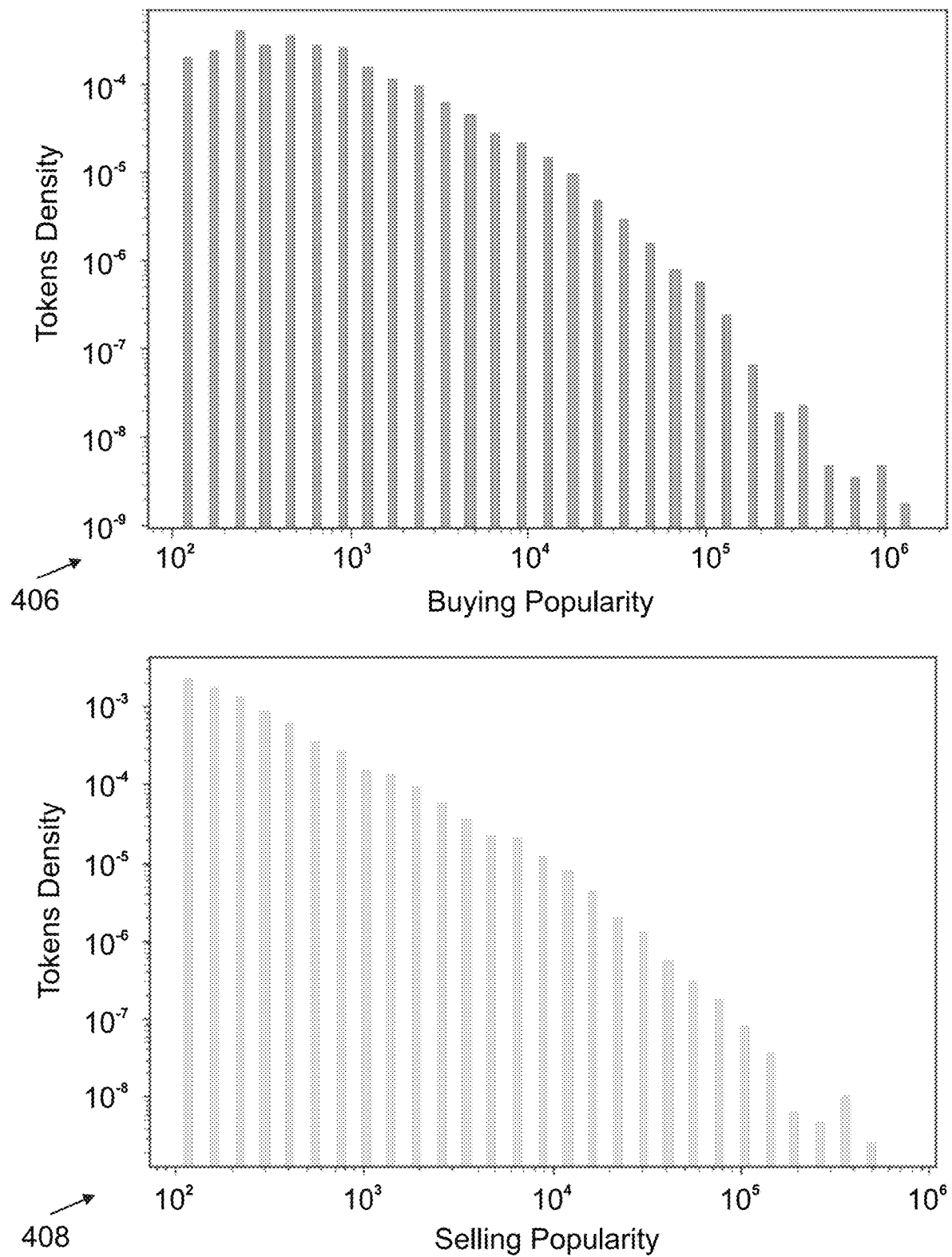
Figure 4C:
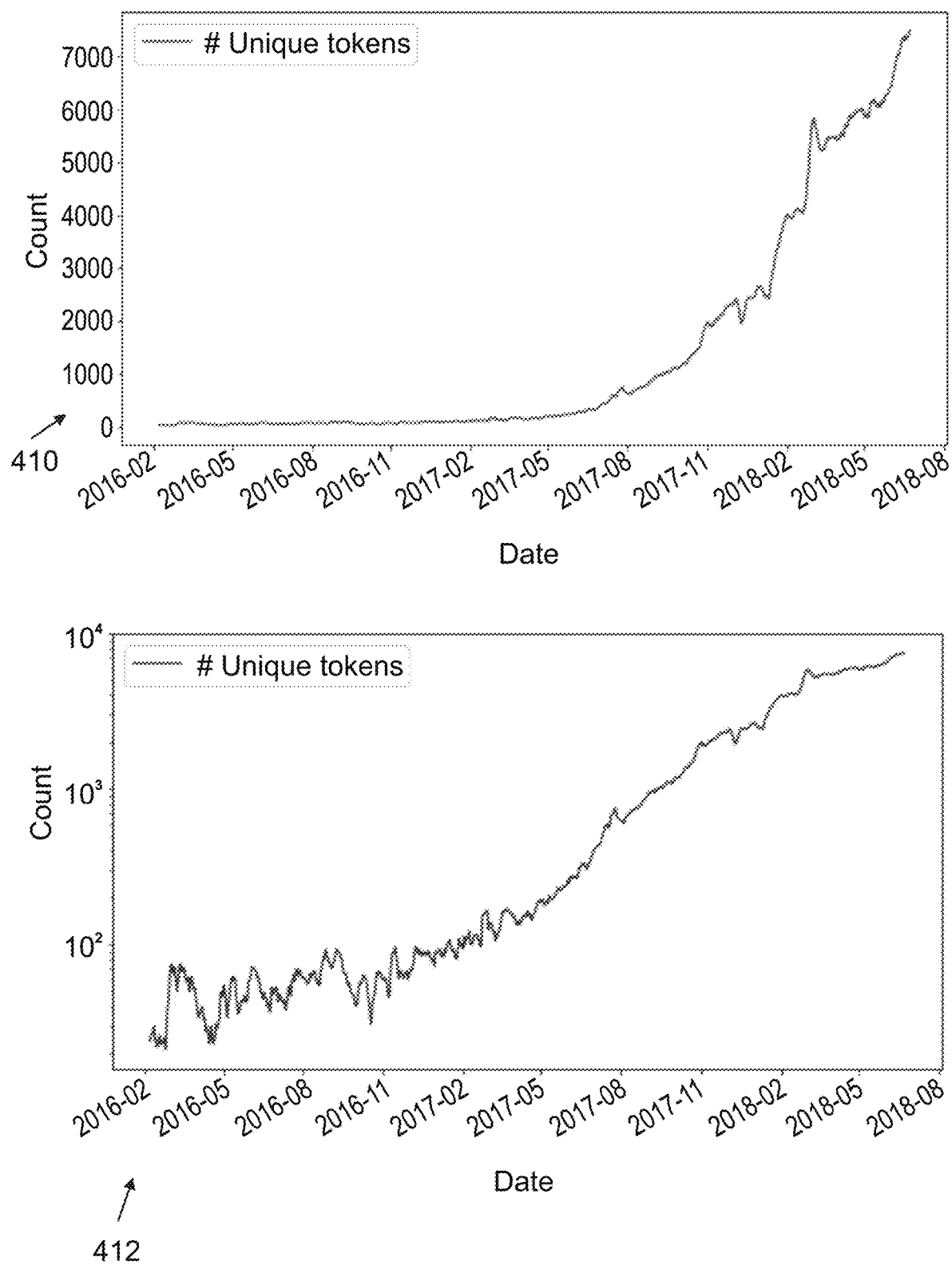
Figure 4D:
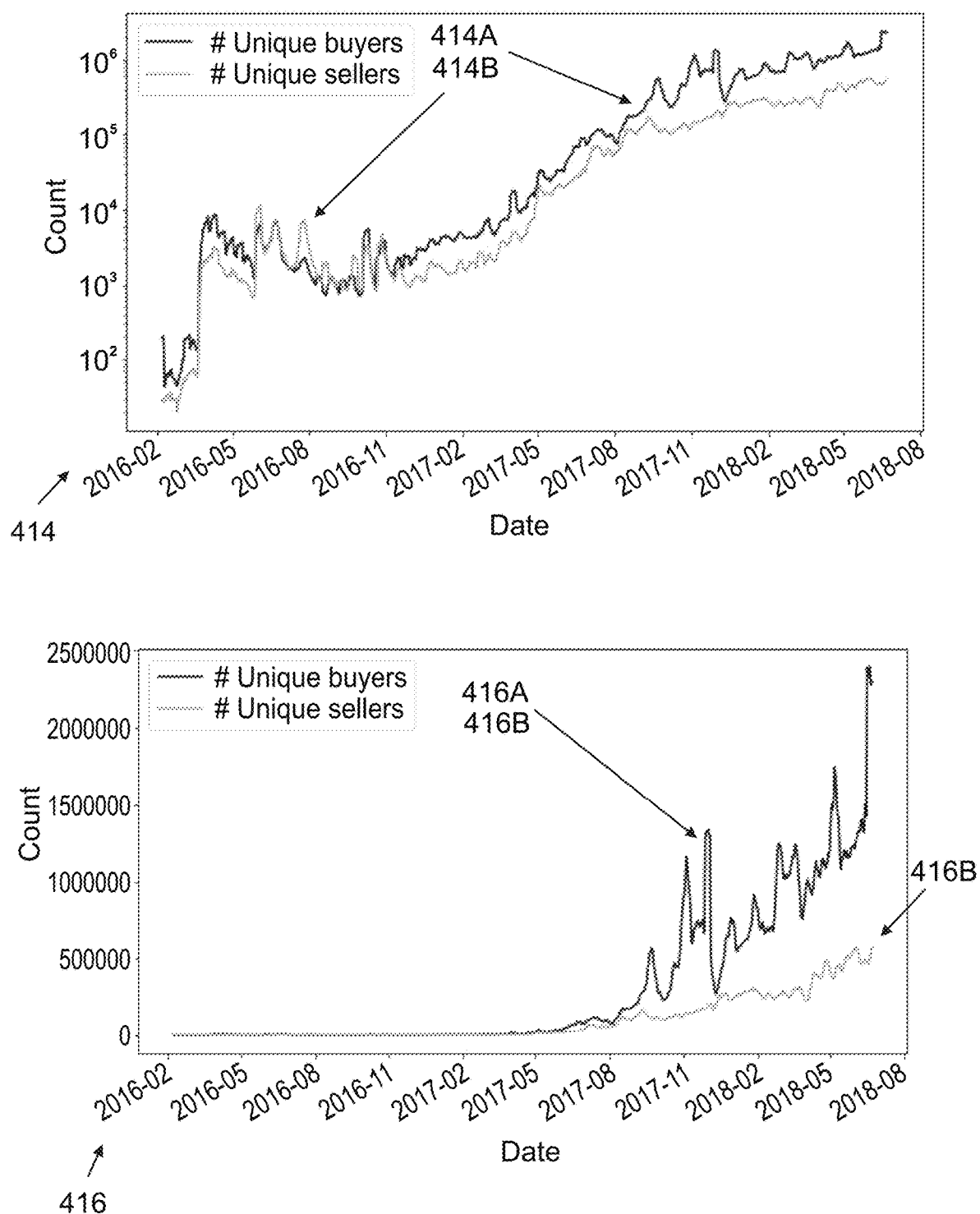
Figure 4E:
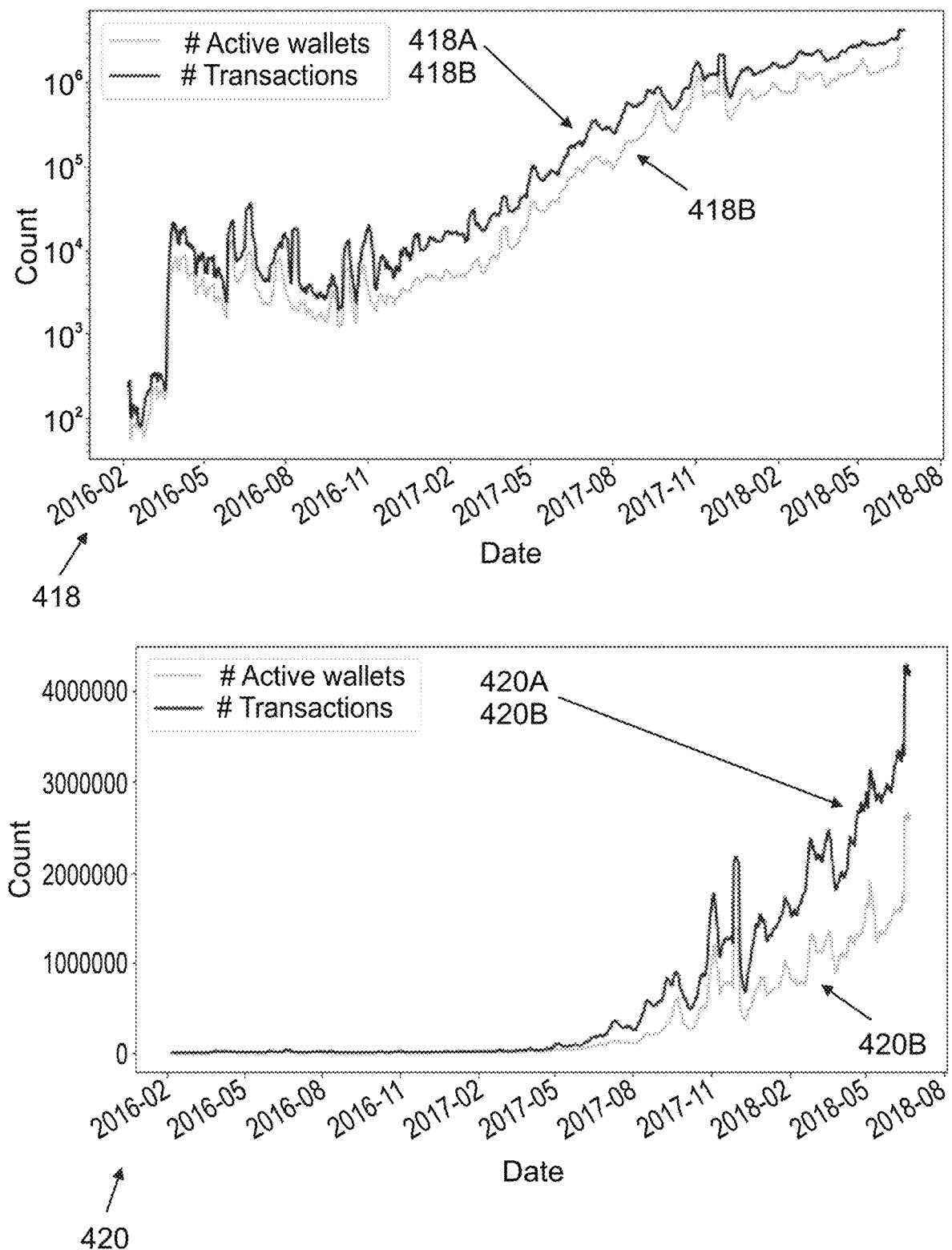
Figure 4F:
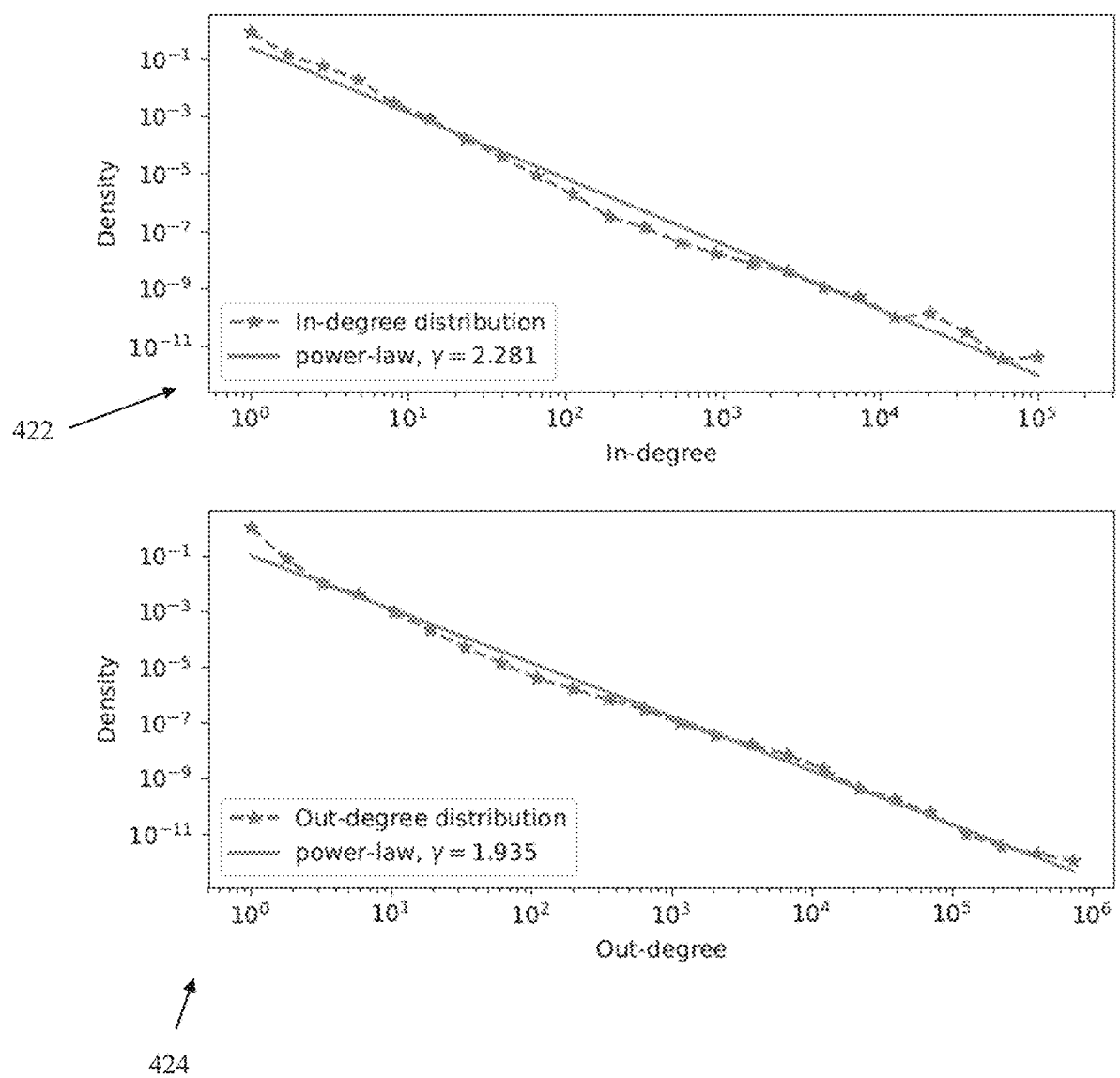
Figure 4G:
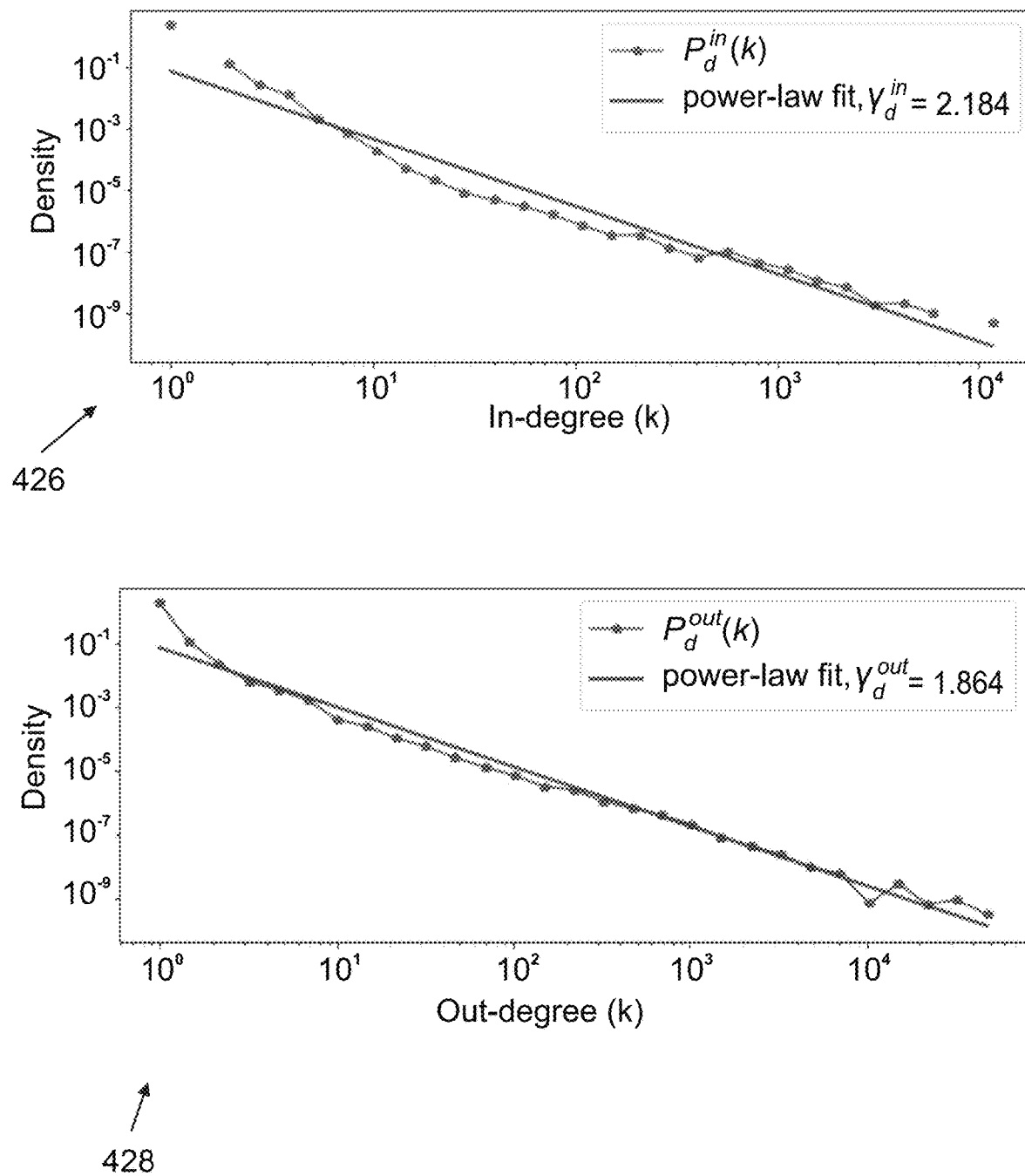
Figure 4H:
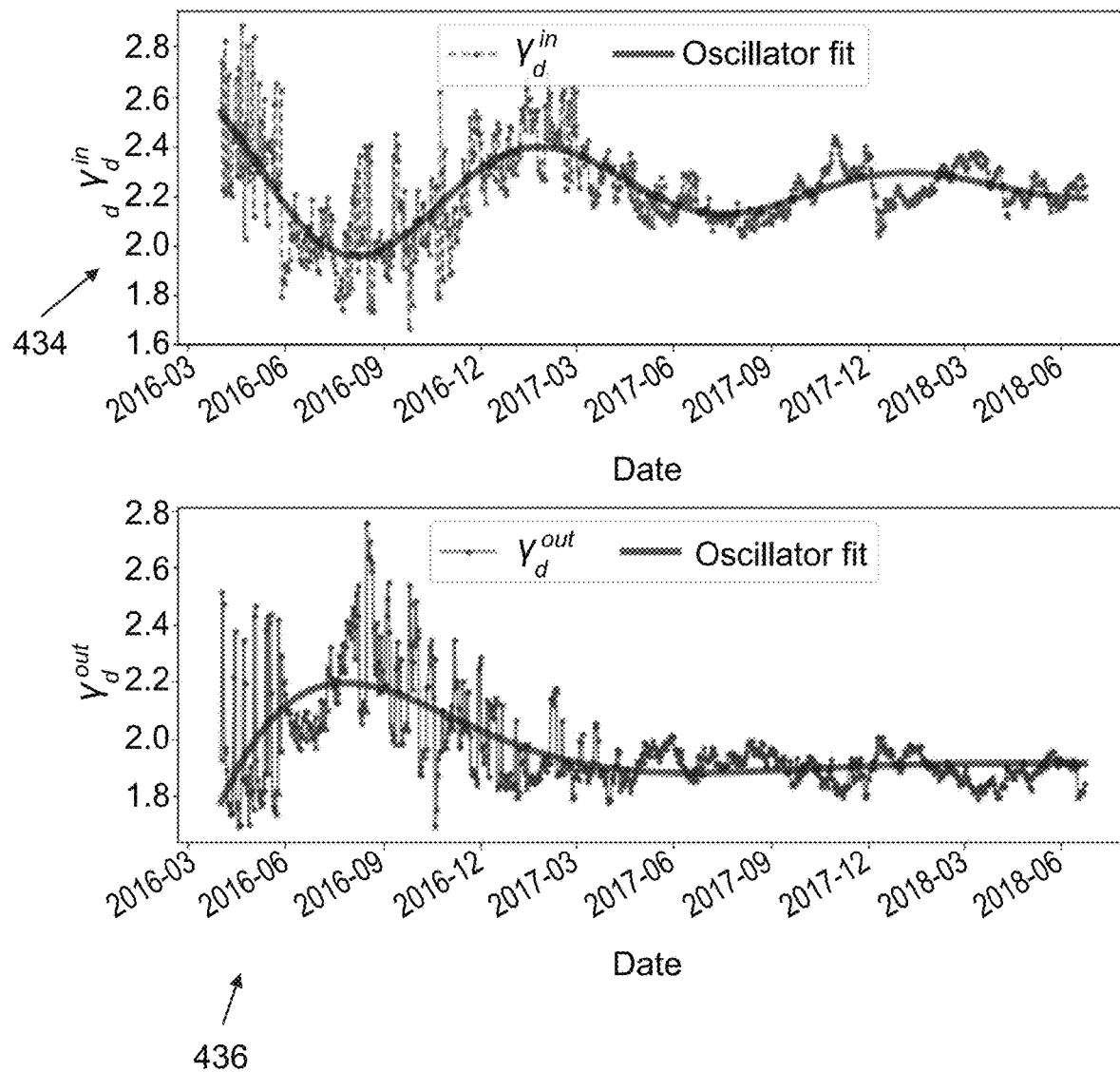
Figure 4I:
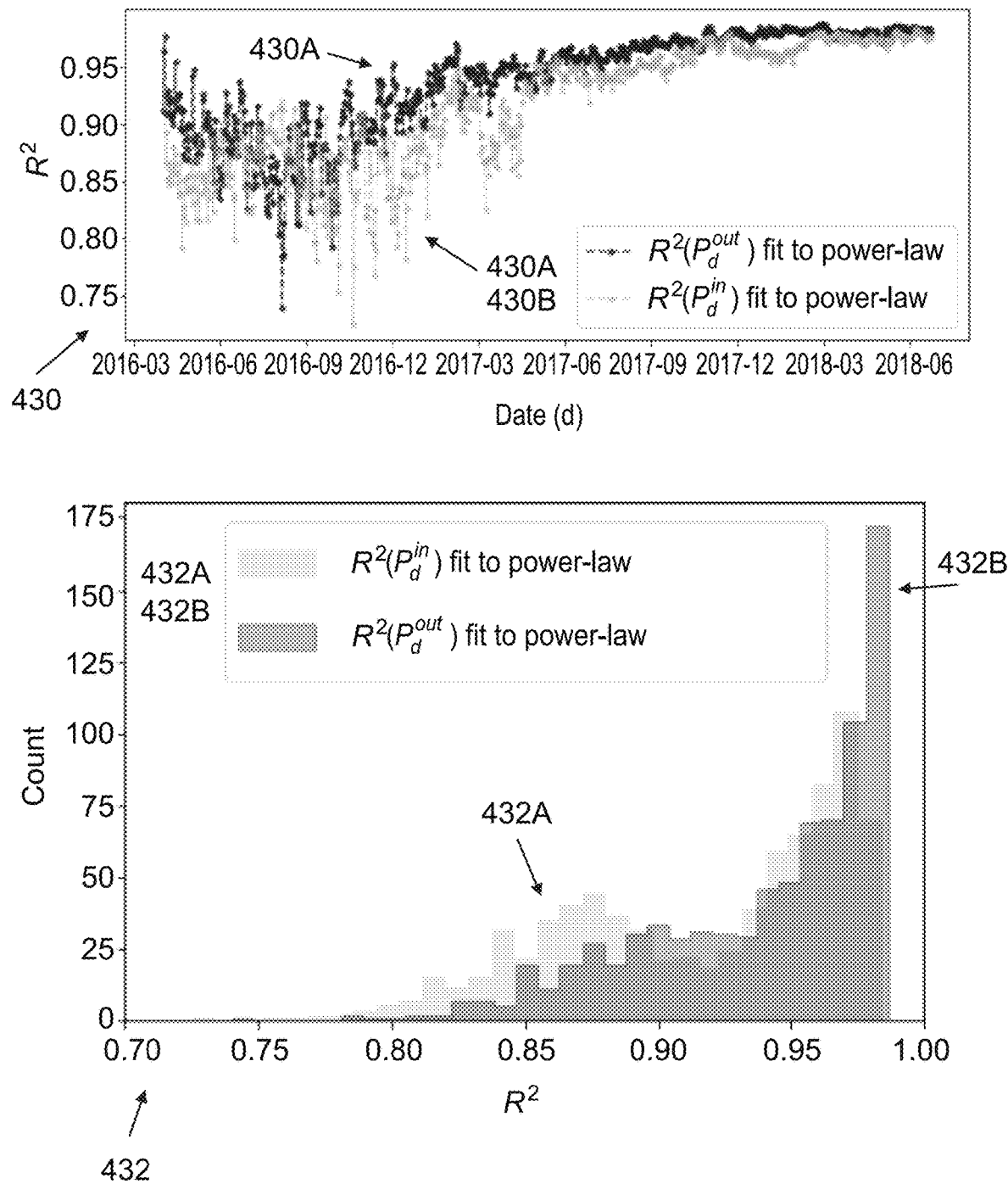
Figure 4J:
Figure 4J:
Figure 4K:
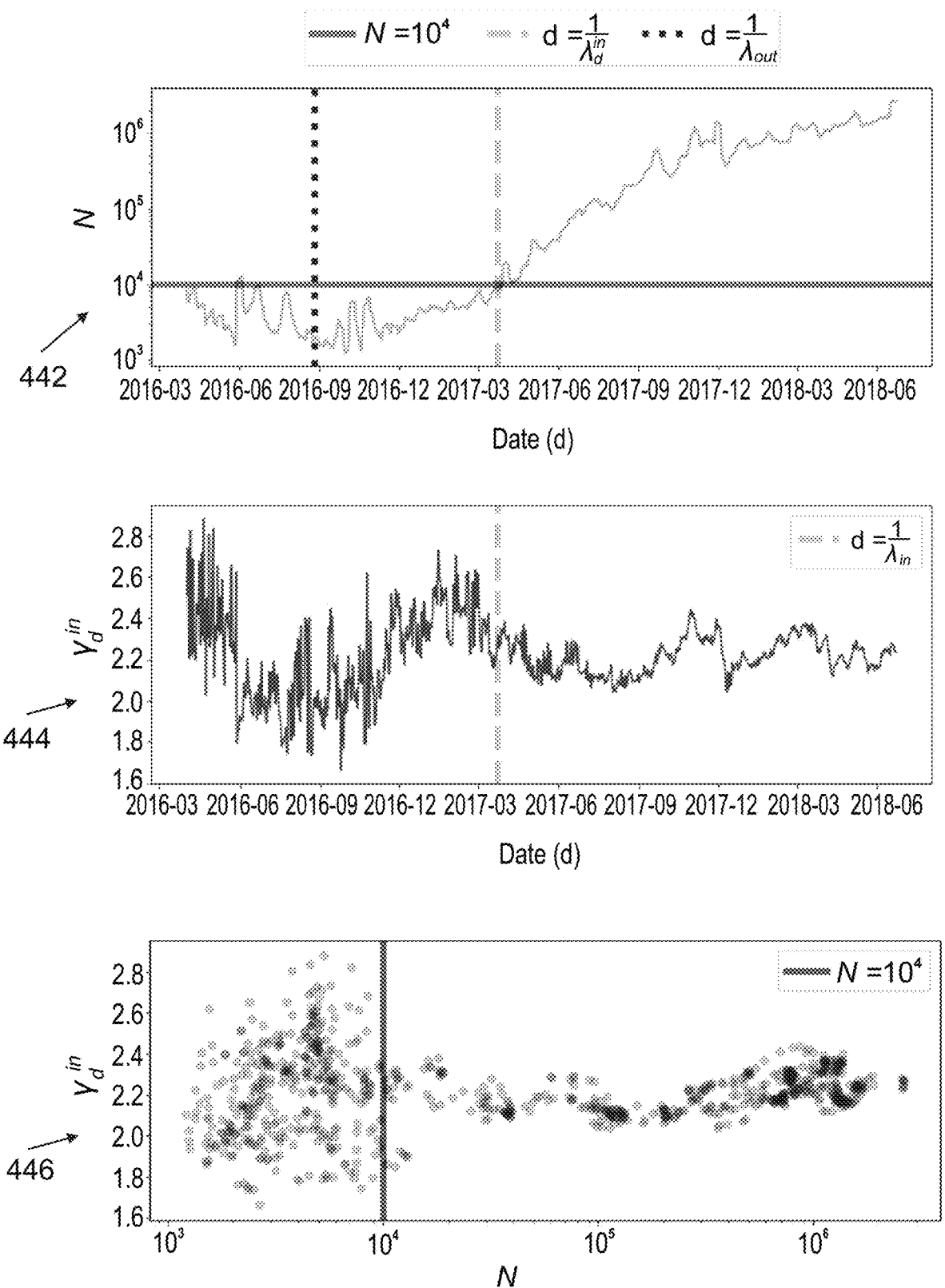
Figure 4K:
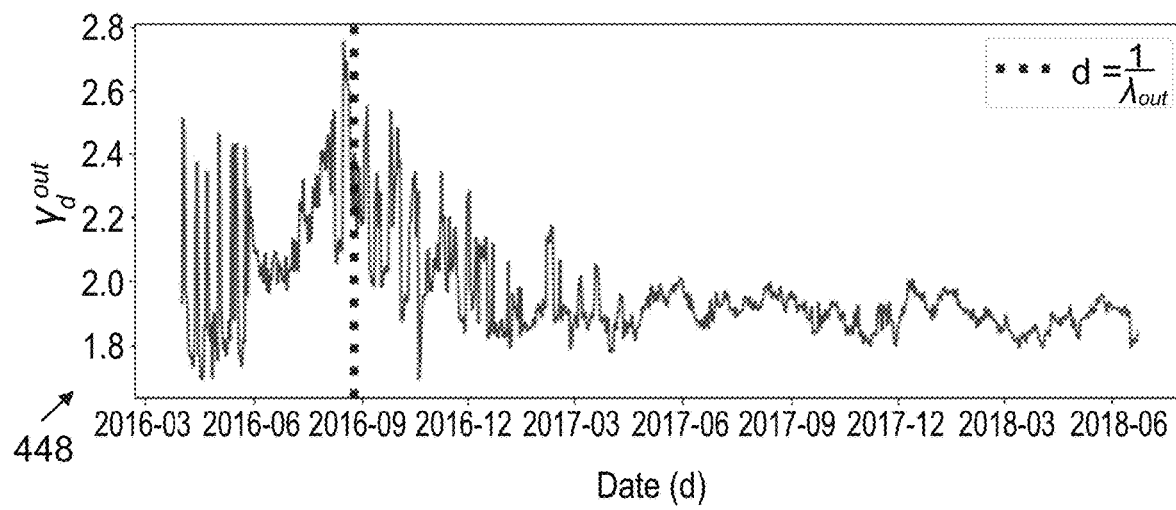
Figure 4K:
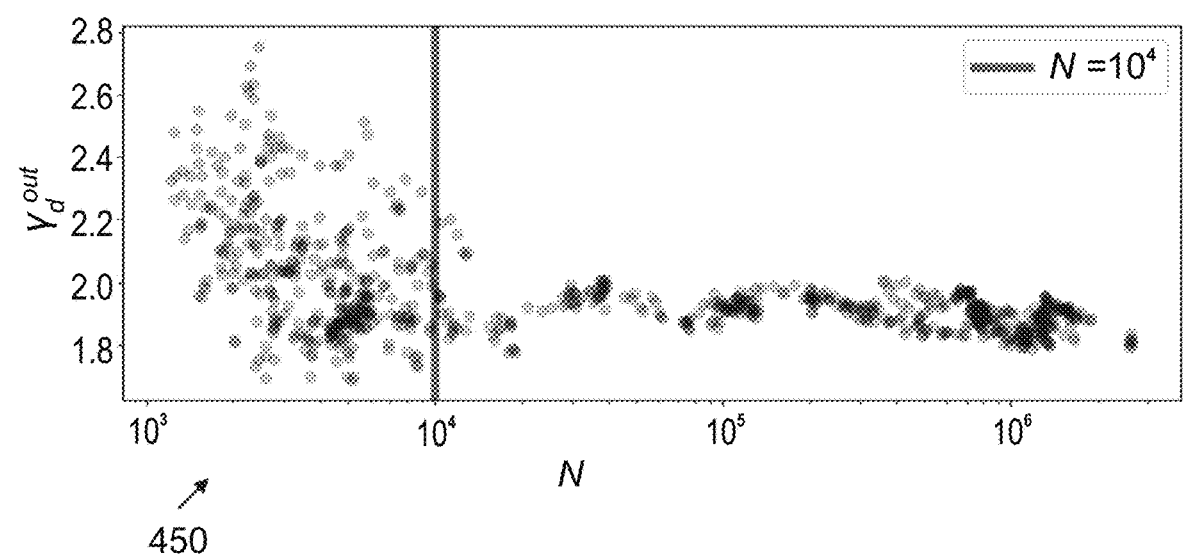
Figure 4L:
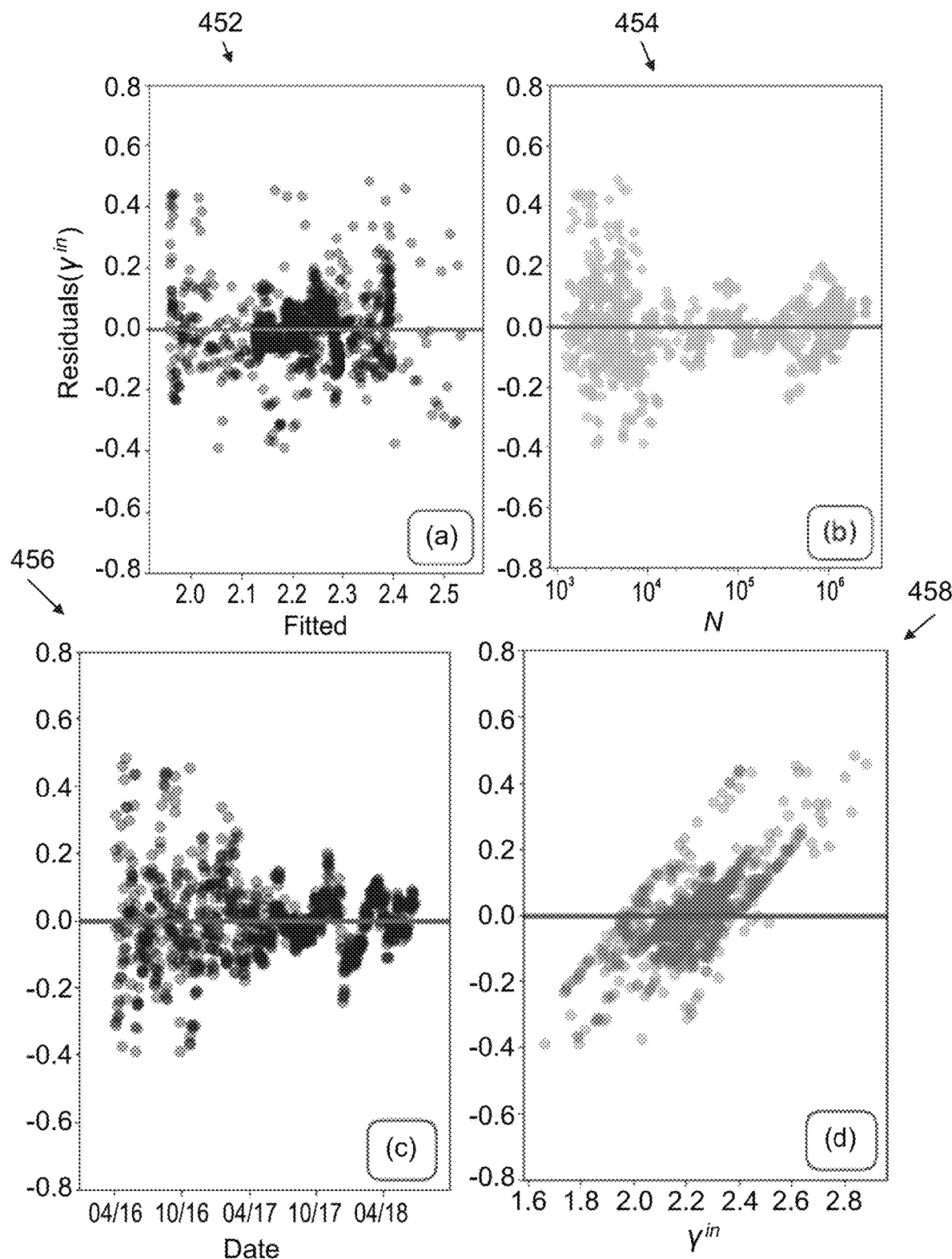
Figure 4L:
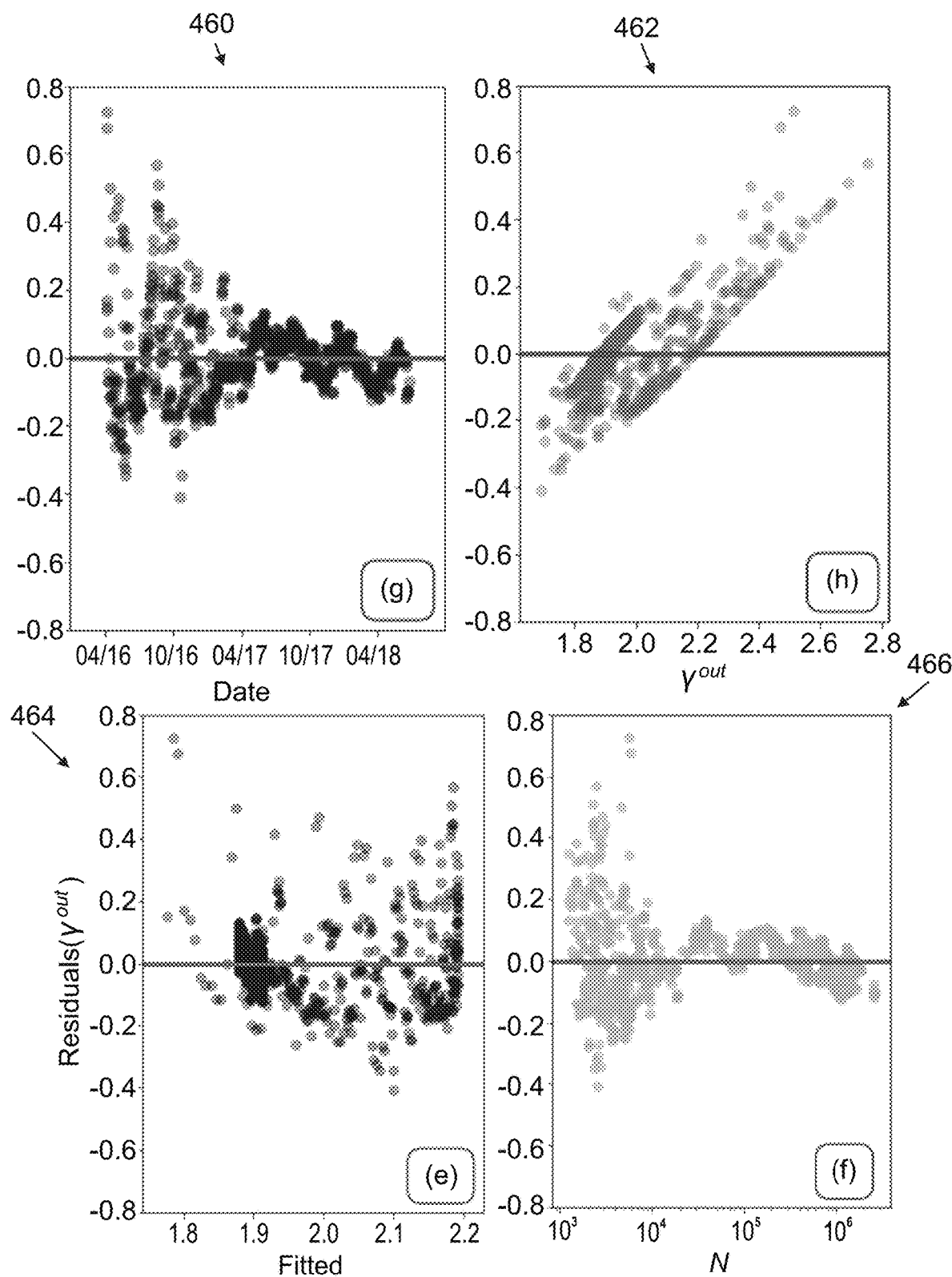
Figure 4M:
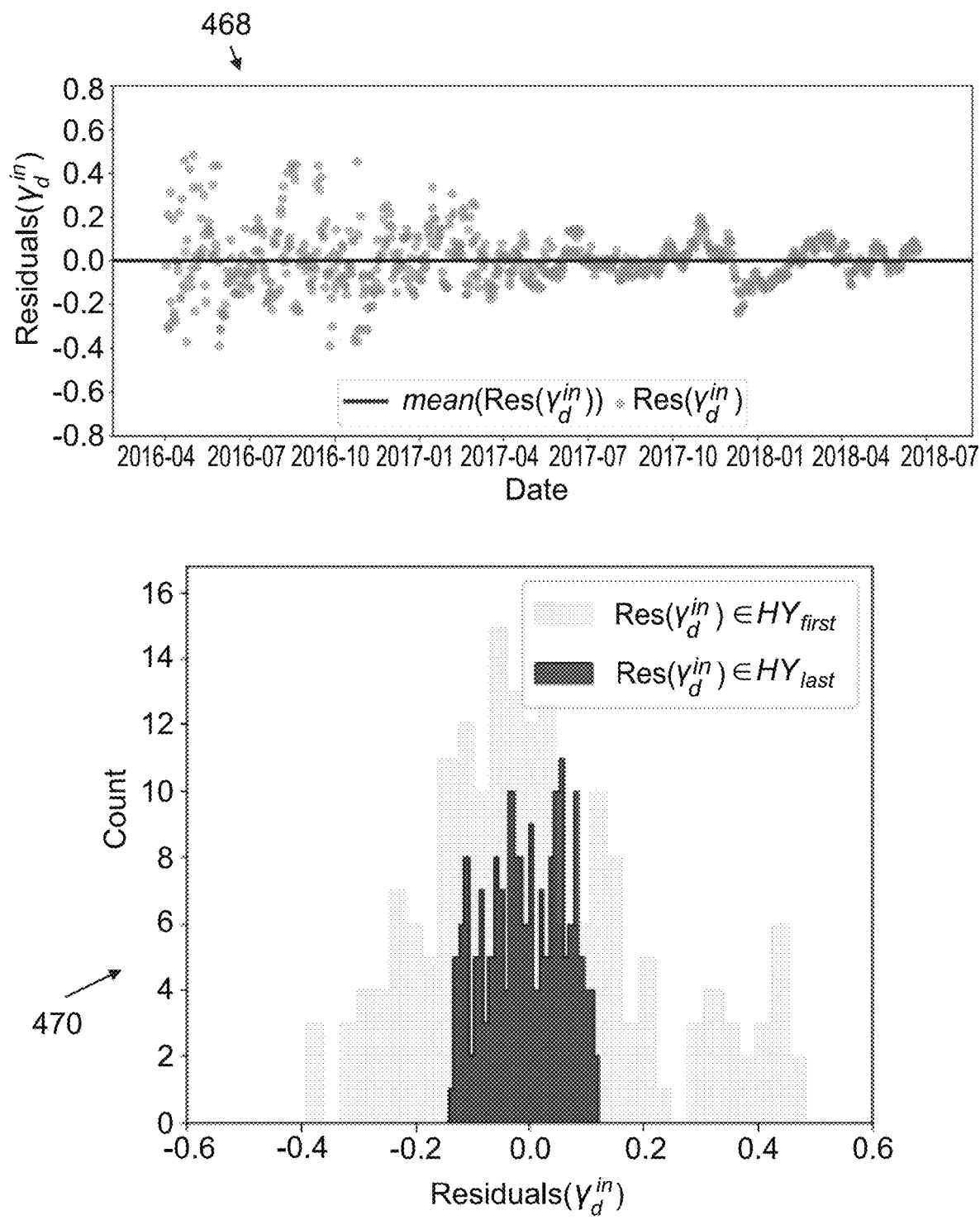
Figure 4M:
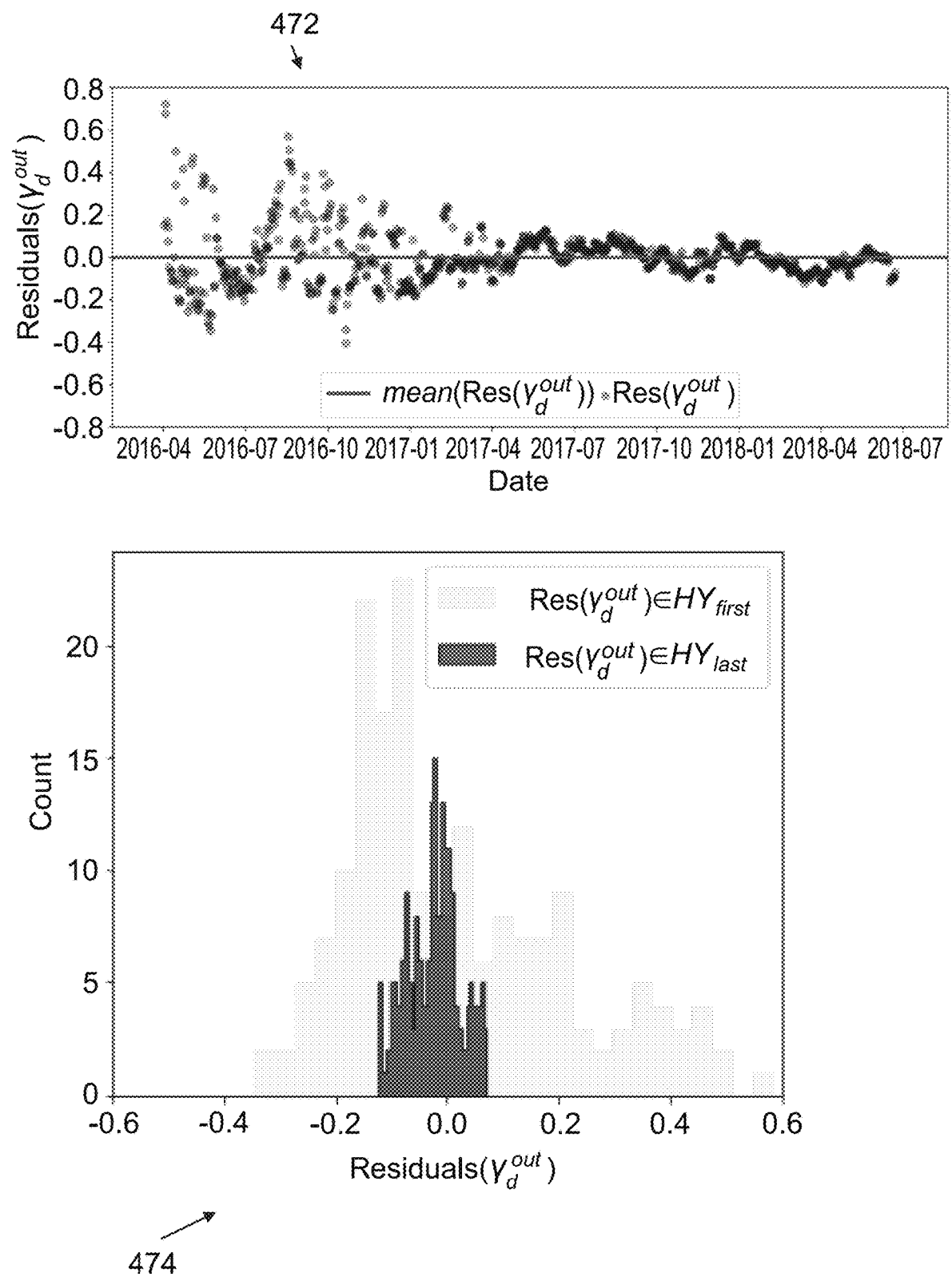
Figure 4N:
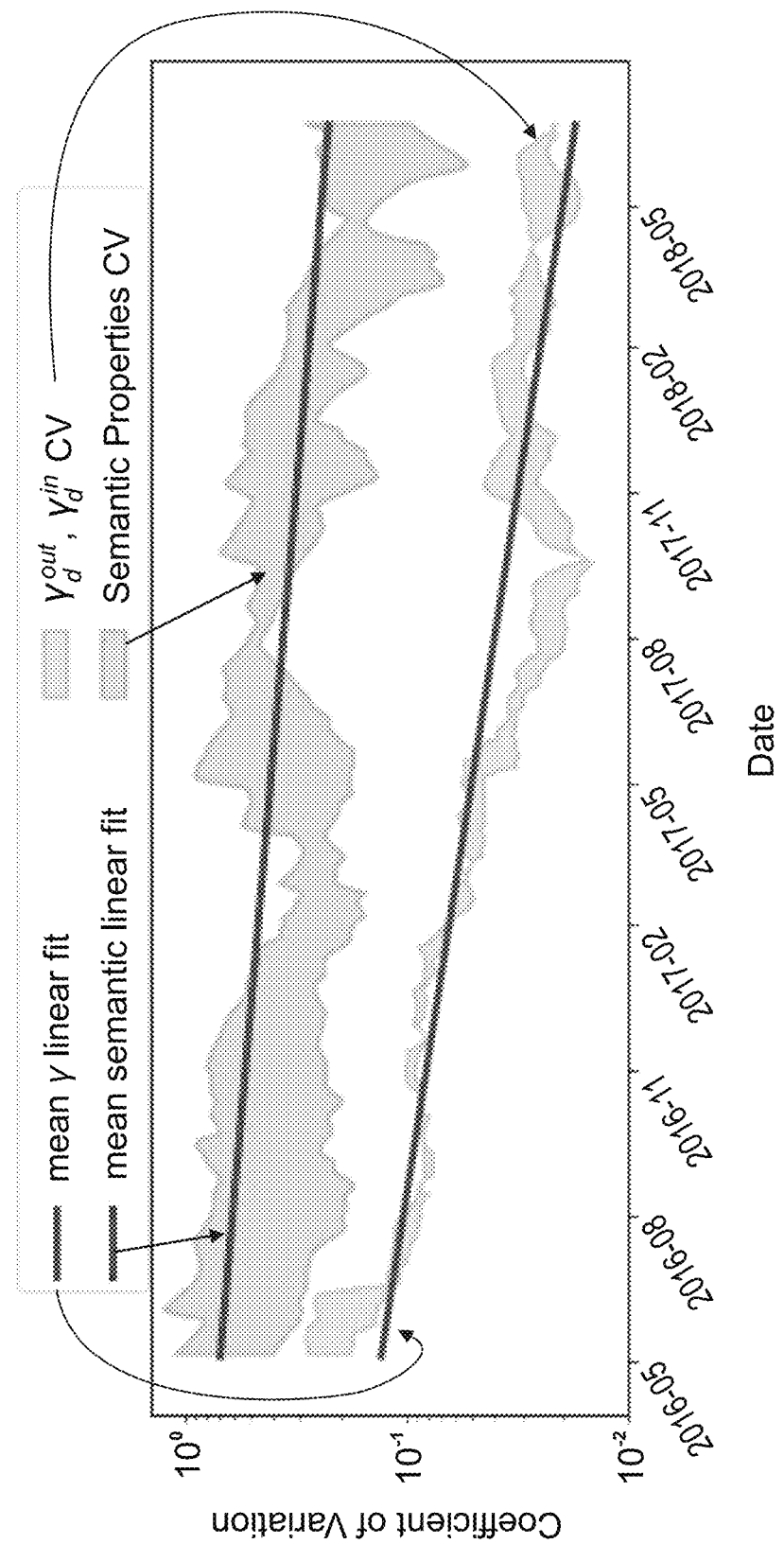
Figure 4O:
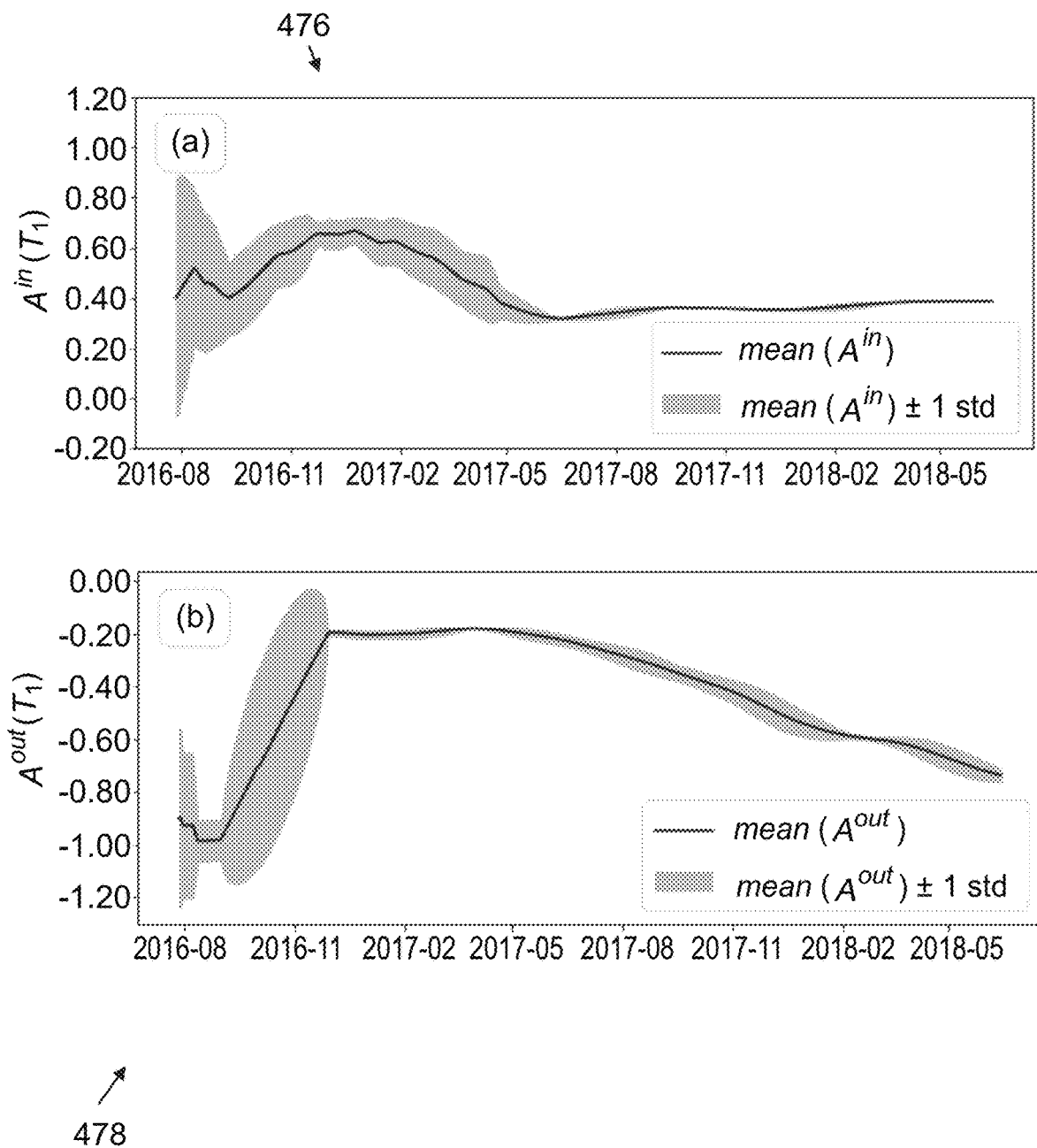
Figure 4P:
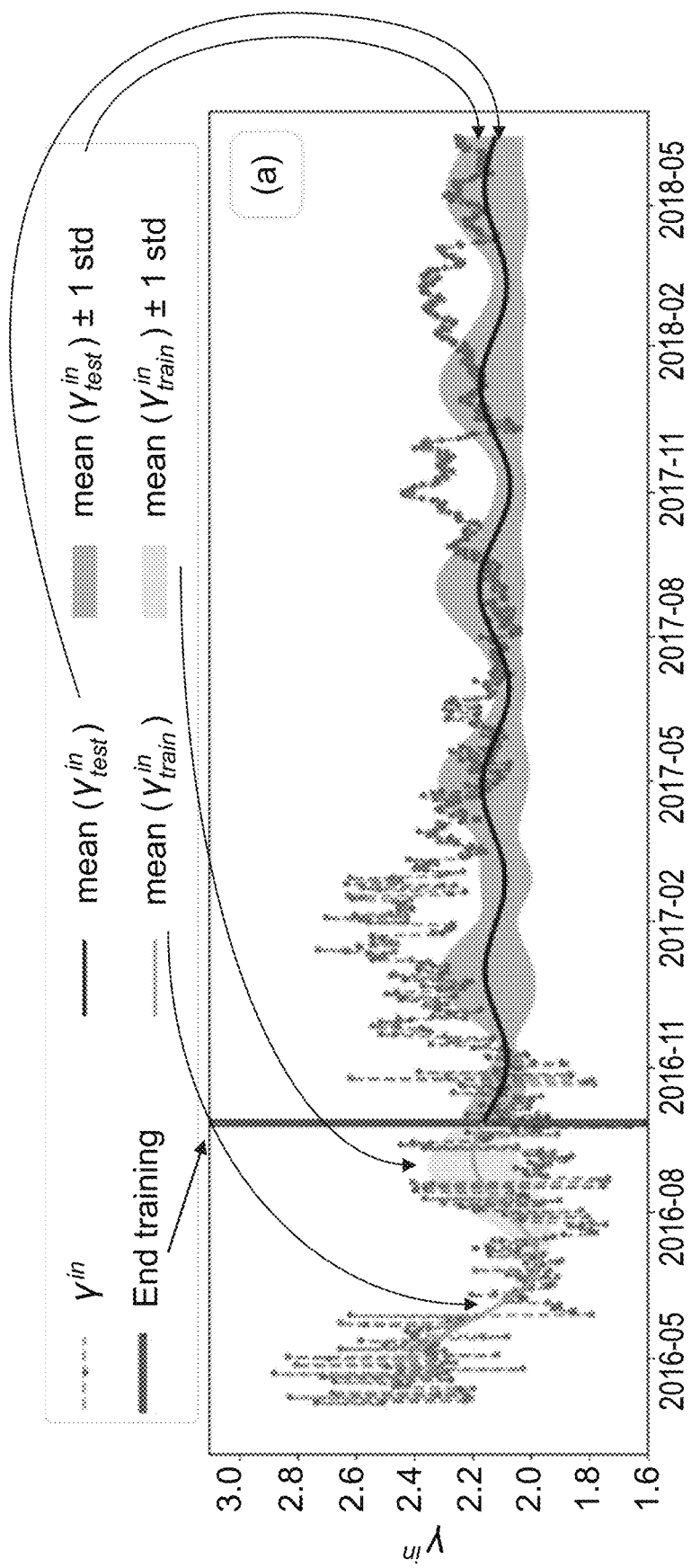
Figure 4Q:
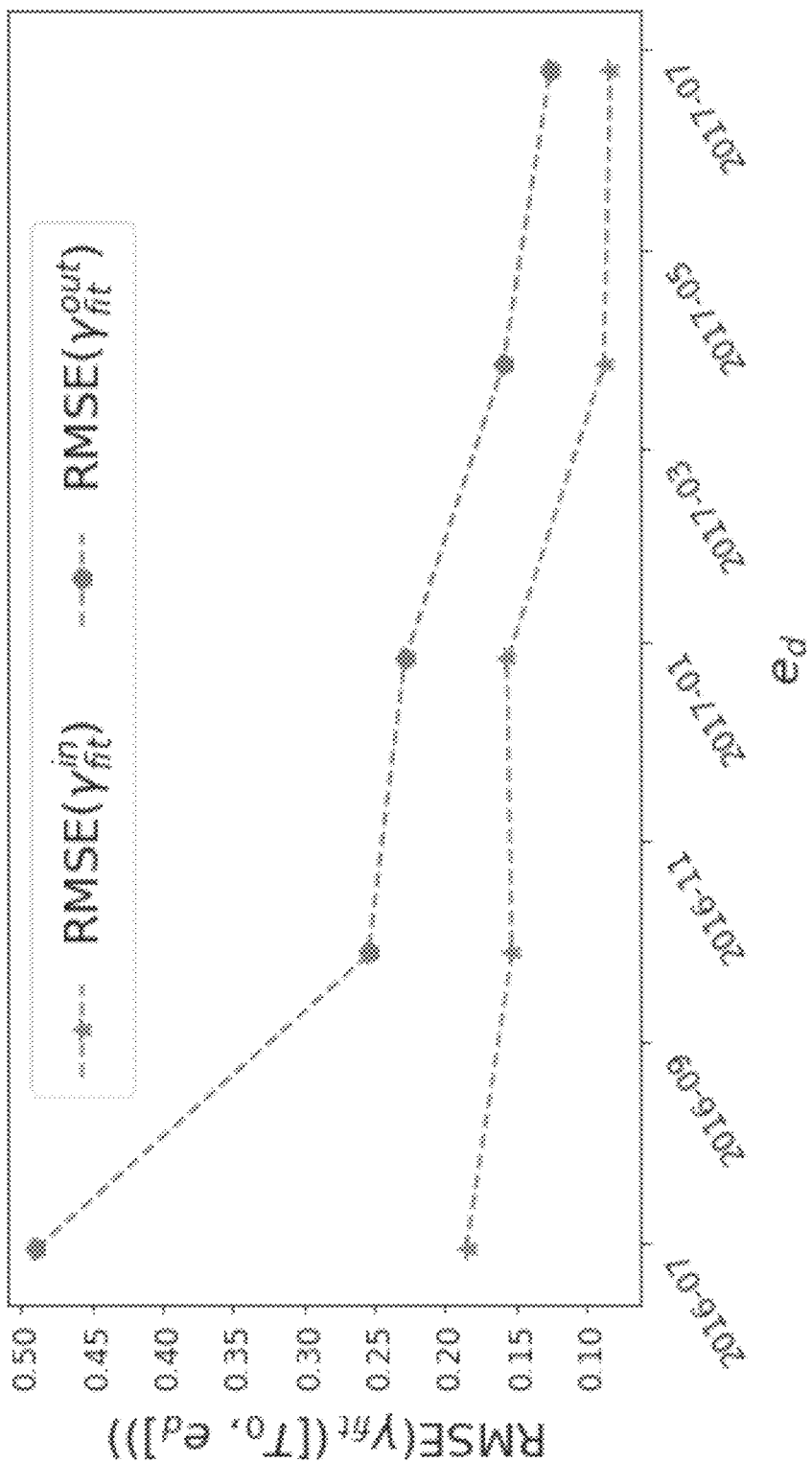
Figure 4R:
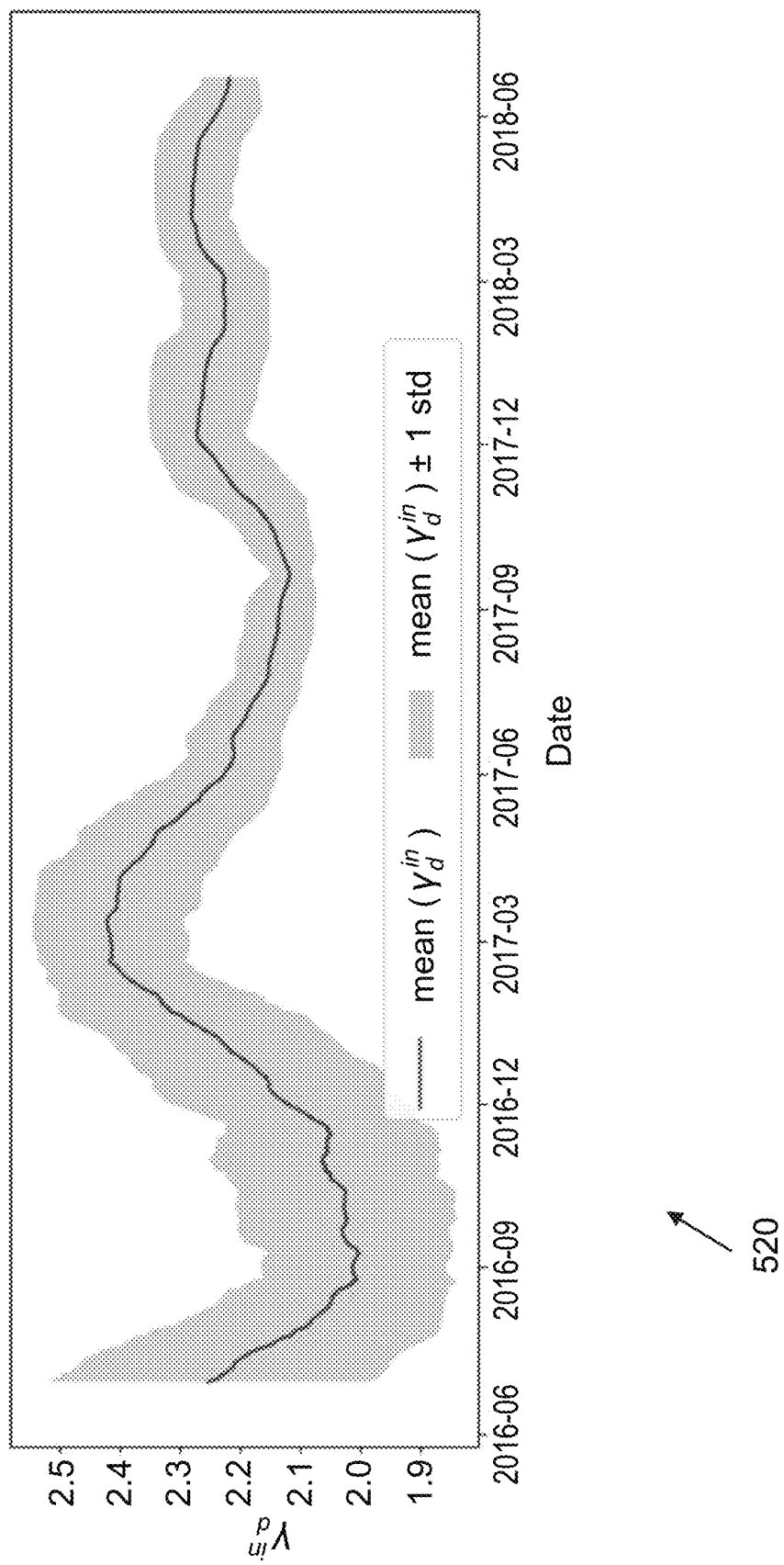

Reference is now made to FIGS. 4A-4R which are schematics computed in association with the computational evaluation described herein, in accordance with some embodiments of the present invention.

The active tokens' age and trading volume distributions are presented in FIG. 4A, both presenting high variance and inflicting even further on the network's diversity. Graph 402 depicts age distribution, and graph 404 depicts trading volume distribution of active tokens $CT\in T_{100}^{act}$.

Both properties exhibiting great variance, suggesting young and old, low-traded and high-traded tokens residing in a single ecosystem inflicting on its variance and non-homogeneous character.

The distribution of token's popularity, in terms of buyers and sellers amount is analyzed.

Definition 2. Let CT be an ERC20 token. The token's Buying Popularity during timespan FT, denoted by BP, is defined as the number of unique wallets which bought the token during the examined time:

$$BP(CT):=|\{w_v: \text{wallet} w_v \text{ bought } CT \text{ during } FT\}| \qquad \text{(Equation 5)}$$

Correspondingly, Selling Popularity during time FT, denoted by SP, is defined as the amount of unique wallets who sold token CT during this time:

$$SP(CT):=|\{w_v: \text{wallet} w_v \text{ sold } CT \text{ during } FT\}| \qquad \text{(Equation 6)}$$

As depicted in FIG. 4B, ERC20 tokens' both Buying Popularity (shown in histogram 406) and Selling Popularities (histogram 408) follow a power-law distribution, thereby expressing the diversity of token holders along a 2 years period, between February 2016 and June 2018. Particularly, it is noted that most tokens are traded by an extremely small amount of users and on the other hand, a few popular tokens exist, traded by a very large group of users during the examined timespan.

Inventors conclude that all active tokens, $CT\in T_{100}^{act}$ reside together in a single ecosystem, having diverse types and functionality, varied age, trading volume and popularity, resulting in a multi-faceted, extremely non-homogeneous network.

ERC20 Dynamics: A Semantic Approach

The main objective of Inventors in performing the computational evaluation described herein is to explore and comprehend the dynamics of the diverse network of ERC20 over time. For comparison purposes, the network's evolvement through time was analyzed using a traditional semantic approach, analyzing ERC20 data characteristics over time. Inventors observed weekly rolling window snapshots of the ERC20 transactional data denoted $w_d$, throughout FT:

$$w_d=[d-7,d], \forall d\in FT$$

and analyzed the evolution of several intrinsic properties of the data.

Inventors observed the number of traded ERC20 tokens within each week of data, denoted $w_d$, throughout the entire FT timespan, as is presented in FIG. 4C. Due to the huge inflation in the number of ERC20 tokens created during FT, it's of no surprise that the rolling count of traded tokens presents a general increasing tendency. However, it's not monotonous, as there were times when the number of weekly traded tokens presented evident and not negligible decreasing patterns. FIG. 4D depicts the number of unique traded tokens for each d related week, presented both in linear (410) and logarithmic scale (412) graphs, where the logarithmic scale emphasizes signal diversity during the first year, and the logarithmic scale presents unstable behaviour during the last year of data.

The instability becomes even clearer when observing the number of unique buying and selling wallets over time, depicted in FIG. 4D. FIG. 4D includes graphs depicting the number of unique selling 414B 416B and buying wallets 414A 416A within [d−7; d) presented both in linear 414 and logarithmic scale 416, where the logarithmic scale emphasizes signal diversity during the first year, and the logarithmic scale presents unstable behaviour during the last year of data. The first year of data presents not only unstable dynamics of these two properties, but also reveals how the ERC20 network shifts its vocation multiple times from a Buyers Ecosystem, where more unique buyers than sellers exist, into a Sellers Ecosystem, where more unique sellers take part in the weekly ERC20 transactions snapshot, and vice-versa. The second year of data reveals the network has transformed into a Buyers Ecosystem, though the ratios between unique buyers and sellers continue to undergo drastic changes.

FIG. 4E includes graphs 418 420 presenting the number of weekly active wallets 418A 420A and transactions 418B 420B volume, presented both in linear (418) and logarithmic scale (420), where the logarithmic scale emphasizes signal diversity during the first year, and the logarithmic scale presents unstable behaviour during the last year of data. FIG. 4E depicts the dynamics of total number of active wallets throughout time, and the evolution of number of transactions among them over time. These two properties present the same phenomena of instability, where smooth and monotonic trends are not evident, and drops of over 60% exist along FT, and no consolidation process is evident in this prism.

Inventors conclude that the semantic, more traditional approach for reviewing the network's evolution through time, manifests a highly unstable, unpredictable ecosystem. The erratic behaviour, across multiple properties, might imply the network's inability to reach equilibrium.

ERC20: Network Theory Applicability

Inventors discovered that a more network-related prism may be used to analyze whether the ERC20 network undergoes a consolidation process throughout the examined timespan. Inventors discovered that the ERC20 network is arranged in a scale free, power-law governed regime, despite the aforementioned tokens' diversity. A directed graph was constructed, including all ERC20 transactions during the examined 2 years period, namely:

Definition 3. Let FT denote the Full Timespan between February 2016 and June 2018. The ERC20 Full Transactions Graph, GFT (V,E) denotes a directed graph based on all transactions made during FT, with any of the traded ERC20 tokens. The set of vertices V consists of all ERC20 trading wallets in the period:

$$V := \{v \| wallet w_v \text{ bought or sold any token during } FT\} \quad \text{(Equation 7)}$$

and the set of edges $E \subseteq V \times V$ is defined as:

$$E := \{(u,v) \| wallet w_u \text{ sold any token to } w_v \text{ during } FT\} \quad \text{(Equation 8)}$$

The resulting graph includes 6,890,237 vertices and 17,392,610 edges. Out-going edges depict transactions in which wallet denoted wu sold any type of ERC20 token to other wallets, and in-coming edges to u are formed as result of transactions in which wu bought any ERC20 token from others. Out-degree of vertex u represents the number of unique wallets buying tokens from wu and its in-degree depicts the number of unique wallets selling tokens to it. Surprisingly, despite the great variance between the traded tokens in the network, Inventors discovered that the degree distribution depicts a strong power-law pattern, as presented in FIG. 4F. Inventors discovered that the ERC20 Full Transactions Graph denoted GFT, displays similar connectedness structure to other real-world networks, (e.g., as described with reference to A. Barrat, M. Barthelemy, and A. Vespignani, *Dynamical processes on complex networks. Cambridge university press*, 2008, M. E. Newman, "*The structure and function of complex networks,*" SIAM review, vol. 45, no. 2, pp. 167-256, 2003, M. E. Newman, "*Power laws, pareto distributions and zipf's law,*" Contemporary physics, vol. 46, no. 5, pp. 323-351, 2005) presenting a non-negligible number of highly connected nodes even though the majority of nodes have small number of connections, both in buying and selling transactions.

FIG. 4F includes graphs 422 and 424 depicting an analysis of Blockchain network dynamics for a 2 years period from February 2016 to June 2018. The networks nodes represent ERC20 wallets and edges are formed by ERC20 buy-sell transactions. Outgoing degree of a node reflects the number of unique wallets receiving funds from that node, regardless of the token being transferred, and vice-versa for incoming degree. Both outgoing and incoming degrees present a power law distribution, similarly to what was demonstrated in analysis of mobile phone, citation data and many other real-world networks (e.g., as described with reference to M. E. Newman, "*Power laws, pareto distributions and zipf's law,*" Contemporary physics, vol. 46, no. 5, pp. 323-351, 2005).

However, in order to apply network theory to modeling ERC20s' dynamics over time, verification is performed that the fit is reliable even on shorter periods of time. Inventors formed and analyze weekly transactions graphs, each of which is based on one week of all ERC20 transactions. Formally:

Definition 4. Let FT denote the Full Timespan between February 2016 and June 2018. Given a day d FT, the ERC20 Weekly Transactions Graph, denoted Gd(Vd,Ed), is a directed graph based on all transactions made during [d−7, d), trading any of the ERC20 tokens. The set of vertices Vd consists of all ERC20 trading wallets in that period:

$$V_d := \{v \| wallet w_v \text{ bought or sold any token during}[d-7,d)\} \quad \text{(Equation 9)}$$

And the set of edges $E_d \subseteq V_d \times V_d$ is defined as:

$$E_d := \{(u,v) \| wallet w_u \text{ sold any token to } w_v \text{ during}[d-7, d)\} \quad \text{(Equation 10)}$$

The out (in) degree distributions, $P_d^{out}(k)$ ($P_d^{in}(k)$) signifies the probability that a randomly selected node $v \in V_d$ has precisely out-degree (in-degree) denoted k. When out-degree distribution follows a power-law model, it satisfies:

$$P_d^{out}(k) = k^{-\gamma_d^{out}} \quad \text{(Equation 11)}$$

And correspondingly, the in-degree complies with:

$$P_d^{in}(k) = k^{-\gamma_d^{in}} \quad \text{(Equation 12)}$$

FIG. 4G includes a graph 426 depicting In-Degree distribution ($P^{in}_d(k)$) and a graph 428 depicting out-degree distribution ($P^{out}_d(k)$) of the weekly transactions graph denoted Gd(Vd,Ed), for d=Jan. 31, 2018. Outgoing degree of a vertex reflects the number of unique wallets receiving funds from that vertex, and vice-versa for incoming degree. Both outgoing and incoming degrees present a power-law distribution, obtaining similar $\gamma_d^{out}$ and $\gamma_d^{in}$ values to the achieved corresponding γs for the Full Transactions Graph (See FIG. 4F). FIG. 4G demonstrates that empirical observations, in form of ERC20 weekly transactions graphs coincide with theory, presenting a strong fit of both weekly out and in-degree distributions to the power-law model.

These nice fits to the power-law model demonstrate that Network Theory is applicable to the ERC20 network, despite its extremely diverse and nonhomogeneous nature, and give rise to the possibility of harnessing this domain's power in order to investigate and model the dynamics of ERC20 network over time.

ERC20 Dynamics: The Oscillating Network Model

During the examined timespan of 2.5 years of ERC20 transactions, the network keeps evolving and changing its dynamics. Not only does the rising public interest in Blockchain and tokens induce an exponential growth in transactions' volume, but the traded tokens on the network change as well, as new tokens are established and others lose their impact and decay.

Inventors examined the degree distribution over time, in form of associated γ values. 878 week transaction graphs were constructed, by a sliding window of 1 day, for each day in the 2.5 years period between February 2016 to June 2018:

$$\bigcup_{d \in FT} G_d(V_d, E_d)$$

Inventors calculated both in and out degree distributions for each of these weekly graphs, denoted $P^{in}_d$ and $P^{out}_d$ respectively, and fit each of the weekly graphs to the power-law model.

In order to examine the goodness-of-fit of the power-law model to the empirical degree distribution for each of the weekly graphs, the $R^2$ of each such fit was calculated. The results are depicted in FIG. 4I. Graph 430 depicts $R^2$ of both incoming and outgoing degree distributions fits to power-law, for each Gd, d∈FT. Graph 432 depicts and compares the Gd-s' $R^2$ distributions. It is noted for both $P^{in}_d$ and $P^{out}_d$, over 99% of the fits to power-law yield $R^2 \geq 0.8$, and both present an improvement fit to power-law as d increases (i.e., pattern over time), manifested by the convergence of $R^2$ towards 1 throughout time.

After discovering and establishing that both in and out degrees of the ERC20 network follow a power-law model, throughout the entire FT, Inventors examined the dynamics of the power-law fit, and explicitly the dynamics of its associated γ values along time. Inventors postulate that any network of human related transactions, has a characteristic stable state, in the form of $\gamma_\infty^{in}$ and $\gamma_\infty^{out}$, to which the network strives to converge:

$$\gamma_d^{in} \xrightarrow[d \to \infty]{} \gamma_\infty^{in}, \quad \gamma_d^{out} \xrightarrow[d \to \infty]{} \gamma_\infty^{out}$$

Empirical observations of both $\gamma_d^{in}$ and $\gamma_\infty^{out}$ coincide with this hypothesis, as can be seen in FIG. 4H, and can be efficiently modeled as an Harmonic Under-Damped Oscillator, formally:

$$\gamma_{fit}(t) = A \cdot e^{-\omega_0 \zeta t} \cdot \sin(\omega_0 \sqrt{1-\zeta^2} t + \varphi) + \gamma_\infty$$

FIG. 4H depicts ERC20 transactional network temporal development, in a network related prism, demonstrating the underlying consolidation process the network undergoes. Evolvement of incoming degree distribution gradient, $\gamma_d^{in}$, is depicted in graph 434 and out-degree distribution gradient $\gamma_\infty^{out}$ is displayed in graph 436. Both gradients converge to their stable states $\gamma_\infty^{in}$ and $\gamma_\infty^{out}$ correspondingly, following a Harmonic Under-Damped Oscillator model. The parameters of the under-damped oscillator model are described herein.

FIG. 4J is includes tables 438 and 440 summarizing empirical data fit of both $\gamma_d^{in}$, and $\gamma_d^{out}$.

It is noted that the amplitude of the under-damped oscillator is governed by:

$$A \cdot e^{-\omega_0 \zeta t} \qquad \text{(Equation 13)}$$

The latter enables establishing the time t1 at which the network has reached a stabilization of x %, formally:

Definition 5. Let Gd(Vd, Ed) be the directed graph based on all transactions made during [d−7, d), trading any of the ERC20 tokens, for a given d∈FT. Let $\gamma_d$ denote the power of the associated degree distribution of Gd, whose dynamics modeled by an oscillator $\gamma_{fit}$. The 'x % stabilization time of the network' w.r.t γ to be the time t1 when the amplitude of $\gamma_{fit}$ reaches at most x % of the initial amplitude, observed as time t0:

$$x = e^{\omega_0 \zeta (t_0 - t_1)} \to t_1 = t_0 - \frac{\ln(x)}{w_0 \zeta} \qquad \text{(Equation 14)}$$

This, in turn, enables computation of the time required for the network to reach stabilization, in both aspects of $\gamma_d^{in}$ and $\gamma_d^{out}$. For instance, using the fitted parameters of the under-damped oscillator depicted in Table 438 of FIG. 4J, it can be verified that a 70% stabilization occurs after 430 days for $\gamma_d^{in}$:

$$t_1^{\gamma^{in}} = -\frac{\ln(0.3)}{0.018 \cdot 0.152} = 429.3$$

Using the values x=0.3, $\omega_0$=0.018, ζ=0.152, t0=0. $\gamma_d^{out}$ resents the same stabilization after merely 177 days:

$$t_1^{\gamma^{out}} = -\frac{\ln(0.3)}{0.011 \cdot 0.577} = 176.1$$

where x=0.3, $\omega_0$=0.011, ζ=0.577, t0=0.

ERC20 Dynamics: Network Size Influence

Inventors discovered the extent to which the network size influences the stabilization process undergone by the network. For that intent, inventors analyzed γ as a function of network size denoted N as is presented in graphs 446 and 450 of FIG. 4K, for both $\gamma_d^{in}$ and $\gamma_d^{out}$. Both present a 2-phased behaviour of γ as a function of N, separated by a threshold at N0=$10^4$. The first phase manifests a random dispersion of γ values, along different N-s, while the second phase consists of quite constant trend in γ values.

Inventors postulate that the random phase of γ indicates the oscillations observed in γ along time, are not N dependent. This assumption can be validated by observing graphs 442 and 444 in FIG. 4K. Graph 444 depicts the oscillating dynamics of $\gamma^{in}$ along time, depicting also the time at which the network reached a stabilization of x %, for x=1/e, occurring at $$t_1 = \frac{1}{\lambda_{in}}.$$

Evident from this analysis is that most of the network's oscillating nature occurs prior to t1.

Let $t_{N0}$ denote the time at which the network has reached the threshold size of $N0=10^4$. Panel 442, depicting N as a function of time, rather surprisingly presents that:

$$t_{N_0} \approx \frac{1}{\lambda_{in}}$$

This observation, along with the randomness in γ values as a function of N occurring until $t_{N0}$, validates the assumption that γ's oscillating nature is not dependent of network size denoted N.

It is noted that $$\frac{1}{\lambda_{out}}$$

representing the time at which the network reached a stabilization of 1/e % for $\gamma^{out}$, occurs at a much earlier time, not coinciding with $t_{N0}$ evident in graph 442 of FIG. 4K, nor with the time when oscillations in $\gamma^{out}$ diminish substantially. Inventors presume that the contrast between $\gamma^{in}$ and $\gamma^{out}$ convergence times, is due to the nature and essence behind the two network properties.

Inventors discovered that though network size seems to have a significant influence on the oscillator's damping rate, evident from the stable phase presented in graphs 446 and 450 of FIG. 4K, it does not act as the source of the oscillating nature of the network's dynamics.

The Oscillating Network Model: Goodness of Fit

In order to examine how well the Oscillator model describes and models the dynamics of the degree distribution along time, the residuals from the fit, i.e the deviations of the dependent variable, $\gamma_{fit}$, from the fitted oscillator for each day, $d \in FT$ are analyzed:

Residual(γ,d)=γ(d)−$\gamma_{fit}$(d) (Equation 15)

FIG. 4L includes graphs 452-466 depicting residual plots against several distinct variables, for both $\gamma_d^{in}$ and $\gamma_d^{out}$. The residuals plots against fitted oscillator values for both $\gamma_d^{in}$ and $\gamma_d^{out}$ are presented in graphs panels 452 and 464 correspondingly. These demonstrate a random symmetrical dispersion around a zero mean, proving evidence for the validity of modeling the empirical data using an under-damped oscillator (i.e., validating the goodness of fit thereof). Inventors further analyzed the residuals plots against the network size denoted N, i.e the number of active wallets in the network, at each given point in time, presented in graphs 454 and 466, depicting a symmetric though decreasing pattern. The noise as a function of N, similarly to the phenomena presented when analyzing $\gamma_d$ itself as a function of N, also has two phases, dropping significantly after reaching the $N=10^4$ threshold. Residual plots against the actual $\gamma_d^{in}$ and $\gamma_d^{out}$ values are presented in graphs 458 and 462, manifesting how low γ values tend to be overestimated by the oscillator model, while extremely large γ values are inclined to under-estimation by the model. Graphs 458 and 462 demonstrate how noise is proportional to the signal itself by their linearly increasing tendency. Graphs 456 and 460 depict residual against time plots, for both γ-s, presenting a symmetric decay along time.

Residual plots against time for $\gamma^{in}(t)$ and $\gamma^{out}(t)$ are presented both as Graphs 456 and 460 of FIG. 4L and in FIG. 4M. FIG. 4M includes residuals plots for the Oscillator model's fit to $\gamma^{in}(t)$ and $\gamma^{out}(t)$ along time is depicted as graphs 468 and 472 correspondingly. Both depict a symmetric dispersion around the 0 (zero) mean. A comparison between the residuals distribution for $\gamma^{in}(t)$ and $\gamma^{out}(t)$ along first and the last half years of the data HYfirst and HYlast, correspondingly, is presented in graphs 470 and 474. FIG. 4M displays a validation of the use of the oscillator model for modeling the temporal behaviour of both $\gamma^{in}(t)$ and $\gamma^{out}(t)$, having an approximately zero mean residuals around the fitted oscillation throughout the entire time. Furthermore, it reveals the decreasing variance of noise along time. Apart from the symmetric dispersion of residuals around the zero mean, the residual plots against time exhibit another interesting phenomenon, presenting a decreasing standard deviation of the residuals values along time. This suggests yet another aspect of the ERC20 network's convergence with time.

ERC20 Dynamics: Network Theory VS Semantic Approach

In order to determine that the variances of $\gamma_d^{out}$ and $\gamma_d^{in}$ form a unique indicator for unveiling the network's consolidation process, Inventors explicitly compared the variance dynamics to the variance of the previously analyzed, semantic properties, including network's evolving size, both in vertices and in edges perspectives, number of unique buyers, sellers and of ERC20 tokens traded over each such weekly transactions network. It is noted that since the mean values of the compared standard deviations are highly different in value and scale, the normalized versions are compared, i.e. the Coefficients of Variation:

$$CV(x) := \frac{std(x)}{mean(x)}$$

Comparing the linear fit which present undoubtedly higher variance than $CV(\gamma_d^{in})$ and $CV(\gamma_d^{out})$ along the entire two years timespan. Furthermore, they do not present any consistent decay, indicating lack of convergence of the associated properties at any level. Nevertheless, both $CV(\gamma_d^{in})$ and $CV(\gamma_d^{out})$ present a consistent decreasing trend, indicating ongoing convergence of the degree distribution gradients along time.

FIG. 4N is a graph depicting the network stabilizing process manifested by the decreasing trend of coefficient of variation of degree distribution gradients $\gamma_d^{out}$ and $\gamma_d^{in}$. The variance comparison between the latter and other basic aspects s.a. number of buyers, sellers, vertices, edges and number of traded tokens for each Gd, $d \in FT$, affirms this network-related measure as a significant, and so far unique, index for the ERC20 network's consolidation process.

The analysis reveals and demonstrates the underlying temporal consolidation process the ERC20 transactional network undergoes along FT, until reaching an equilibrium with respect to the essential network characteristics, $\gamma_d^{out}$ and $\gamma_d^{out}$, which are evidently extremely valuable to examining the network's stability and maturity. Though unstable and erratic in many aspects, amongst all in rates, number of active wallets and activity volume, when observing the ERC20 transactions from a network theory prism, one can conclude the network undergoes a steady consolidation process, reaching an equilibrium, in a network sense.

The Oscillating Network Model: Predictions

Once the modeling of the ERC20 network dynamics by an under-damped oscillator is established, it may be used for predictive purposes. With this objective in mind, Inventors fit partial $\gamma$ observations to an oscillator model, containing data restricted by date, in order to predict the rest of the unseen $\gamma$ dynamics. Formally, each such partial oscillator model denoted $\gamma fitT1$ is fitted to $\gamma$ values retrieved between times T0 and Ti. In this constellation, T0 is fixed on Apr. 1, 2016, and Ti is incremented on a daily basis, starting from Apr. 28, 2016, resulting in a set of partial oscillator models:

$$\bigcup_{T_i \in FT} \gamma_{fitT_i}$$

Each of the above partial oscillator models is characterized by its set of parameters:

$$A(T_i), \varphi(T_i), \gamma_\infty(T_i), \omega_0(T_i) \text{ and } \zeta(T_i)$$

The stabilization process of the models' parameters is analyzed. In order to smoothen their dynamics, a 90-days rolling mean over the of each parameter is calculated, retrieved from 90 consecutive oscillator fits. Formally, given $T_i \in FT$ and $P_{osc} \in \{A, \varphi, \gamma_\infty, \omega_0, \zeta\}$ be any parameter of the partial oscillator model associated with Ti, its mean and standard deviation are defined as follows:

$$\text{mean}(P_{osc}(T_i)) \equiv \text{mean}_{t \in [T_i-90, T_i)}(P_{osc}(t))$$

$$STD(P_{osc}(T_i)) \equiv STD_{t \in [T_i-90, T_i)}(P_{osc}(t)) \quad \text{(Equation 16)}$$

FIG. 4O depicts the stabilization process of all parameters undergo a long time, as Ti advances, both for $\gamma^{in}$ and $\gamma^{out}$, presenting the mean(Posc(Ti)) and STD(Posc(Ti)) along time. Residuals plots for the Oscillator model's fit to $\gamma^{in}(t)$ and $\gamma out(t)$ along time is presented in 476 and 480, correspondingly. Both depict a symmetric dispersion around the 0 (zero) mean. A comparison between the residuals distribution for $\gamma^{in}(t)$ and $\gamma out(t)$ along first and the last half years of the data HYfirst and HYlast, correspondingly, is presented in 478 and 482. FIG. 4O displays a validation of the use of the oscillator model for modeling the temporal behaviour of both $\gamma^{in}(t)$ and $\gamma out(t)$, having an approximately zero mean residuals around the fitted oscillation throughout the entire time. Furthermore, it reveals the decreasing variance of noise along time.

The great difference between $\gamma^{in}$ and $\gamma^{out}$ is quite evident in this analysis as well, manifested through the parameters' convergence properties. Each parameter Posc of the partial oscillator models for $\gamma^{in}$, presents not only a decreasing STD(Posc(Ti)) as Ti progresses, but also a clear-cut stabilization for each of the parameters' mean value, formulating at June 2017. This stabilization, occurring approximately a year prior to the end of the data, strongly implies the potentially extraordinary predictive abilities of the model, applied to $\gamma^{in}$. The parameters of the partial oscillator models for $\gamma^{out}$, although presenting a decreasing standard deviation along time, do not display the same converging tendency as Ti progresses, manifested by a constant change in the parameters mean value along time.

This analysis lead Inventors to examine the predictive abilities of the oscillator model, and the amount of data required for fitting the oscillator's parameters, in order to establish a stable and accurate prediction. For this purpose, 5 different inspection dates were selected, denoted ed∈FT: Sep. 28, 2016, Dec. 27, 2016, Mar. 27, 2017, June 25, 2017, Sep. 23, 2017. For each such inspection date ed, 90 partial oscillator models were fitted:

$$\bigcup_{T_i \in [e_d-90, e_d)} \gamma_{fitT_i}$$

and their prediction of the dynamics for the timespan of [ed, June 2018) was analyzed, calculating their mean prediction and standard deviation.

The Mean-Oscillator Model was defined for each ed as follows: Definition 6. Let ed∈FT be a chosen inspection date. The Mean-Oscillator model was defined w.r.t ed as:

$$\hat{\gamma_{fit}}_{e_d} = \text{mean}_{T_i \in [e_d-90, e_d)}(\gamma_{fitT_i}(t))$$

FIG. 4P includes residuals plots for the Oscillator model's fit to $\gamma^{in}(t)$ and $\gamma^{out}(t)$ along time are presented in 500 and 504, correspondingly. Both depict a symmetric dispersion around the 0 (zero) mean. A comparison between the residuals distribution for $\gamma^{in}(t)$ and $\gamma^{out}(t)$ along first and the last half years of the data HYfirst and HYlast, correspondingly, is presented in 502 and 506. FIG. 4P displays a validation of the use of the oscillator model for modeling the temporal behaviour of both $\gamma^{in}(t)$ and $\gamma^{out}(t)$, having an approximately zero mean residuals around the fitted oscillation throughout the entire time. Furthermore, it reveals the decreasing variance of noise along time.

FIG. 4P depicts the predictions made for post ed timespan, for each of the 5 inspection dates, for both $\gamma^{in}$ and $\gamma^{out}$. The prediction analysis coincides with the parameters stabilization analysis, as predictions for $\gamma^{in}$ stabilize as ed advances, until finally presenting high reliability, for predicting a whole year of data, starting from ed=Jun. 25, 2017. It is noted however, as implied from $\gamma^{out}$ parameters stabilization process, that in this particular implementation which may not necessarily be true for other implementations, the prediction ability for $\gamma^{out}$ isn't as strong, and it keeps changing throughout the advancing ed dates and hasn't reached sufficient stability in order to predict future $\gamma^{out}$ values. The prediction ability may be strong for other implementations.

FIG. 4Q is a graph depicting RMSE($\gamma^{in}_{fit}$) and RMSE ($\gamma^{out}_{fit}$) as a function of the ed timespan.

Furthermore, the consolidation process the ERC20 undergoes is evident by examining the dynamics of Standard deviation of $\gamma$ values over time.

FIG. 4R includes graphs 520-526 indicative of ERC20 transactional network temporal development and maturation, in a network related prism, demonstrating the underlying consolidation process the network undergoes. Evolvement of incoming degree distribution gradient, $\gamma_d^{in}$ is presented in graph 520. A comparison between its dispersion along the first and the last half years of the data, HYfirst and HYlast correspondingly, is presented in graph 522. The temporal development of $\gamma_d^{out}$ is displayed in graph 524, and its corresponding dispersion comparison in graph 526.

FIG. 4R demonstrates that the Standard deviation of both $\gamma_d^{in}$ and $\gamma_d^{out}$ value is converging throughout FT. We observe that in the beginning of ERC20 trading, specifically during the first half-year of the data, between April 2016 to October 2016, denoted by HYfirst, γ values are widely spread, obtaining a large STD. However, examining the dispersion in γ values during the last half-year of the data, lapsing between December 2017 and June 2018, referred to as HYlast, we see a drastic decrease. We conclude that not only does the ERC20 degree distributions follow the power-law model throughout the entire time, the power-law converges with time, becoming more stable and tight, manifested by the associated γ.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant networks will be developed and the scope of the term network is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A method for evaluating a network by predicting stabilization of the network, comprising:
    providing a plurality of graphs each indicative of a respective time sequential snapshot of a dynamic graph obtained over a historical time interval, the dynamic graph denoting the network;
    computing a plurality of sets of meta-parameters, each set of meta-parameters computed according to a respective graph of the plurality of graphs, wherein each one of the meta-parameters denotes a network level parameter computed according to a plurality of at least one of edges and nodes of the respective graphs;
    analyzing the plurality of sets of meta-parameters according to values computed based on a physics-based analytical model of a harmonic oscillator of an evolving physical system; and
    predicting a likelihood of stabilization of the network during a future time interval according to an indication of convergence of the values according to a convergence requirement, computed based on the physics-based analytical model during the future time interval.

2. The method according to claim 1, further comprising:
predicting a likelihood of non-stabilization of the network during the future time interval according to an indication of non-convergence of the values according to the convergence requirement, computed based on the physics-based analytical model during the future time interval;
generating instructions for adjustment of at least one component of the network to create an adjusted network; and
iterating, for the adjusted network, the providing, the computing the plurality of sets of meta-parameters, the analyzing, the predicting and the generating, until the indication of convergence is obtained.

3. The method according to claim 1, wherein the plurality of sets of meta-parameters comprise a sequence of degree distribution power law coefficients, each degree distribution power law coefficient computed for each graph of the plurality of graphs.

4. The method according to claim 1, wherein the plurality of sets of meta-parameters comprise a sequence of average shortest paths, each average shortest path computed for each graph of the plurality of graphs.

5. The method according to claim 1, wherein the harmonic oscillator comprises a damped harmonic oscillator.

6. The method according to claim 1, wherein the analyzing comprises fitting the set of meta-parameters to the physics-based analytical model using a best fit process.

7. The method according to claim 1, wherein analyzing comprises fitting a sequence of degree distribution power law coefficients computed for respective graphs over the historic time interval to a damped harmonic oscillator denoted as:

$$\gamma_{fit}(t) = A \cdot e^{-\omega_0 \zeta \cdot t} \cdot \sin(\omega_0 \sqrt{1-\zeta^2} t + \varphi) + \gamma_\infty$$

wherein:
$\gamma$ denotes a constant stable state,
$\lambda = \omega_0 \zeta$ denotes exponential decay of the under-damped oscillator, wherein $1/\lambda$ denotes a prediction of the future time interval when evolution of the network stabilizes,
$\omega = \omega_0 \sqrt{1-\zeta^2}$ denotes angular frequency,
$\gamma_\infty$ denotes a stable value of the degree-distribution power-law coefficient indicative of a stable state to which the network converges,
A denotes maximal amplitude of the oscillator, and
$\varphi$ denotes phase shift.

8. The method according to claim 1, wherein the likelihood of stabilization of the network is computed according to a predicted convergence of future values of the set of meta-parameters for the future time interval.

9. The method according to claim 8, wherein the future values of the set of meta-parameters are predicted according to the physics-based analytical model.

10. The method according to claim 1, further comprising providing at least one of: an indication of predicted future values of meta-parameters during the predicted stabilization of the network, and an indication of the future time interval associated with the predicted stabilization of the network.

11. The method according to claim 10, further comprising providing an indication of confidence level associated with at least one of: the predicted likelihood of stabilization of the network, the predicted future values of the meta-parameters during the predicted stabilization of the network, and the future time interval associated with the predicted stabilization of the network.

12. The method according to claim 1, wherein temporally adjacent graphs of the plurality of graphs overlap in at least one common node, and each graph of the plurality of graphs has a unique combination of nodes and edges that is not present in any other graph.

13. The method according to claim 1, wherein nodes of the graphs denote entities of the network, and edges of the graphs denote interactions between the entities.

14. The method according to claim 13, wherein entities are selected from the group consisting of: user accounts, wallets, social network accounts, bank accounts, shopping accounts, email accounts, gaming application, blockchain user accounts, mobile device, smartphone, standard phones, servers, applications being used by the user, and client terminals.

15. The method according to claim 13, wherein edges are selected from the group consisting of: calls, multimedia objects sent from one entity to another entity, financial transactions, a game played by two or more entities, transactions associated with smart contracts, and transfer of blockchain-based tokens or cryptocurrencies.

16. The method according to claim 1, further comprising:
performing a post-hoc analysis at a current time interval after the future time interval by analyzing a current state of the network in comparison to the predicted likelihood of stabilization of the network during the future time interval, and generating an indication of the analysis.

17. The method according to claim 16, wherein the analyzing comprises detecting a statistically significant difference between the current state of the network and the predicted likelihood of stabilization of the network, and wherein the generated indication comprises an indication of an abnormality in the network.

18. The method according to claim 17, wherein the statistically significant difference comprises predicted oscillations that have not occurred, and wherein the abnormality comprises an indication of a dampening effect.

19. The method according to claim 17, wherein the statistically significant difference comprises an over estimation of an equilibrium degree distribution, and wherein the abnormality comprises an indication appearance in the network of larger than expected hubs.

20. The method according to claim 1, further comprising computing the dynamic graph according to the network.

21. A system for evaluating a network by predicting stabilization of the network, comprising:
at least one hardware processor; and
a non-transitory memory having stored thereon a code for execution by the at least one hardware processor, the code comprising instructions for:
providing a plurality of graphs each indicative of a respective sequential snapshot of a dynamic graph obtained over a historical time interval, the dynamic graph denoting the network;
computing a plurality of sets of meta-parameters, each set of meta-parameters computed according to a respective graph of the plurality of graphs, wherein each one of the meta-parameters denotes a network level parameter computed according to a plurality of at least one of edges and nodes of the respective graphs;
analyzing the plurality of sets of meta-parameters according to values computed based on a physics-based analytical model of a harmonic oscillator of an evolving physical system; and predicting a likelihood of stabilization of the network during a future time interval according to an indication of convergence of the values according to a convergence requirement, computed based on the physics-based analytical model during the future time interval.

22. A computer program product for evaluating a network by predicting stabilization of the network, comprising:

a non-transitory memory having stored thereon a code for execution by at least one hardware processor, the code comprising instructions for:

providing a plurality of graphs each indicative of a respective time sequential snapshot of a dynamic graph obtained over a historical time interval, the dynamic graph denoting the network;

computing a plurality of sets of meta-parameters, each set of meta-parameters computed according to a respective graph of the plurality of graphs, wherein each one of the meta-parameters denotes a network level parameter computed according to a plurality of at least one of edges and nodes of the respective graphs;

analyzing the plurality of sets of meta-parameters according to values computed based on a physics-based analytical model of a harmonic oscillator of an evolving physical system; and predicting a likelihood of stabilization of the network during a future time interval according to an indication of convergence of the values according to a convergence requirement, computed based on the physics-based analytical model during the future time interval.

\* \* \* \* \*